US010992003B2

(12) United States Patent
Su et al.

(10) Patent No.: US 10,992,003 B2
(45) Date of Patent: Apr. 27, 2021

(54) AIR-BREATHING AQUEOUS SULFUR RECHARGEABLE BATTERIES

(71) Applicant: Massachusetts Institute of Technology, Cambridge, MA (US)

(72) Inventors: Liang Su, Medfield, MA (US); Zheng Li, Blacksburg, VA (US); Yet-Ming Chiang, Weston, MA (US); Menghsuan Sam Pan, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 131 days.

(21) Appl. No.: 15/957,027

(22) Filed: Apr. 19, 2018

(65) Prior Publication Data

US 2018/0241107 A1    Aug. 23, 2018

Related U.S. Application Data

(63) Continuation of application No. PCT/US2016/059692, filed on Oct. 31, 2016.

(60) Provisional application No. 62/317,825, filed on Apr. 4, 2016, provisional application No. 62/266,159, filed on Dec. 11, 2015, provisional application No. 62/248,672, filed on Oct. 30, 2015.

(51) Int. Cl.
*H01M 8/18* (2006.01)
*H01J 7/00* (2006.01)
*H01M 4/92* (2006.01)
*H01M 12/08* (2006.01)
*H01M 4/90* (2006.01)
*H01M 4/96* (2006.01)
*H01M 4/86* (2006.01)
*H01M 4/36* (2006.01)
*H01M 12/02* (2006.01)
*H02J 7/00* (2006.01)

(52) U.S. Cl.
CPC ......... *H01M 12/08* (2013.01); *H01M 4/368* (2013.01); *H01M 4/8615* (2013.01); *H01M 4/8657* (2013.01); *H01M 4/9016* (2013.01); *H01M 4/9041* (2013.01); *H01M 4/92* (2013.01); *H01M 4/921* (2013.01); *H01M 4/96* (2013.01); *H01M 8/186* (2013.01); *H01M 8/188* (2013.01); *H01M 12/02* (2013.01); *H02J 7/0068* (2013.01); *H01M 2004/8689* (2013.01); *H01M 2300/0002* (2013.01); *H01M 2300/0005* (2013.01); *H01M 2300/0014* (2013.01); *Y02E 60/10* (2013.01)

(58) Field of Classification Search
CPC ...... H01M 12/08; H01M 4/92; H01M 4/8615; H01M 4/9041; H01M 4/8657; H01M 4/368; H01M 8/186; H01M 8/188; H01M 12/02; H01M 4/9016; H01M 4/921; H01M 4/96; H01M 2300/0014; H01M 2004/8689; H01M 2300/0005; H01M 2300/0002; H02J 7/0068; Y02E 60/128
See application file for complete search history.

(56) References Cited

U.S. PATENT DOCUMENTS

| | | | |
|---|---|---|---|
| 4,289,591 A * | 9/1981 | Davidson | .................. C25B 1/10 204/282 |
| 4,485,154 A | 11/1984 | Remick et al. | |
| 5,320,816 A | 6/1994 | Tsai et al. | |
| 5,612,148 A | 3/1997 | Zito | |
| 6,376,123 B1 | 4/2002 | Chu | |
| 8,828,575 B2 | 9/2014 | Visco et al. | |
| 9,583,779 B2 | 2/2017 | Chiang et al. | |
| 9,843,064 B2 | 12/2017 | Brandon et al. | |
| 2007/0231659 A1* | 10/2007 | Ma | ........................ H01M 8/026 429/444 |
| 2010/0047671 A1 | 2/2010 | Chiang et al. | |
| 2011/0070506 A1 | 3/2011 | Friesen et al. | |
| 2011/0203929 A1 | 8/2011 | Buckley et al. | |
| 2012/0135278 A1 | 5/2012 | Yoshie et al. | |
| 2013/0122334 A1 | 5/2013 | Visco et al. | |
| 2013/0186771 A1 | 7/2013 | Zhai et al. | |

(Continued)

FOREIGN PATENT DOCUMENTS

EP       2619835 A1    7/2013
JP       2014-216203   11/2014
(Continued)

OTHER PUBLICATIONS

International Preliminary Report on Patentability dated May 11, 2018 for Application No. PCT/US2016/059692.
(Continued)

*Primary Examiner* — Muhammad S Siddiquee
(74) *Attorney, Agent, or Firm* — Wolf, Greenfield & Sacks, P.C.

(57) ABSTRACT

An electrochemical apparatus includes a catholyte, an anolyte, and a separator disposed between the catholyte and the anolyte. The catholyte includes metal salt dissolved in water, thereby providing at least one metal ion. The anolyte includes a polysulfide solution. The separator is permeable to the at least one metal ion. During a charging process of the electrochemical apparatus, oxygen is generated in the catholyte, the polysulfide in the polysulfide solution undergoes a reduction reaction in the anolyte, and the at least one metal ion moves from the catholyte to the anolyte. During a discharging process of the apparatus, the oxygen is consumed in the catholyte, the polysulfide oxidizes in the anolyte, and the at least one metal ion moves from the anolyte to the catholyte.

49 Claims, 36 Drawing Sheets

(56) References Cited

U.S. PATENT DOCUMENTS

| | | | |
|---|---|---|---|
| 2013/0330644 A1* | 12/2013 | Brandon | H01M 8/18 429/418 |
| 2014/0028260 A1 | 1/2014 | Goeltz et al. | |
| 2014/0302370 A1* | 10/2014 | Woodford | H01M 4/382 429/101 |
| 2015/0125763 A1* | 5/2015 | Zheng | H01M 8/20 429/405 |
| 2015/0140471 A1 | 5/2015 | Dong | |
| 2015/0214555 A1 | 7/2015 | Visco et al. | |
| 2016/0036107 A1* | 2/2016 | Takechi | H01M 4/8615 429/405 |
| 2017/0200966 A1 | 7/2017 | Chiang et al. | |

FOREIGN PATENT DOCUMENTS

| | | |
|---|---|---|
| WO | WO 2012/038379 A1 | 3/2012 |
| WO | WO 2013/164879 A1 | 11/2013 |
| WO | WO 2014/121276 A3 | 8/2014 |

OTHER PUBLICATIONS

Invitation to Pay Additional Fees dated Jun. 10, 2014 for Application No. PCT/US2014/014681.
International Search Report and Written Opinion dated Sep. 23, 2014 for Application No. PCT/US2014/014681.
International Preliminary Report on Patentability dated Aug. 13, 2015 for Application No. PCT/US2014/014681 dated Aug. 13, 2015.
[No Author Listed], DOE Hydrogen and Fuel Cell Program Record 14014: Fuel Cell System Cost. Sep.-Oct. 2014. https://www.hydrogen.energy.gov/pdfs/14014_fuel_cell_system_cost_2014.pdf. 8 pages.
[No Author Listed], U.S. Department of Energy. Revolution . . . Now/The Future Arrives for Five Clean Energy Technologies—2015 Update. Nov. 2015. 24 pages.
[No Author Listed], O'Hara Corporation. Lithium-Ion conducting Glass-Ceramics (LICGC) Product Information Web page. Oct. 2010. http://www.oharacorp.com/lic-gc.html. 2 pages.
[No Author Listed], Long Duration Storage for Baseload Wind-1. Pptx-General Compression, Eric Ingersoll, CEO. MIT presentation. http://web.mit.edu/windenergy/windweek/Presentations/Ingersoll-Long%20Duration%20Storage%20for%20Baseload%20Wing-1.pdf. Jan. 21, 2011. 14 pages.
[No Author Listed], Mineral Commodity Summaries 2017. US Dept of the Interior. US Geological Survey. 2017. http://dx.doi.org/10/3133/70180197. 206 pages.
Akhil et al., DOE/EPRI 2013 Electricity Storage Handbook in Collaboration with NRECA, Sandia Report, SAND2013-5131. http://www.sandia.gov/ess/publications/SAND2013-5131.pdf. Jul. 2013. 340 pages.
Bharmoria et al., Temperature-dependent solubility transition of $Na_2SO_4$ in water and the effect of NaCl therein: solution structures and salt water dynamics. J Phys Chem B. Nov. 6, 2014;118(44):12734-42. doi: 10.1021/jp507949h. Epub Oct. 14, 2014.
Braff et al., Value of storage technologies for wind and solar energy. Nat Climate Change. 2016;6(10):964-9. Epub Jun. 13, 2016. Suppl Info, 1 page.
Bruce et al., Li—O2 and Li—S batteries with high energy storage. Nat Mater. Jan. 2012;11(1):19-29. doi: 10.1038/nmat3191. Epub Dec. 15, 2011.
Brunini et al., Modeling the hydrodynamic and electrochemical efficiency of semi-solid flow batteries. Electrochimica Acta. Mar. 2012; 69:301-307.
Budischak et al., Cost-minimized combinations of wind power, solar power and electrochemical storage, powering the grid up to 99.9% of the time. J Power Sources. Mar. 2013;225:60-74. Epub Oct. 11, 2012.
Chen et al., Ordered mesoporous carbon/sulfur nanocomposite of high performances as cathode for lithium sulfur battery. Electrochimica Acta. Mar. 2011; 56(26):9549-9555.
Chen et al., A low-dissipation, pumpless, gravity-induced flow battery. Energy Environ Sci. 2016;9:1760-70. Epub Apr. 11, 2016.
Chu et al., The path towards sustainable energy. Nat Mater. Jan. 2017; 16(1):16-22. doi: 10.1038/nmat4834. Epub Dec. 20, 2016.
Darling et al., Pathways to low-cost electrochemical energy storage: a comparison of aqueous and nonaqueous flow batteries. Energy Environ Sci. 2014;7:3459-77. Epub Sep. 16, 2014.
Demir-Cakan et al., An aqueous electrolyte rechargeable Li-ion/polysulfide battery. J Mater Chem A. 2014;2:9025-9. Epub Apr. 17, 2014.
Demir-Cakan et al., Use of ion-selective polymer membranes for an aqueous electrolyte rechargeable Li-ion-polysulphide battery. J Mater Chem A. 2015;3:2869-75. Epub Dec. 2, 2014.
Dunn et al., Electrical energy storage for the grid: a battery of choices. Science. Nov. 18, 2011;334(6058):928-35. doi: 10.1126/science.1212741.
Fan et al., Mechanism and kinetics of $Li_2S$ precipitation in lithium-sulfur batteries. Adv Mater. Sep. 16, 2015;27(35):5203-9. doi: 10.1002/adma.201501559. Epub Aug. 10, 2015.
Fan et al., Polysulfide flow batteries enabled by percolating nanoscale conductor networks. Nano Lett. 2014;14(4):2210-8. doi: 10.1021/nl500740t. Epub Mar. 5, 2014.
Fantauzzi et al., Exploiting XPS for the identification of sulfides and polysulfides. RSC Adv. 2015;5:75953-63. Epub Aug. 28, 2015.
Fu et al., Highly reversible lithium/dissolved polysulfide batteries with carbon nanotube electrodes. Angew Chem Int Ed Engl. Jul. 1, 2013;52(27):6930-5. doi: 10.1002/anie.201301250. Epub May 29, 2013.
Gasteiger et al., Activity benchmarks and requirements for Pt, Pt-alloy, and non-Pt oxygen reduction catalysts for PEMFCs. Appl Catal B. Environ. 2005;56(1):9-35.
Ge et al., Study of a high power density sodium polysulfide/bromine energy storage cell. J Appl Electrochem. Feb. 2004;34(2):181-5.
Giggenbach, Optical spectra of highly alkaline sulfide solutions and the second dissociation constant of hydrogen sulfide. Inorg Chem. Jul. 1971;10(7):1333-8.
Giggenbach, Optical spectra and equilibrium distribution of polysulfide ions in aqueous solution at 20 deg. Inorg. Chem. Jun. 1972;11(6):1201-7.
Giggenbach, Equilibria involving polysulfide ions in aqueous sulfide solutions up to 240 deg. Inorg Chem. 1974;13(7):1724-30.
Giggenbach, Kinetics of the polysulfide-thiosulfate disproportionation up to 240 deg. Inorg Chem. 1974:13(7):1730-3.
Gun et al., Electrospray ionization mass spectrometric analysis of aqueous polysulfide solutions. Microchim. Acta. Jun. 2004;146(3-4):229-37.
Ha et al., Estimating the system price of redox flow batteries for grid storage. J. Power Sources. Nov. 20, 2015;296:122-32. Epub Jul. 28, 2015.
Hayashi et al, Superionic glass-ceramic electrolytes for room-temperature rechargeable sodium batteries. Nat Commun. May 22, 2012;3:856(1-5). doi: 10.1038/ncomms1843.
Hodes, Electrocatalytic electrodes for the polysulfide redox system. J Electrochem Soc. Mar. 1980;127(3):544-9.
Hueso et al., High temperature sodium batteries: status, challenges and future trends. Energy Environ Sci. 2013;6:734-49.
Li et al., Long-life, high-voltage acidic Zn-Air batteries. Adv Energy Mater. Mar. 9, 2016;6(5):1502054(1-7).
Li et al., An aqueous dissolved polysulfide cathode for lithium-sulfur batteries. Energy Environ Sci. 2014;7:3307-12. Epub Aug. 26, 2014.
Li et al., Hierarchical pore-in-pore and wire-in-wire catalysts for rechargeable Zn- and Li-air batteries with ultra-long cycle life and high cell efficiency. Energy Environ Sci. 2015;8:3274-82. Epub Sep. 7, 2015.
Li et al., Air-breathing aqueous sulfur flow battery for ultralow-cost long-duration electrical storage. Joule. Oct. 11, 2017;306-27.
Li et al., A high-energy and low-cost polysulfide/iodide redox flow battery. Nano Energy. 2016;30:283-92. Epub Sep. 28, 2016.
Licht et al., Numerical analysis of aqueous polysulfide solutions and its application to cadmium chalcogenide/polysulfide photoelectrochemical solar cells. Inorg Chem Jul. 1986;25(15):2486-9.

(56) References Cited

OTHER PUBLICATIONS

Licht, The high aqueous solubility of $K_2S$ and its effect on bulk and photoelectrochemical characteristics of Cd ( SeTe ) / $S_x^=$ Cells I . Polysulfide variation at constant sulfur/sulfide ratio. J Electrochem Soc. Feb. 1986:133(2):272-7.

Light, An energetic medium for electrochemical storage utilizing the high aqueous solubility of potassium polysulfide. J Electrochem Soc. Sep. 1987:134(9):2137-41.

Licht, Aqueous solubilities, solubility products and standard oxidation-reduction potentials of the metal sulfides. J Electrochem Soc. Dec. 1988;135(12):2971-5.

Licht et al., Disproportion of aqueous sulfur and sulfide: Kinetics of polysulfide decomposition. J Phys Chem B. 1997;101(14):2540-5.

Manthirum et al., Challenges and prospects of lithium-sulfur batteries. Acc Chem Res. May 21, 2013;46(5):1125-34. doi: 10.1021/ar300179v. Epub Oct. 25, 2012.

Nykvist et al., Rapidly falling costs of battery packs for electric vehicles. Nat Climate Change. Apr. 2015;5:329-32. Epub Mar. 23, 2015.

O'Brien et al., Kinetics of oxygenation of reduced sulfur species in aqueous solution. Environ Sci Technol. Nov. 1977;11(12):1114-20.

Pan et al., Redox species of redox flow batteries: A review. Molecules. 2015;20:20499-517.

Pang et al., Advances in lithium-sulfur batteries based on multifunctional cathodes and electrolytes. Nat Energy. Sep. 8, 2016;1:16132(1-11).

Peramunage et al., A solid sulfur cathode for aqueous batteries. Science. Aug. 20, 1993;261(5124):1029-32.

Soloveichik, Flow Batteries: Current Status and Trends. Chem Rev. Oct. 28, 2015;115(20):11533-58. doi: 10.1021/cr500720t. Epub Sep. 21, 2015.

Steward, Scenario Development and Analysis of Hydrogen as a Large-Scale Energy Storage Medium. Presentation. National Renewable Energy Laboratory. Jun. 10, 2009. Denver, CO. 31 pages. http:///www.nrel.gov/docs/fy09osti/45873.pdf.

Su et al., Toward an inexpensive aqueous polysulfide-polyiodide redox flow battery. Ind Eng Chem Res. 2017;56(35):9783-92. Epub Jul. 3, 2017.

Weber et al., Redox flow batteries: a review. J Appl Electrochem. Oct. 2011;41:1137-64. Epub Sep. 2, 2011.

Wei et al., An aqueous redox flow battery based on neutral alkali metal ferri/ferrocyanide and polysulfide electrolytes. J Electrochem Soc. 2016;163(1):A5150-3. Epub Nov. 13, 2015.

Wenzel et al., Direct observation of the interfacial instability of the fast ionic conductor $Li_{10}GeP_2S_{12}$ at the lithium metal anode. Chem Mater. 2016;28(7):2400-7. Epub Mar. 10, 2016.

Yang et al., Electrochemical energy storage for green grid. Chem Rev. May. 11, 2011;111(5):3577-613. doi: 10.1021/cr100290v. Epub Mar. 4, 2011.

Yang et al., Nanostructured sulfur cathodes. Chem Soc Rev. Apr. 7, 2013;42(7):3018-32. doi: 10.1039/c2cs35256g.

Yang et al., Unique aqueous Li-ion/sulfur chemistry with high energy density and reversibility. Proc Natl Acad Sci U S A. Jun. 13, 2017;114(24):6197-6202. doi: 10.1073/pnas.1703937114. Epub May 31, 2017.

Zhao et al., Advanced characterization techniques in promoting mechanism understanding for lithium-sulfur batteries. Adv Funct Mater. Sep. 2018;28(38):1707543(1-21). Epub Mar. 8, 2018.

Zhu et al., Solubility of $Na_2CO_3$ and $NaHCO_3$ in aqueous sodium sulfate solutions and its application to separating $Na_2CO_3$ and $Na_2SO_4$ salt mixtures. Ind Eng Chem Res. 2015;54(19):5345-8. Epub Apr. 27, 2015. 561.

Zito, Process for energy storage and/or power delivery with means for restoring electrolyte balance #5612148. J Power Sources. Jan. 1998;70(1):169-70.

Extended European Search Report dated Mar. 13, 2019 for Application No. EP 16861033.5.

International Search Report and Written Opinion dated Mar. 3, 2017 for International Application No. PCT/US2016/059692, 17 pages.

\* cited by examiner

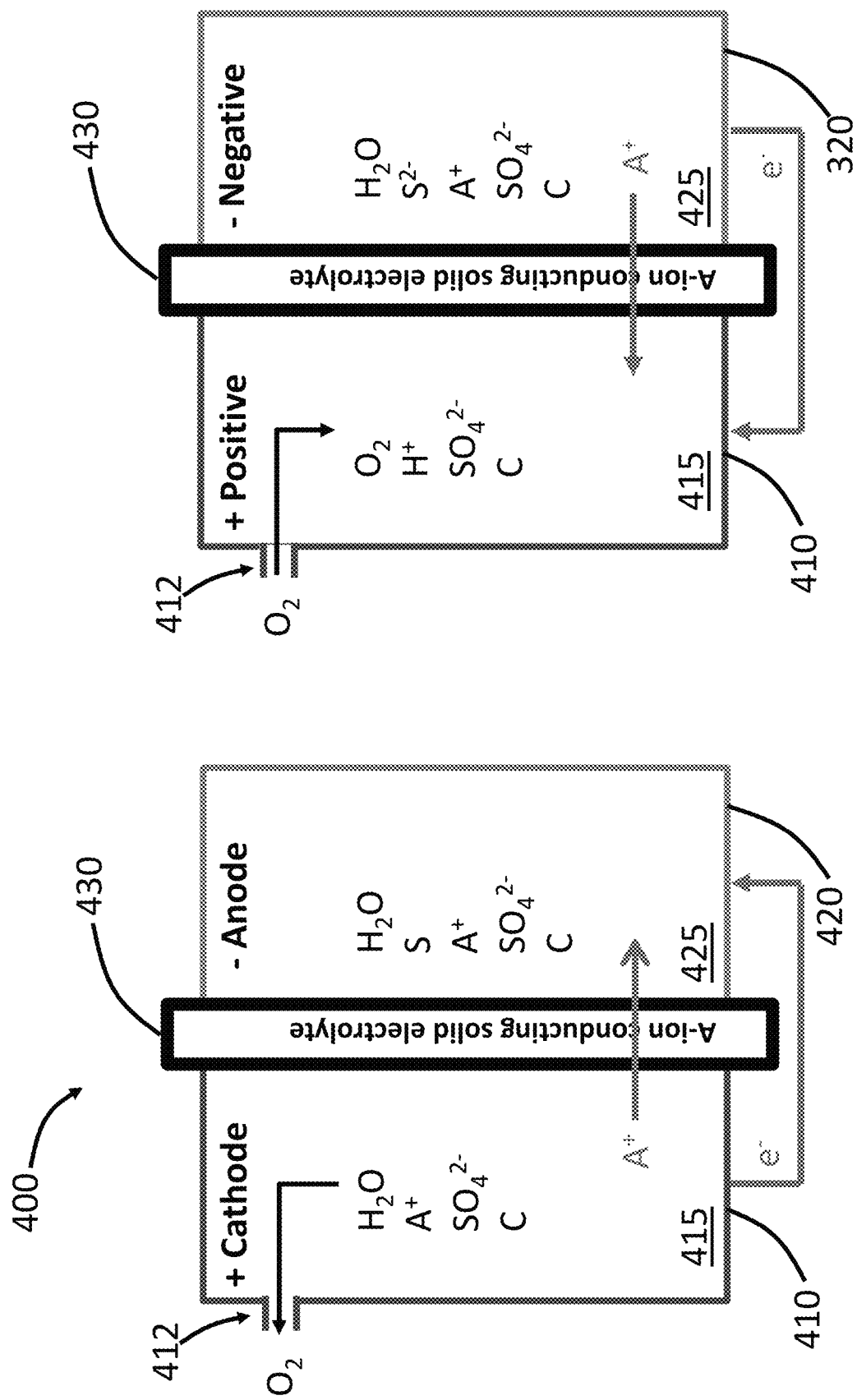

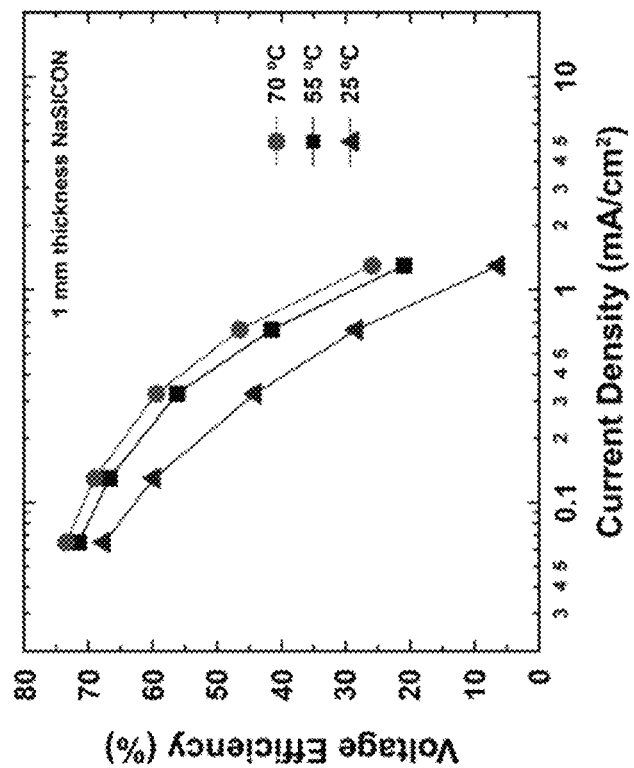
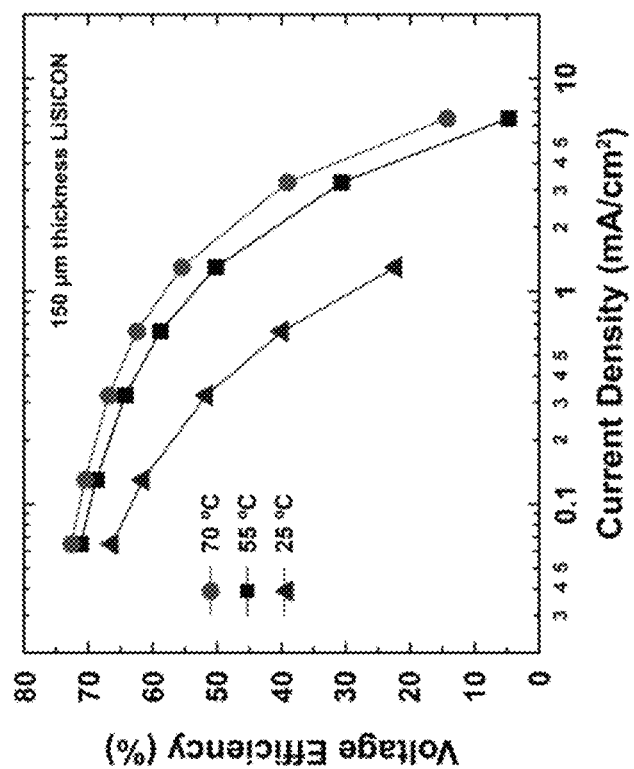
FIG. 17A
FIG. 17B

AIR-BREATHING AQUEOUS SULFUR RECHARGEABLE BATTERIES

CROSS-REFERENCES TO RELATED APPLICATIONS

This application is a continuation application of International Application No. PCT/US/2016/059692, filed Oct. 31, 2016, entitled "AIR-BREATHING AQUEOUS SULFUR RECHARGEABLE BATTERIES," which claims priority to U.S. Application No. 62/248,672, filed Oct. 30, 2015, entitled "OXYGEN-BREATHING AQUEOUS SULFUR STORAGE BATTERY," U.S. Application No. 62/266,159, filed Dec. 11, 2015, entitled "AIR-BREATHING AQUEOUS SULFUR RECHARGEABLE BATTERIES," and U.S. Application No. 62/317,825, filed Apr. 4, 2016, entitled "ELECTROCHEMICAL STORAGE FROM SEAWATER," each of which are hereby incorporated herein by reference in their entirety for all purposes.

GOVERNMENT SUPPORT

This invention was made with Government support under Contract No. DE-AC02-06CH11357 awarded by the Department of Energy. The Government has certain rights in the invention.

BACKGROUND

The cost of renewable energy sources, such as wind and solar electricity generation, has dropped rapidly through the decades and can be competitive with fossil fuel generation. However, these energy sources are usually intermittent, thereby highlighting the need for electrical storage that can transform intermittent renewable power into predictable and dispatchable electricity generation, which may even serve as baseload power.

Conventional energy storage techniques include pumped hydroelectric storage (PHS) and underground compressed air energy storage (CAES), which can have costs as low as around 100 US$/kWh. However, these techniques also suffer constraints from geographical and environmental conditions that may limit further deployment.

SUMMARY

Embodiments of the present invention include apparatus, systems, and methods for low-cost energy storage. In one example, an electrochemical apparatus includes a catholyte, an anolyte, and a separator disposed between the catholyte and the anolyte and permeable to the at least one metal ion. The catholyte includes at least one metal salt dissolved in water, thereby providing at least one metal ion. The anolyte includes a polysulfide solution. During a charging process of the electrochemical apparatus, oxygen is generated in the catholyte, the polysulfide in the polysulfide solution undergoes a reduction reaction in the anolyte, and the at least one metal ion moves from the catholyte to the anolyte. During a discharging process of the apparatus, the oxygen is consumed in the catholyte, the polysulfide oxidizes in the anolyte, and the at least one metal ion moves from the anolyte to the catholyte.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIGS. 4A and 4B show schematics of an electrochemical apparatus configured as an open system using sulfur for energy storage.

FIGS. 17A and 17B show voltage efficiency as a function of current density at three temperatures in an electrochemical cell using $Li^+$ and $Na^+$ as the working ion, respectively.

DETAILED DESCRIPTION

In view of the dropping cost and the increasing environmental benefit of renewable energy sources, it can be desirable to develop energy storage technologies with costs well below the trajectory of current technology. It can also be desirable for the technology to be safe, scalable, and sufficiently energy-dense for widespread deployment, including in space-constrained environments.

From the known redox-active materials, aside from water and air, elemental sulfur is arguably the least expensive on a cost-per-stored-charge basis. Table 1 below shows unit cost, specific capacity, and cost-per-stored-charge (in the unit of US$/kAh) of electroactive materials that can be used as storage electrodes. It can be seen from Table 1 that the cost-per-stored-charge of sulfur is only 0.12 US$/kAh, compared to 2.90 of zinc, 27.03 of graphite, and 285.71 of LiCoO$_2$. Moreover, sulfur has the 14$^{th}$ highest crustal abundance and is widely available as a byproduct of natural gas and petroleum refining.

TABLE 1

Unit cost, specific capacity, and cost-per-stored-charge of selected electroactive materials usable as storage electrodes.

| | Bulk price (US$/kg) | Capacity (Ah/g) | Cost per stored charge (US$/kAh) |
|---|---|---|---|
| S | 0.20 | 1.67 | 0.12 |
| Li$_2$S | 2.96 | 1.17 | 2.53 |
| Na$_2$S | 0.59 | 0.68 | 0.87 |
| Lithium metal | 65.66 | 3.86 | 17.01 |
| Sodium metal | 2.81 | 1.17 | 2.40 |
| Battery grade graphite | 10.00 | 0.37 | 27.03 |

TABLE 1-continued

Unit cost, specific capacity, and cost-per-stored-charge of selected electroactive materials usable as storage electrodes.

| | Bulk price (US$/kg) | Capacity (Ah/g) | Cost per stored charge (US$/kAh) |
|---|---|---|---|
| LiCoO$_2$ | 40.00 | 0.14 | 285.71 |
| Zinc | 2.38 | 0.82 | 2.90 |

Sulfur is typically used as a cathode material in non-aqueous lithium-sulfur and high temperature sodium-sulfur batteries. In an all-aqueous system, it is beneficial to use sulfur as an anode material to preserve aqueous stability while reaching a meaningful cell voltage. Solubilized aqueous sulfur electrodes can be paired with halogenated catholytes in flow batteries, used as the catholyte vs. "protected" lithium metal anodes, and used as the anolyte with lithium intercalation cathodes. As used throughout this application, "anode" and "cathode" refer to an electrode with solid-phase active materials whereas "anolyte" and "catholyte" refer to electrolytes with solubilized active materials. In each of these cases, the chemical cost of storage can be dominated by the non-sulfur electrode. Therefore, if the aqueous anolyte of inexpensive and highly soluble alkali-metal polysulfides (up to 12 M) can be matched with a similarly low cost catholyte, unprecedented electrochemical storage economics, approaching those of PHS and CAES, can be achieved.

Figure 1:
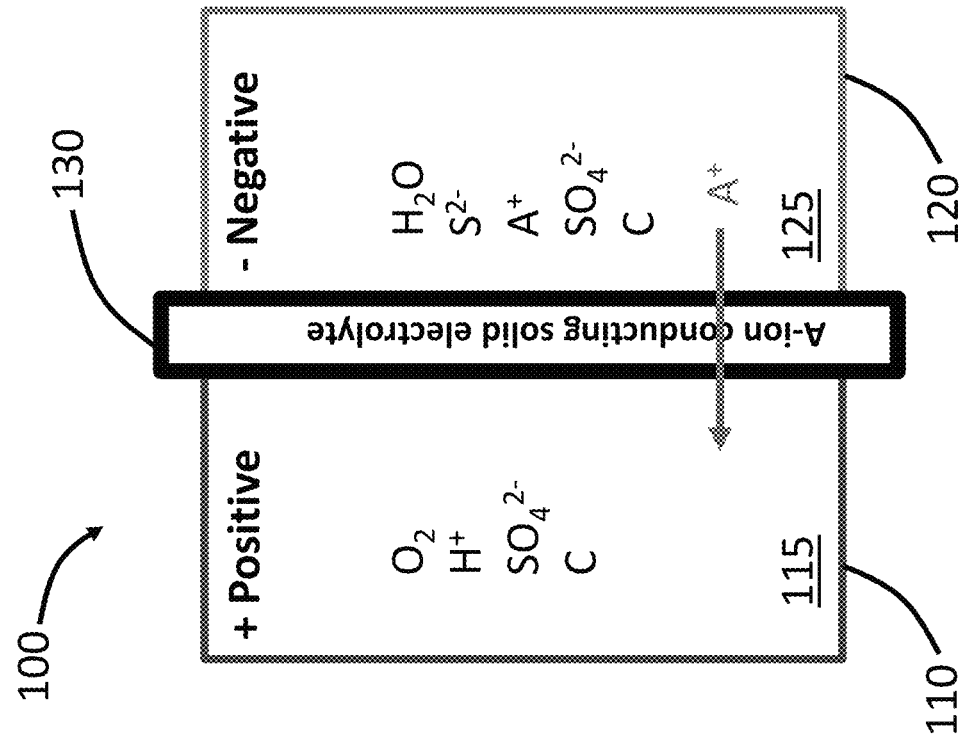
FIGS. 1 and 2 show schematics of an electrochemical apparatus using sulfur for energy storage.
Figure 2:
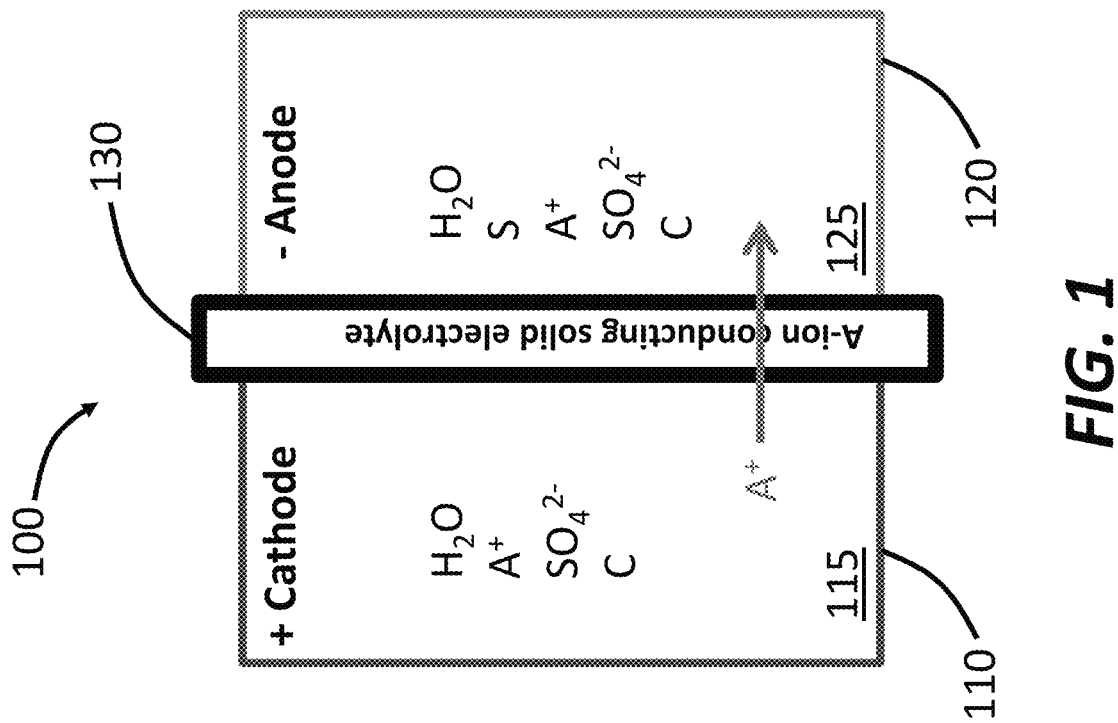

FIGS. 1-2 show schematics of an electrochemical apparatus 100 using sulfur for energy storage. The apparatus 100 includes a catholyte chamber 110 containing a catholyte 115 and an anolyte chamber 120 containing an anolyte 125. A separator 130 is disposed between the catholyte 115 and the anolyte 125. The catholyte 115 includes at least one metal salt dissolved in water, thereby providing at least one metal ion (also referred to as working ion). The anolyte 125 includes a polysulfide solution. Examples of polysulfide can include Li$_2$S$_x$ and Na$_2$S$_x$, where x can be about 1 to about 8 (e.g., about 1 to about 8, about 2 to about 7, about 2 to about 5, or about 3 to about 6, among others).

FIG. 1 shows the charging process of the electrochemical apparatus 100. The reactions in the catholyte 115 include $2H_2O \rightarrow O_2\uparrow + 4H^+ + 4e^-$, and the reactions in the anolyte include $S + 2e^- \rightarrow S^{2-}$, where A$^+$ is the working ion (for example Na$^+$ or Li$^+$) and transports from left to right (from catholyte 115 to anolyte 125). Therefore, during the charging process, water in the catholyte 115 is decomposed into oxygen gas and sulfur in the anolyte 125 acquires electrons via reduction reaction. Note that the catholyte 115 shown in FIGS. 1-2 is acidic for illustrating purposes. In practice, alkaline catholyte can also be used (discussed in detail below).

FIG. 2 shows the discharging process of the electrochemical apparatus 100. The reactions on the cathode include $O_2 + 4H^+ + 4e^- \rightarrow 2H_2O$, and the reactions in the anolyte include $S^{2-} \rightarrow S + 2e^-$, where the working ion A$^+$ transports from the anolyte 125 to the catholyte 115. Therefore, during the discharging process, oxygen in the catholyte 115 is recombined into water and sulfur in the anolyte 125 loses electrons via oxidation reaction. FIGS. 1 and 2 together illustrate that the full cell reaction is: $2S + 2A_2SO_4 + 2H_2O \leftrightarrows 2A_2S + O_2\uparrow + 2H_2SO_4$.

The cell voltage of the electrochemical apparatus 100 depends on the pH value of the catholyte and the potential difference between the reactions in the catholyte 115 and in the anolyte 125. In acidic catholyte, the reaction on in the catholyte 115 is $2H_2O \leftrightarrows O_2\uparrow + 4H^+ + 4e^-$, and the chemical potential $E_c^0$ is about 1.229 V vs. SHE (i.e. standard hydrogen electrode). In the anolyte 125, the reaction is $S+2e^- \leftrightarrows S^{2-}$, and the chemical potential $E_A^0$ is about −0.447 V vs. SHE. Therefore, the cell voltage of the electrochemical apparatus 100 using acidic catholyte 115 is about 1.7 V cell.

In alkaline catholyte, the reaction in the catholyte 115 can be $4OH^- \leftrightarrows O_2\uparrow + 2H_2O + 4e^-$, and the chemical potential $E_C^0$ is about 0.401 V vs. SHE. The reaction in the anolyte 125 is $S+2e^- \leftrightarrows S^{2-}$, and the chemical potential $E_A^0$ is about −0.447 V vs. SHE. Therefore, the cell voltage of the electrochemical apparatus 100 using alkaline catholyte 115 is about 0.85 V.

Figure 3:
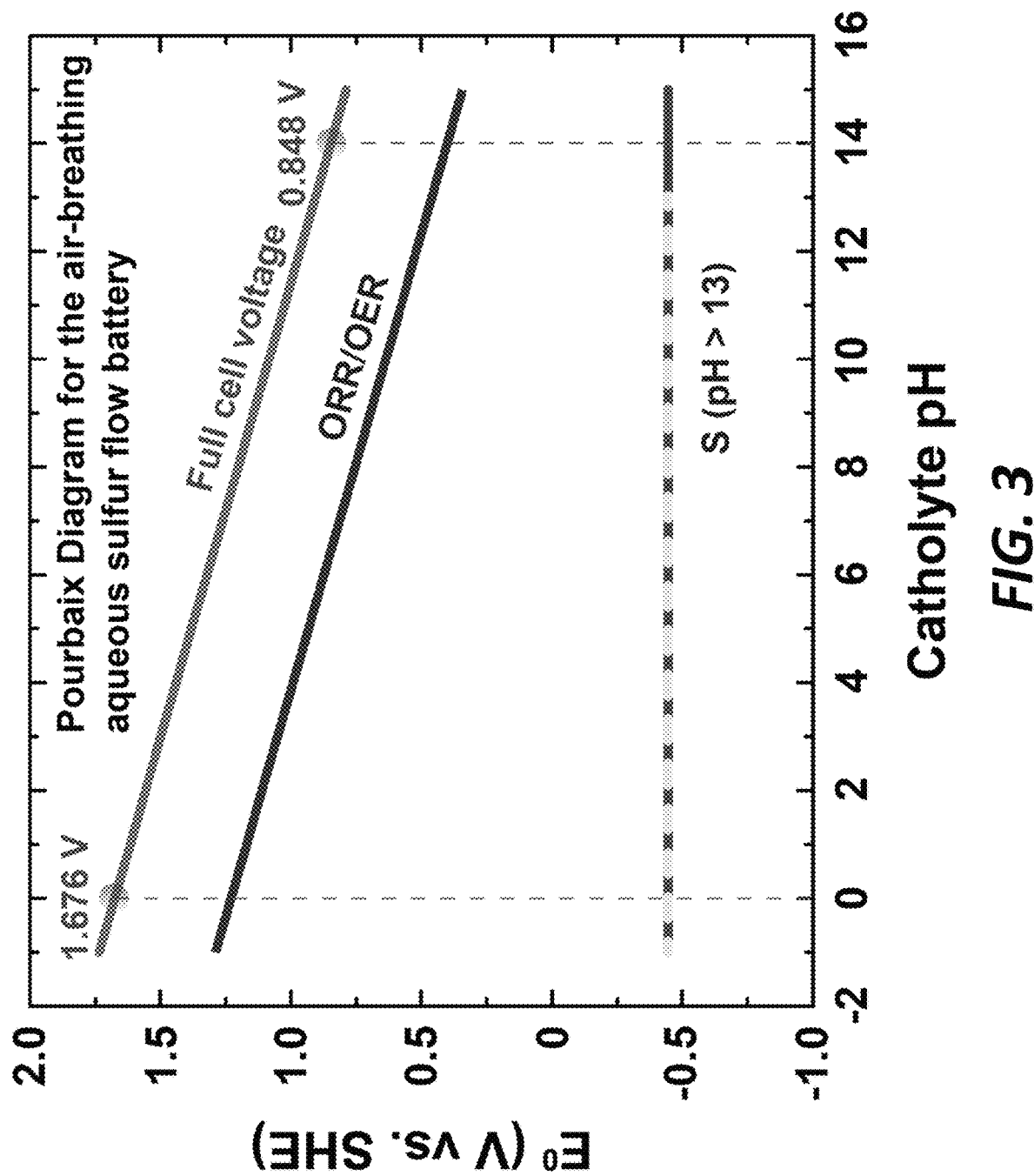
FIG. 3 shows a Pourbaix diagram of the electrochemical apparatus shown in FIGS. 1-2 illustrating the cell voltage as a function of the pH value of the catholyte.

FIG. 3 shows a Pourbaix diagram of the electrochemical apparatus 100 illustrating the cell voltage as a function of the pH value of the catholyte 115. As shown in FIG. 3, the cell voltage can be continuously adjusted between about 0.85 V (i.e. alkaline catholyte) and about 1.7 V (i.e. acidic catholyte) by changing the pH value of the catholyte. Other than the pH value of the catholyte 115, the cell voltage of the electrochemical apparatus can also be adjusted by changing the stage of $S^{2-}$ reduction process, the proton concentration $[H^+]$, and the oxygen partial pressure $P_{O_2}$.

The energy density of the electrochemical apparatus 100 can be calculated by taking into account first only the catholyte 115 and anolyte 125. In this case, without being bound by any particular theory or mode of operation, the energy density is determined by the product of the cell voltage and volumetric charge capacity. The volumetric charge capacity of the catholyte 115 can be determined by the solubility of the working ion salt in the instance where the apparatus 100 is assembled in the discharged state. For example, a $Li_2SO_4$ or $Na_2SO_4$ molar concentration of 3M can provide (3 moles/L)×(2 alkali ions)×($6.02 \times 10^{23}$ mole$^{-1}$)×($1.6 \times 10^{-19}$ C)=$5.78 \times 10^5$ C/liter=160.5 Ah/L volumetric charge capacity, which at an average cell voltage of 1.67V can yield a high energy density of 268 Wh/L for the catholyte 115 alone. 3

In the case where the anolyte 125 contains solid sulfur, the volumetric capacity of sulfur can be much higher than that of the catholyte 115, and the chemical energy density can be dominated by the catholyte.

Various types of ions can be used as the working ion $A^+$ in the electrochemical apparatus 100 for balancing the charges. In one example, the working ion can include one or more alkali ions $A^+$, where A can be a Group 1 metal, such as Li, Na, K, Rb, or Cs. In another example, the working ion can be a Group 2 alkaline earth ion, $B^{2+}$, such as Be, Mg, Ca, Sr or Ba, or another divalent metal ion. In yet another example, the working ion can include a trivalent metal ion including but not limited to $Al^{3-}$ or $Y^{3+}$.

The working ion $A^+$ can be provided by various methods. In one example, the working ion can be provided at least in part by a working salt on the cathode side. In this case, the electrochemical apparatus 100 can be assembled in the discharged state. For example, the electrochemical apparatus 100 can be assembled using dissolved alkaline salt, e.g., $A_2SO_4$, on the positive electrode side (i.e. in the catholyte). During charge, oxygen gas is evolved at the positive electrode and $H^+$ ions are simultaneously produced, lowering the pH of the catholyte 115. Simultaneously, the working ion $A^+$ is transported to the anode side and reacts with sulfur to produce a sulfide of the working ion, while electrons are being provided through the external circuit. For example, in the case of Li or Na as working ions, the sulfides formed can be one or more polysulfide species $A_2S_x$, which can be soluble in the anolyte, up to and including solid $A_2S$.

In another example, the working ion $A^+$ can be provided at least in part by a sulfide of the working ion on the anode side (i.e. the anolyte 125). For example, the electrochemical apparatus 100 can be assembled with a soluble polysulfide of Li or Na, or solid $Li_2S$ or $Na_2S$, in the anode chamber 120, and an acidic catholyte solution 115. In this case, the apparatus 100 can be assembled in the charged state. During discharge, the working ion is transported from anode chamber 120 to the cathode chamber 110, where the working ion displaces $H^+$ in the catholyte 115 and causes the formation of water via the reaction of $H^+$ with $O_2$ and the electrons are supplied through the external circuit.

In yet another example, the electrochemical apparatus 100 can be assembled in the partially charged state using both an acidic catholyte and an anode that contains a sulfide of the working ion.

In the cathode chamber 110, the acid or the salt that provides the working ion can have one or more of many possible anion groups, including but not limited to, sulfates, chlorides, nitrates, phosphates, citrates, acetates, or any other organic anion groups known in the art. In other words, the acidic catholyte solution 115 can contain sulfuric, hydrochloric, nitric, phosphoric, citric acid, acetic or organic acids such as carboxylic or sulfonic acids. The working ion salt can be a metal salt in which hydrogen in any one of these acids can be replaced by a working ion of the electrochemical apparatus 100.

In the anode chamber 120, the base or the salt that can provide the working ion can have one or more of many possible anion groups including but not limited to carbonate, sulfate, chloride, nitrate, phosphate, citrate, acetate, or other organic anion groups.

In one example, the catholyte 115 and/or the anolyte 125 can be a suspension. In another example, the catholyte 115 and/or the anolyte 125 can be a gel. The suspension and/or the gel can include a percolating network of an electronic conductor, which can increase electrochemical utilization and charge transfer rates. More information about using percolating network in electrodes can be found in U.S. Patent Application No. 61/903,574, U.S. Patent Application No. 61/903,739, U.S. Patent Application No. 61/789,964, and U.S. Patent Application No. 61/760,436, each of which is incorporated here by reference.

In some examples, the catholyte 115 and/or the anolyte 125 can include a redox mediator (e.g., LiI or NaI) that can increase charge transfer rates within the catholyte 115 and/or the anolyte 125. For example, the redox mediators can be effective in increasing Li—S reaction rates.

In some examples, the catholyte 115 can include an oxygen evolution reaction (OER) catalyst (e.g., $IrO_2$ or $RuO_2$) to lower the overpotential for oxygen gas formation. In some examples, the catholyte 115 can include an oxygen reduction reaction (ORR) catalyst (Pt black or $Pt_3Ni$) to lower the overpotential for oxygen reduction. The OER catalyst and/or the ORR catalyst can reduce cell polarization and increase the efficiency of the electrochemical apparatus 100.

In some examples, the catholyte 115 and/or the anolyte 125 can be stirred actively or passively, in order to circulate the reactants within the electrode chambers 110 and 125, respectively. The active stirring can be achieved by, for example, placing a stirring device (e.g., a three-blade propeller) in the storage vessel. The passive stirring can be achieved by, for example, pumps that circulate the electrolyte. The stirring or convection can have several benefits, including increasing the reaction kinetics, increasing the charge transfer rates, and lowering the polarization at the electrodes, thereby increasing the capacity utilization or efficiency of the electrochemical apparatus 100.

In some examples, the catholyte 115 can be aerated with oxygen or another gas to improve oxygen gas nucleation and removal during charging. The aeration can also improve oxygen mass transport to reaction sites for oxygen reduction during discharge.

In some examples, the catholyte 115 is aqueous and the sulfur anolyte 125 can use a non-aqueous solvent. The two electrodes (catholyte 115 and anolyte 125) can be separated by a solvent-impermeable membrane. The non-aqueous sulfur anode 125 can include compounds with metal-sulfur stoichiometry that may range from pure sulfur to $A_2S$.

In some examples, to avoid contamination of the catholyte 115 (e.g., in an open system), a filter can be incorporated into the apparatus 100 to exclude particulate matter as well as non-oxygen gaseous species such as nitrogen or carbon dioxide. In one example, the filter can be placed at the port where oxygen or air enters the cathode (e.g., vent 412 shown in FIGS. 4A-4B). In another example, the filter can be a separate subsystem where incoming gas is filtered before the gas is used in operation of the electrochemical apparatus 100. In yet another example, the entire electrochemical apparatus 100 can be enclosed in a container with a port through which all incoming gas is filtered. In yet another example, a compound can be used as an absorbent or getter of nitrogen or carbon dioxide in order to purify the gas system. For example, the compound can include an oxide that is a stronger carbonate former, such as $Na_2O$, CaO, or any other materials known in the art.

The separator 130 (also referred to as membrane) separating the catholyte 115 and the anolyte 125 includes a conductor of the working ion. In one example, the separator 130 can be a solid inorganic compound, such as the crystalline alkali-ion conducting compounds known as NaSICON or LiSICON, or glasses or glass-ceramic solid ionic conductors. In another example, the separator 130 can include a polymer ionic conductor such as Nafion, in which Li can be substituted in order to impart lithium ionic conductivity. In yet another example, the separator 130 can include an inorganic-organic composite material. In yet another example, the separator 130 can include a porous organic or inorganic compound filled with a liquid or polymeric ion conductor. The porosity of the separator 130 can be sufficiently small in size scale (including nano-porous materials) to conduct the working ion and exclude to a large extent the anion groups of the working salt and/or sulfur or the sulfides of the working ion.

The electrochemical apparatus 100 can further include current collectors (not shown in FIGS. 1-2). For example, the catholyte chamber 110 can include a cathode current collector in contact with the catholyte 115 and the anolyte chamber 120 can include an anolyte current collector in contact with the anolyte 125.

Various materials can be used for the current collectors. In one example, the current collectors can include a metal. In another example, the current collectors can include carbon. In yet another example, the current collectors can include metal oxide. In yet another example, the current collectors can include metal nitride. In yet another example, the current collectors can include metal carbide. In one example, the two current collectors can include the same material(s). In another example, the two current collectors can include different materials.

The current collectors can be selected to be chemically stable under the operating conditions of the electrochemical apparatus 100. For example, the catholyte 115 can be acidic and the cathode current collector can use acid-stable materials such as carbon-based materials. In another example, the anolyte 125 can experience basic operating conditions and can be rich in dissolved metal sulfides, in which case the anode current collector can use transition metals (e.g., cobalt or nickel), transition metal alloys (e.g., stainless steel), graphite, hard carbon, carbon fiber, reticulated carbon, disordered carbon, carbon blacks, fullerenes, graphene, graphene oxide, transition metal oxides, reduced titanium oxides, and/or indium tin oxide.

Various shapes and configurations can also be used for the current collectors. In one example, the current collectors can be configured as plates. In another example, the current collectors can include corrugated plates to increase the surface area. In yet another example, the current collectors can include fiber. In yet another example, the current collectors can include fabric. In yet another example, the current collectors can include fiber weave. In yet another example, the current collectors can include open cell foam. In yet another example, the current collectors can include sintered particulates. In yet another example, the current collectors can include packed particle beds.

As described above, chemical reactions in the catholyte 115 can create oxygen gas during the charging process of the electrochemical apparatus. For example, upon fully charging the 3M concentration catholyte, one L of catholyte produces 3 moles of $O_2$ gas, which at 300K and 1 atm pressure can occupy a volume of 73.89 L.

In one example, the electrochemical apparatus 100 can be configured as an open air-breathing system (see more details in FIGS. 4A-4B below). In this case, the produced oxygen can be vented to the external atmosphere.

In another example, the electrochemical apparatus 100 can be configured as a closed system as shown in FIGS. 1-2. The closed system can use an oxygen containment tank to store the oxygen in pressurized form. For example, a tank equal in volume to the catholyte 115 can store the oxygen produced at 74 atm in the above example, neglecting oxygen solubility in the catholyte itself, which is typically only about 40 mg/L=0.0025M at 25° C. at 1 atm pressure.

In yet another example, the apparatus 100 can be configured as a flow battery (see, e.g., FIG. 4 below), in which the catholyte 115 and the anolyte 125 can be circulated from at least one storage tank to the corresponding chamber (e.g., the catholyte chamber 110 and the anolyte chamber 120, respectively).

In yet another example, the electrochemical apparatus 100 can be configured as a semi-flow battery, in which one electrode is stationary and the other is flowed. For example, the catholyte 115 can be circulated between a storage tank and the catholyte chamber 110, while the anolyte 125 is maintained in the anolyte chamber 120. Alternatively, the anolyte 125 can be circulated between a storage tank and the anolyte chamber 120, while the catholyte 115 is maintained in the catholyte chamber 110.

The electrochemical apparatus 100 can operate within a wide range of temperatures from about 0° C. to about 100° C. (e.g., 0° C., 5° C., 10° C., 15° C., 20° C., 25° C., 30° C., 35° C., 40° C., 45° C., 50° C., 55° C., 60° C., 65° C., 70° C., 75° C., 80° C., 85° C., 90° C., 95° C., or 100° C., including any values and sub ranges in between). Therefore, the electrochemical apparatus 100 can be installed in various environmental conditions and operate with great environmental stability.

The electrochemical apparatus 100 can be used in various applications. For example, the electrochemical apparatus 100 can be used in seasonal energy storage, such as storing photovoltaic (PV) electricity generated during summertime (e.g., in the Northern Hemisphere) for winter use. In another example, the electrochemical apparatus 100 can be used to store PV electricity generated during daytime for night use. In yet another example, the electrochemical apparatus 100 can be used as emergency backup power.

FIGS. 4A and 4B show schematics of an electrochemical apparatus 400 configured as an open system using sulfur for energy storage. The apparatus 400 includes a catholyte chamber 410 containing a catholyte 415 and an anolyte chamber 420 containing an anolyte 425. A separator 430 is disposed between the catholyte 415 and the anolyte 425. The catholyte 415, the anolyte 425, and the separator 430 can be substantially identical to the catholyte 115, and anolyte 125, and the separator 130, respectively, shown in FIGS. 1-2 as described above.

The electrochemical apparatus 400 further includes a vent 412 in the catholyte chamber 410 for venting oxygen (or other gas such as air) in and out of the catholyte chamber 410. For example, during the charging process, oxygen generated during the decomposition of water can be removed from the catholyte chamber 410. In contrast, during the discharging process, oxygen or air can be pumped into to the catholyte chamber 410 to facilitate the reaction with H⁻ ions to generate water.

Figures 5A, 5B:
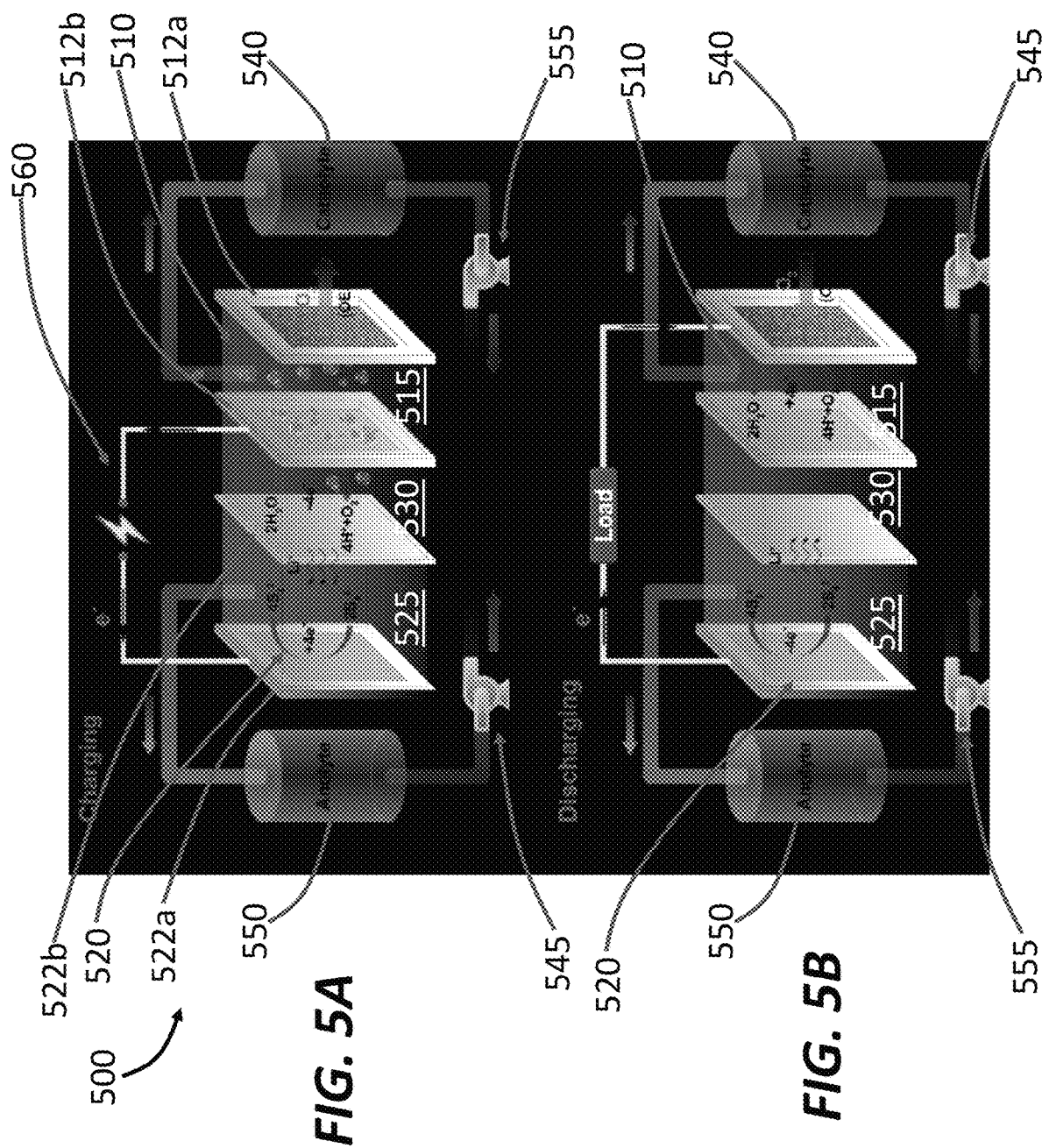
FIGS. 5A and 5B show schematics of an electrochemical apparatus configured as a flow battery using sulfur for energy storage.

FIGS. 5A-5B shows schematics of an electrochemical apparatus 500 configured as a flow battery using sulfur for energy storage. The electrochemical apparatus 500 can function as an ambient-temperature aqueous rechargeable flow battery that uses low-cost polysulfide chemistry in conjunction with lithium or sodium as the working ion, and an air- or oxygen-breathing cathode. The solution energy density can be about 30 to about 150 Wh/L, which exceeds current solution-based flow batteries, and the chemical cost of stored energy can be exceptionally low, especially when using sodium polysulfide (about 1 US$/kWh). Projected to system-level, this electrochemical apparatus 500 can have energy and power costs comparable to pumped hydroelectric storage (PHS) and underground compressed air energy storage (CAES) but can achieve higher energy density with less locational constraints.

The electrochemical apparatus 500 includes a catholyte chamber 510 containing a catholyte 515 and an anolyte chamber 520 containing an anolyte 525. A separator 530 is disposed between the catholyte 515 and the anolyte 525. The catholyte chamber 510 further includes two cathode current collectors 512a and 512b. The anolyte chamber 520 further includes two anode current collectors 522a and 522b. The electrochemical apparatus 500 further includes a catholyte storage tank 540 in fluidic communication with the catholyte chamber 510. A catholyte pump 545 is employed to circulate the catholyte 515 between the catholyte chamber 510 and the catholyte storage tank 540. Similarly, an anolyte storage tank 550 is also in fluidic communication with the anolyte chamber 520 and an anolyte pump 555 is employed to circulate the anolyte 525 between the anolyte chamber 520 and the anolyte storage tank 550.

The anolyte 525 in the apparatus 500 can include an aqueous polysulfide solution within which the working ions (e.g., $Li^+$ or $Na^+$) carry out sulfur redox reaction. The catholyte 515 can include an acidic or alkaline solution containing the working ion as a dissolved salt (e.g., $Li_2SO_4$ or $Na_2SO_4$). Upon charging, as shown in FIG. 5A, oxygen evolution occurs as [W] decreases to accommodate the loss of working ions. Upon discharging, as shown in FIG. 5B, oxygen reduction occurs, and the catholyte is enriched in working ions.

At the anolyte side, the current collector 522a is in contact with the anolyte 525 and also used to connect with an external circuit 560. At the catholyte side, dual cathodes configuration, including the two current collectors 512a and 512b, is used. During charging (FIG. 5A), current collector 512b with oxygen evolution reaction (OER) catalyst is connected with the external circuit 560, while the other current collector 512a is disconnected. During discharging (FIG. 5B), only the current collector 512a with oxygen reduction reaction (ORR) catalyst is connected with the external circuit 560, while the other current collector 512b is disconnected.

Unlike conventional rechargeable chemistries, the apparatus 500 pairs two half-reactions (i.e. polysulfide oxidation/reduction and OER/ORR), which do not share a common working ion. Specifically, during operation, $Li^+$ and $Na^+$ ions (or, in principle, any sulfide forming metal ion) can shuttle between the catholyte 515 and the anolyte 525 to maintain electro-neutrality. In the anolyte 525, these working ions can participate in the polysulfide redox reactions. In the catholyte 515, ions are generated or consumed by the oxygen electrochemistry, using water as both solvent and reactant. Since there is an excess of water, the reversible capacity of the electrochemical apparatus 500 can be determined by either the concentration of alkali metal-ions, or by the sulfur concentration in the anolyte 525, whichever is limiting.

The generation and consumption of protons (acid catholyte) and hydroxyls (alkaline catholyte) can lead to pH swings in the catholyte 515. In the alkaline catholyte case, hydroxyl crossover is not anticipated to be detrimental to performance. In the acid catholyte case, it can be helpful to confine the protons to the catholyte chamber 510 to prevent mixing with the alkaline anolyte 525. Note that this scheme is not a sulfur-air battery as there is no direct reaction between sulfur and oxygen.

Similar to the electrochemical apparatus 100 shown in FIGS. 1-2 and described above, the electrochemical apparatus 500 can be assembled in either the discharged state or the charged state. In one example, the electrochemical apparatus 500 can be assembled in either the discharged state, in which case the alkali metal working ion is provided by one of several possible low-cost salts, such as $Li_2SO_4$ and $Na_2SO_4$, dissolved in the catholyte 515. In another example, the electrochemical apparatus 500 can be assembled in the charged state, in which case the working ion is provided by lithium polysulfide or sodium polysulfide dissolved in the anolyte 525.

In practice, it can be beneficial to avoid or reduce $H_2S$ formation at the anolyte 525. To this end, adequately high pH can be maintained by the addition of a suitable base (e.g., LiOH or NaOH). The pH value of the anolyte 525 can be, for example, substantially equal to or greater than 9 (e.g., greater than 9, greater than 10, greater than 11, greater than 12, greater than 13, or greater than 14, including any values and sub ranges in between).

The catholyte 515 may be either acidic or alkaline, providing respectively at standard state the equilibrium cell voltages of ~1.68 V and ~0.85 V, as explained via the cell reactions:

Acidic Catholyte

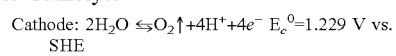
Cathode: $2H_2O \leftrightharpoons O_2\uparrow + 4H^+ + 4e^-$  $E_c^0 = 1.229$ V vs. SHE

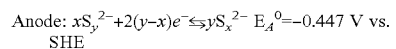
Anode: $xS_y^{2-} + 2(y-x)e^- \leftrightharpoons yS_x^{2-}$  $E_A^0 = -0.447$ V vs. SHE Alkaline Catholyte

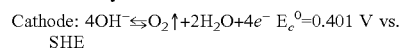
Cathode: $4OH^- \leftrightharpoons O_2\uparrow + 2H_2O + 4e^-$  $E_c^0 = 0.401$ V vs. SHE

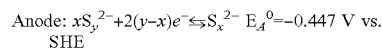
Anode: $xS_y^{2-} + 2(y-x)e^- \leftrightharpoons S_x^{2-}$  $E_A^0 = -0.447$ V vs. SHE In between these limits the equilibrium cell voltage can vary continuously with pH (see, e.g., FIG. 3 above). For example, at a neutral pH value, the cell voltage of the electrochemical apparatus 500 can be about 1.26 V.

Figure 6A:
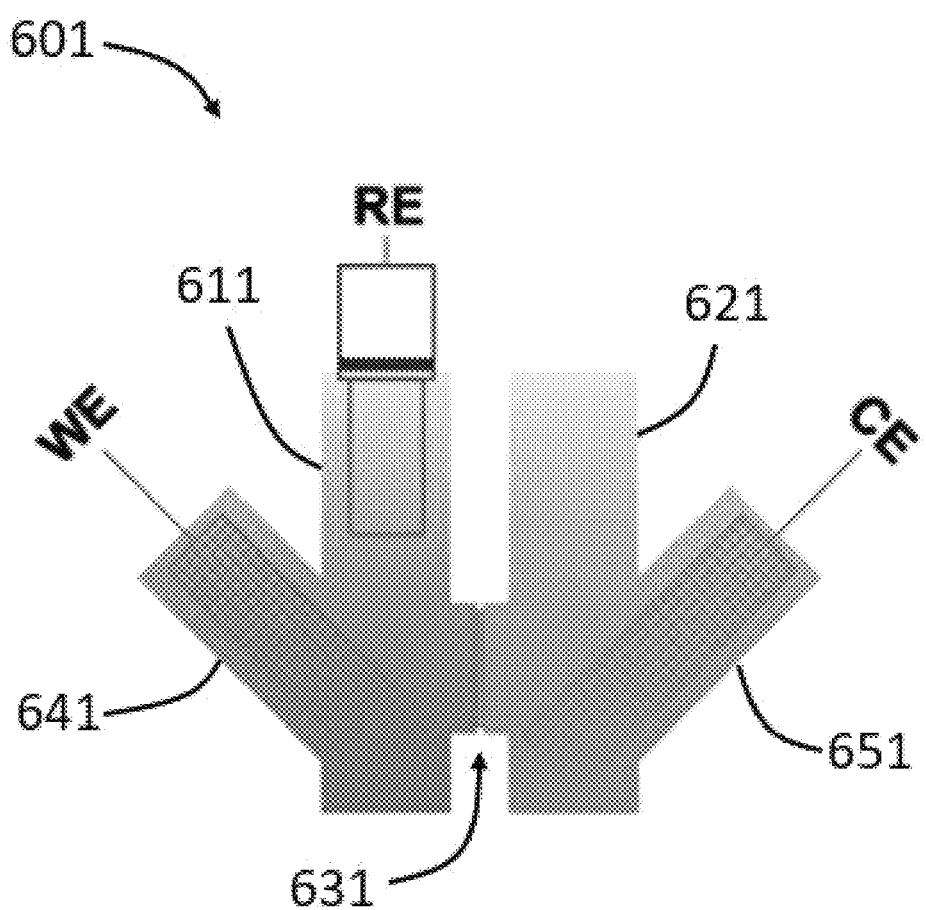
FIGS. 6A-6I show schematics and drawings of different air-breathing aqueous sulfur flow cell configurations.
Figure 6B:
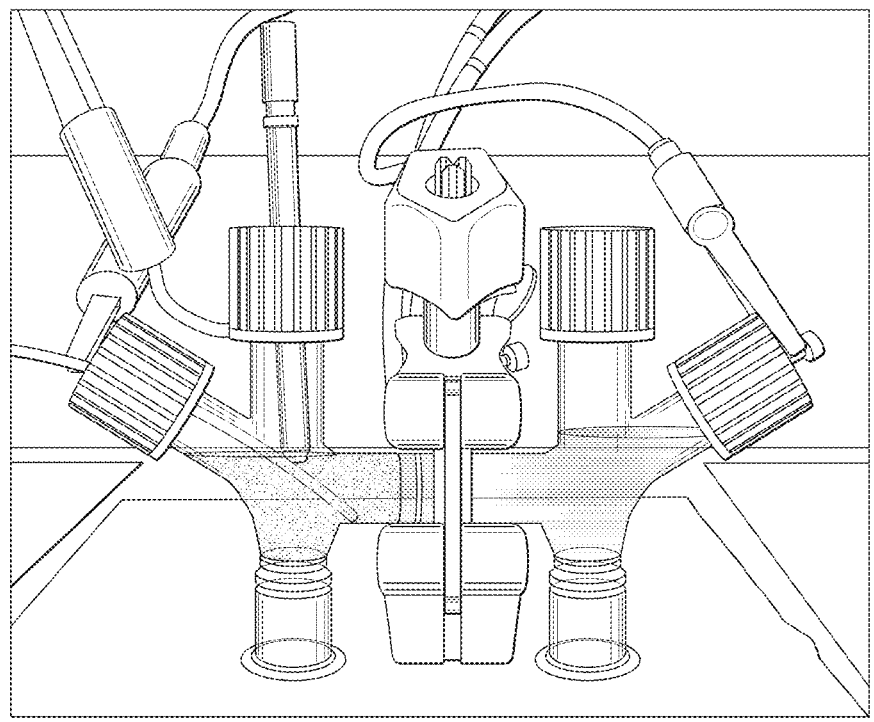

FIGS. 6A-6I show schematics and drawings of different air-breathing aqueous sulfur flow cell configurations. FIG. 6A shows a schematic of a standard H-cell 601. FIG. 6B is a drawing of the standard H-cell shown in FIG. 6A. The standard H-cell 601 includes a catholyte chamber 611 to contain a catholyte and an anolyte chamber 621 to contain an anolyte. A separator 631 is disposed between the catholyte chamber 611 and the anolyte chamber 621. The catholyte chamber 611 is in fluidic connection with a catholyte tube 641 and the anolyte chamber 621 is in fluidic connection with an anolyte tube 651. The two tubes 641 and 651 can transport the electrolytes into and out of the corresponding electrolyte chamber.

In some examples, the separator 631 can have a cell membrane area of about 1.5 cm$^2$ and the electrolyte volume can be about 5 mL (the catholyte and the anolyte have substantially similar volumes). The standard H-cell 610 can be used for shallow-cycling tests to validate the half-cell reactions and to characterize voltage efficiency. In the cell 601, the small membrane area relative to electrolyte volume, 0.3 cm$^{-1}$, can restrict the total current through the membrane and therefore cycle time can be long.

Figure 6C:
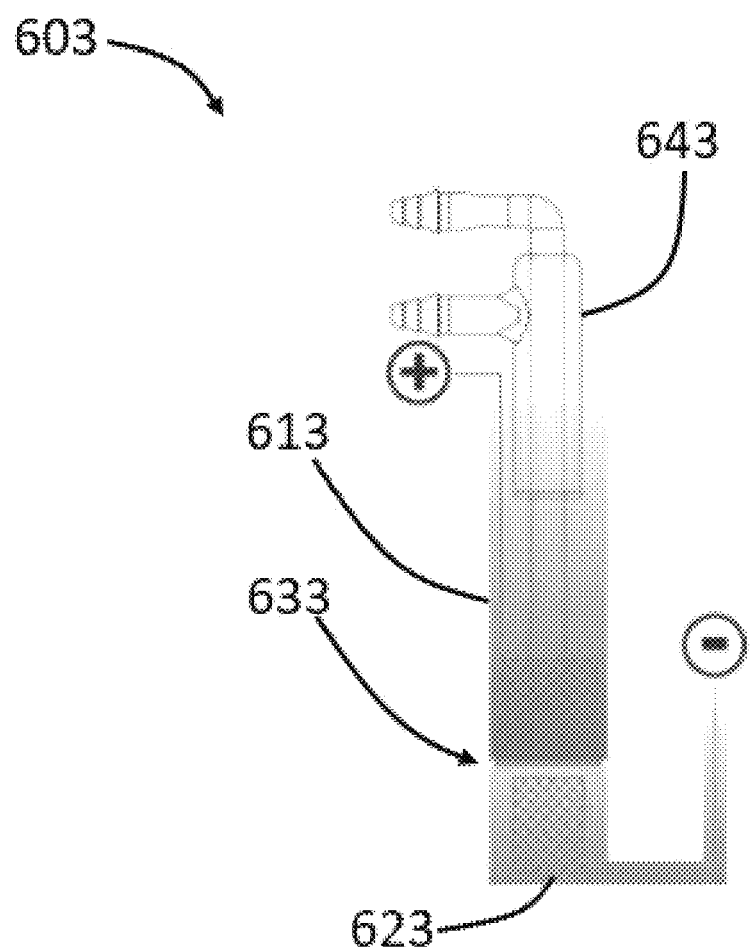
Figure 6D:
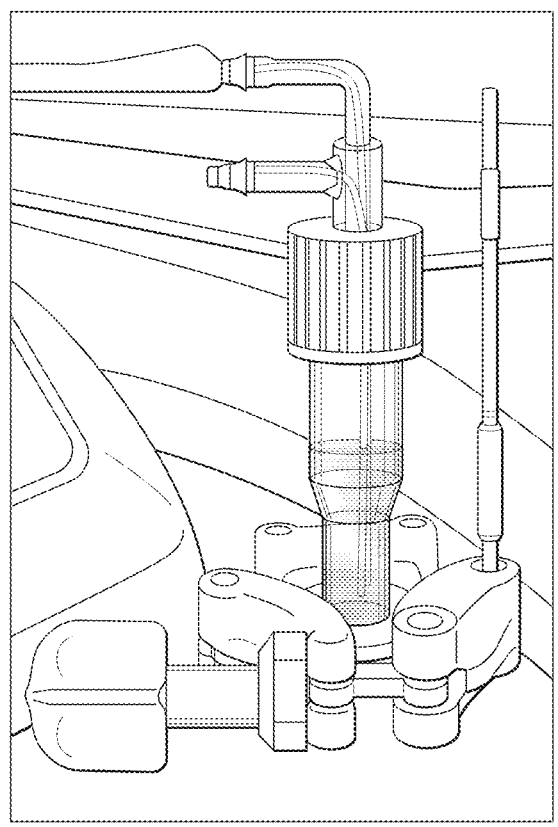

FIG. 6C shows a schematic of a modified H-cell 603 for long-term cycling of catholyte. FIG. 6D is a drawing of the modified H-cell shown in FIG. 6C. The modified H-cell 603 includes a catholyte chamber 613 connected to a catholyte tube 643. The modified H-cell also includes an anolyte chamber 623 and a separator 633 to separate the catholyte chamber 613 and the anolyte chamber 623.

Figure 6E:
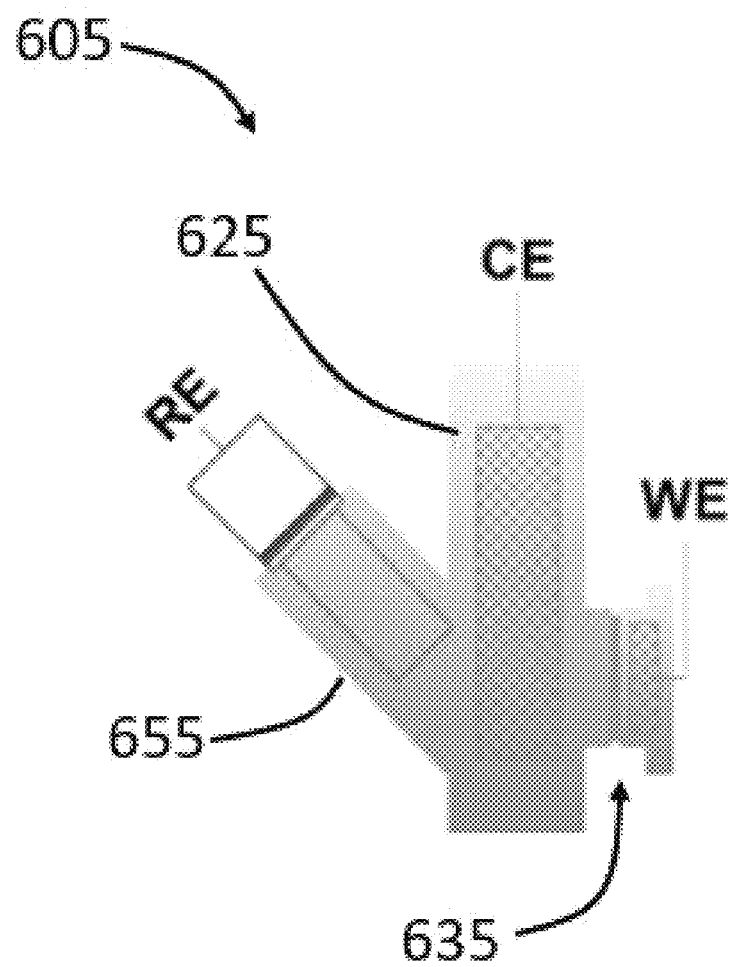
Figure 6F:
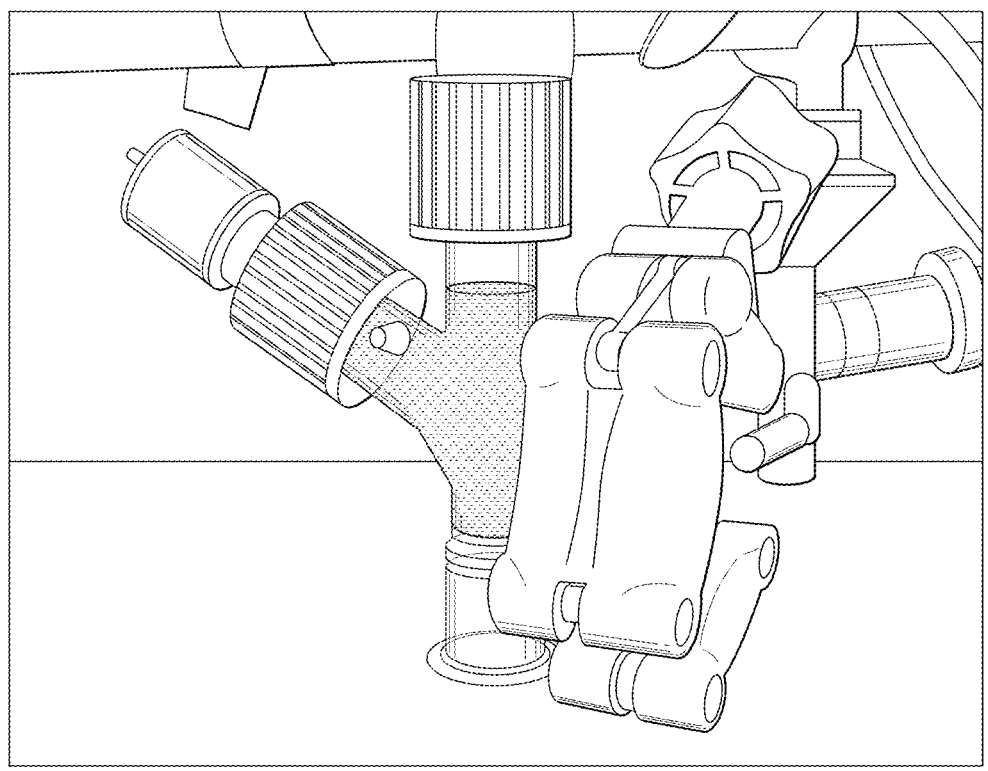

FIG. 6E shows a schematic of a modified H-cell 605 for long-term cycling of anolyte. FIG. 6F is a drawing of the modified H-cell shown in FIG. 6E. The modified H-cell 605 includes an anolyte chamber 625 connected to an anolyte tube 655 for cycling of the anolyte contained in the anolyte chamber 625. A separator 635 is in contact with the anolyte chamber 625 to separate the anolyte chamber from a catholyte chamber (not shown in FIG. 6E).

The two modified H-cells 603 and 605 have tenfold higher membrane to electrolyte ratio of 3 cm$^{-1}$, compared to the standard H-cell 601. The modified H-cells 603 and 605 can be used for deep cycling tests of the catholyte and the anolyte, respectively. The general procedure to assemble the non-flowing cells 604 and 605 can be as follows. The LiSICON or NaSICON membrane can be sandwiched between two silicon O-rings that are attached to the glass chambers. The assembly can be held together by a clamp to ensure good sealing. The cell chambers can be filled with catholyte and anolyte before inserting the electrodes. For the aqueous sulfur side, the electrodes can be fixed on the cap and further sealed with epoxy resin to ensure air-tight condition.

Figure 6G:
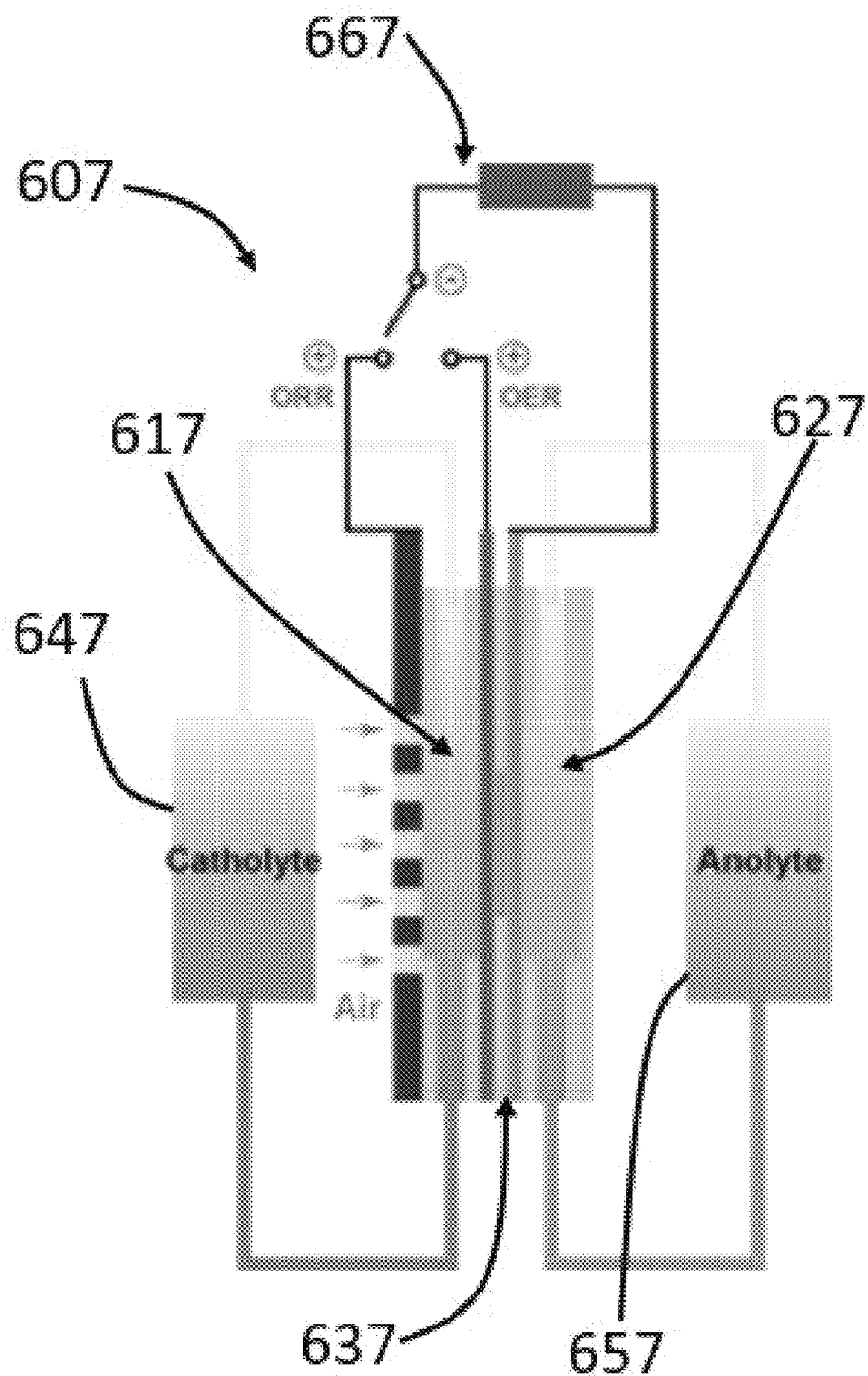
Figure 6H:
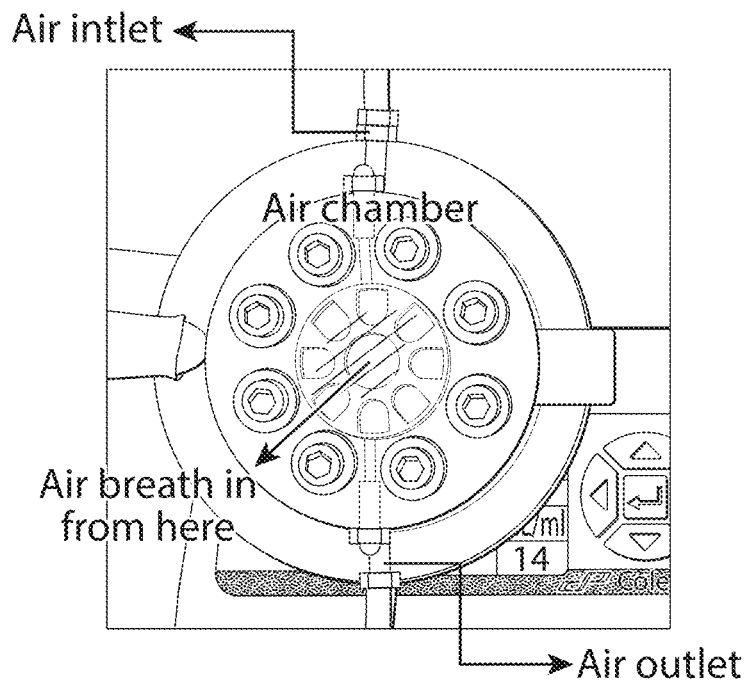
Figure 6I:
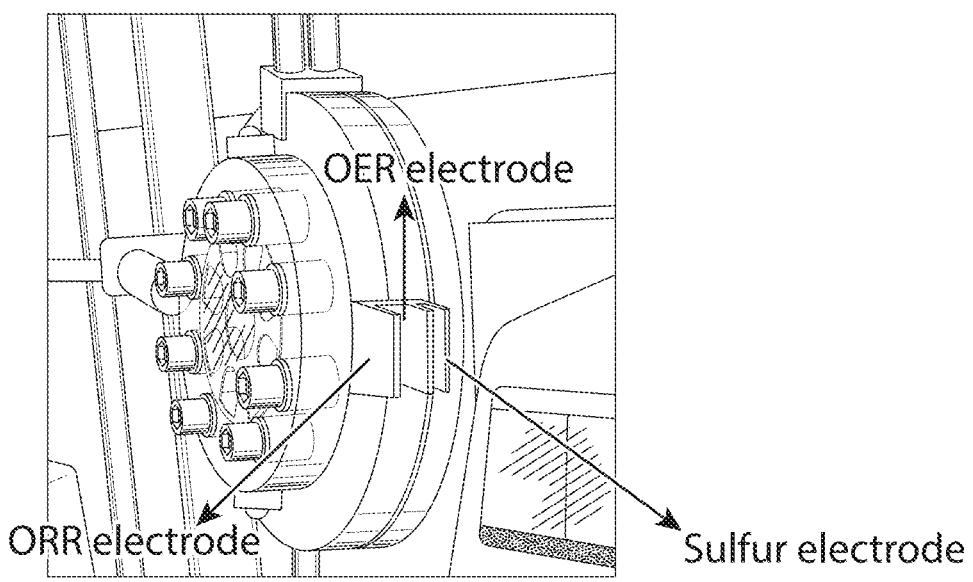

FIG. 6G shows a schematic of a flow cell 607 with both gas and liquid flow and FIGS. 6H-6I are drawings of the flow cell shown in FIG. 6G. The flow cell 607 includes a catholyte chamber 617 connected to a catholyte storage tank 647 and an anolyte chamber 627 connected to an anolyte storage tank 657. A separator 637 is disposed between the catholyte chamber 617 and the anolyte chamber 627. An external circuit 667 is connected to current collectors that are in contact with the catholyte and anolyte.

The flow cell 607 includes a gas diffusion layer (GDL) modified with Pt/C (50 wt. % Pt on Vulcan, 0.2 mg$_{Pt}$/cm$^2$GDL) on a carbon microporous layer as the ORR cathode. A separate platinized titanium screen coated with IrO$_2$ (~0.1 mg/cm$^2_{geometric}$) can be used as the OER cathode. Dual cathodes configuration can be used for ORR and OER to avoid carbon corrosion during OER. Sulfided Ni mesh, which can be prepared by soaking Ni mesh in 1 M Li$_2$S$_4$+1 M LiOH solution at ~100° C. for 3 hours, can serve as the catalytic anode for the anolyte reactions. A peristaltic pump (Masterflex, Cole-Parmer), can be employed to circulate catholyte and anolyte through the electrode chambers at 1 mL/min. The dry air (Airgas, zero grade, total hydrocarbons <1 ppm) flow rate during discharge can be 10 mL/min, controlled with a gas flow meter (Cole-Parmer).

The standard H-cell 601 shown in FIG. 6A can be used to validate the half-cell reactions and to characterize voltage efficiency, whereas two modified H-cells 603 and 605 shown in FIGS. 6C and 6E with higher membrane area to electrolyte volume allow deep cycling tests of the catholyte and the anolyte respectively. All H-cells are non-flowing configurations. The air-breathing cell 607 with simultaneously flowing catholyte and anolyte can be used to demonstrate flow battery operation.

To catalyze OER/ORR at the catholyte side, the cells (601 to 607) can use different current collectors. In one example, the cells (601 to 607) can use a platinum mesh as a single cathode and bifunctional catalyst. In another example, the cells (601 to 607) can use the dual cathodes (Ti or Pt mesh), on which OER catalyst IrO$_2$ and ORR catalyst Pt black can be coated. At the anolyte side, the anode current collector can include a reticulated stainless steel or carbon foam wrapped stainless steel rod in the H-cells (601, 603, and 605) and a sulfide-treated Ni mesh in the flow cell 607.

A pH-separating membrane can be used as the separator (631, 633, 635, and 638) in the case of acidic catholyte and alkaline anolyte. For example, lithium superionic conductor (e.g., LiSICON membrane, from Ohara Corp., Sagamihara-Shi, Kanagawa, Japan) and sodium superionic conductor (e.g., NaSICON membrane, from Ceramatec, Salt Lake City, Utah, USA) for the Li$^+$ and Na$^+$ based chemistries, respectively, can be used as the separator. For alkaline catholyte, a polymeric membrane can be used, but LiSICON or NaSICON can be used as well.

The cells 601 to 607 can be characterized using acidic and alkaline catholytes, Li$^+$ and Na$^+$ working ions, and oxygen- and air-breathing cell configurations. In the characterization, anolyte concentrations of 4 moles S/L (equivalent to 8 moles electrons/L) can be used, although some experiments are conducted with 5 M S. These concentrations are still less than one-half the room temperature sulfur solubility limit. Note that typical aqueous flow batteries use active species concentrations of 1-2 M, and unlike sulfur most of these species cannot support multi-electron transfer.

Several types of reference electrodes can be used in electrochemical cells (601 to 607) with three-electrode configuration. Ag/AgCl reference electrode (e.g., from Bioanalytical Systems, Inc.) or Hg/Hg$_2$SO$_4$ Reference Electrode (e.g., from CH Instruments, Inc.) can be used at acidic catholyte side. Hg/HgO reference electrode (e.g., from CH Instruments, Inc.) can be used in the alkaline polysulfide solution. Carbon foam (e.g., Duocell® reticulated vitreous carbon foam, 3% normal density) sometimes can be used as the polysulfide anolyte current collector.

The catholyte can be prepared by dissolving Li$_2$SO$_4$ in 0.1 M or 0.5 M H$_2$SO$_4$ solution. The molar concentrations of Li$_2$SO$_4$ in the catholyte are specified in each experimental results discussed below. For anolyte, the $Li_2S_4$ solution can be prepared in the following steps. S, $Li_2S$, and LiOH can be mixed in a targeted mole ratio and added to deionized water. The LiOH can be used to adjust the solution pH. The mixture can be vigorously stirred in an air-tight bottle until a transparent yellowish solution is formed. Since alkali-metal polysulfide solutions usually contain a wide range of species, the $Li_2S_4$ anolyte refers to a solution nominally composed of an $S/Li_2S$ ratio of 3:1. For sodium-based catholyte and anolyte, sodium counterparts of the lithium salts can be used to prepare the solutions.

Electrochemical characterization of the cells 601 to 607 can be performed on Biologic VMP3 potentiostats. The test conditions for galvanostic charge/discharge are specified in each experimental results discussed below. A thermostated, stirred water-bath controlled to ±2° C. can be used to perform the electrochemical tests at elevated temperature. The non-flowing cells (601, 603, and 605) can be directly immersed in the water bath. For the flow cell 607, the cell reservoirs and flow cell power stack can be enclosed in a polyethylene bag and immersed in the water bath. A second thermocouple can be used to monitor the temperature at the cell stack.

Figure 7:
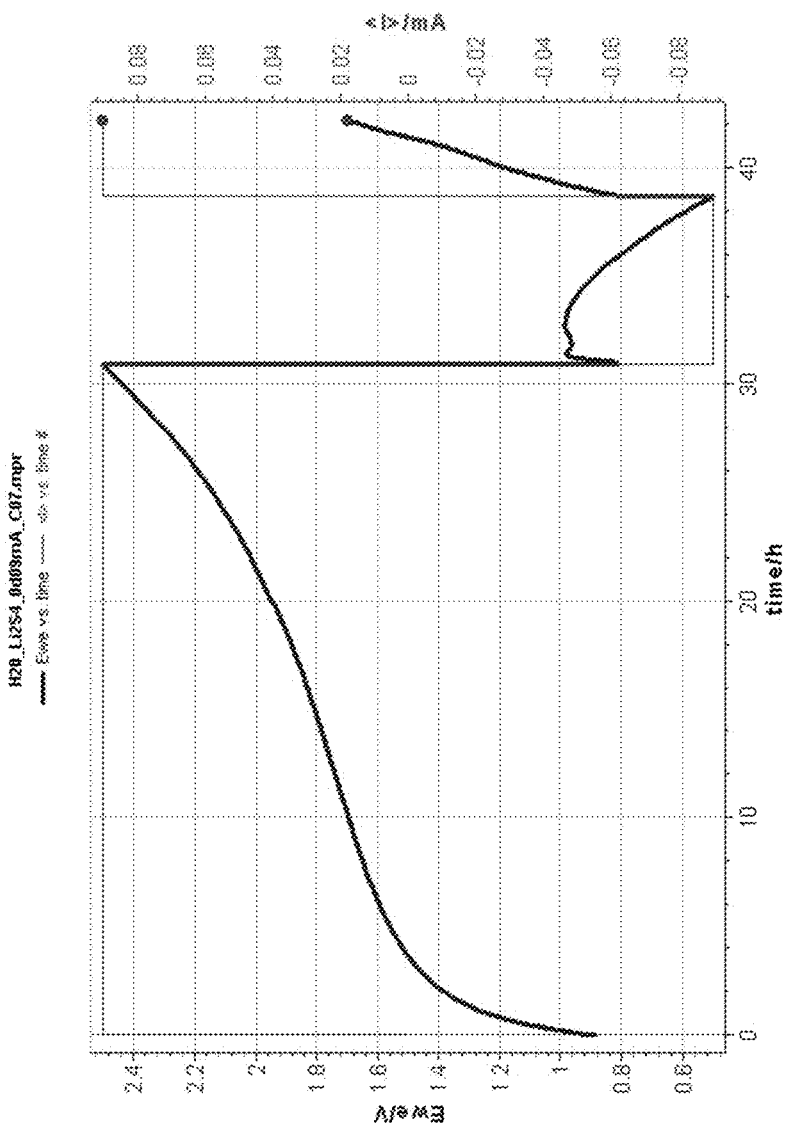
FIG. 7 shows a charge/discharge curve of an example electrochemical cell using sulfur for energy storage.

FIG. 7 shows a charge/discharge curve of a closed cell with the following experimental conditions. The cathode includes 5 vol % C, 1M $H_2SO_4$, and 1M $Li_2SO_4$. The anode includes 5% C, 2M $Li_2S_4$, and 0.25M LiOH. The separator includes Ohara Li-ion solid electrolyte. The cell test condition includes a current of about 0.09 mA and a voltage of about 0.5 V to about 2.5 V. FIG. 7 shows high polarization that is likely due to absence of catalyst. High OER overpotential is also observed.

To address the high polarization and high OER overpotential and lower voltage hysteresis, many possible low-cost catalysts based on transition metal compounds can be used. For example, permanganate compound (e.g., $KMnO_4$, $NaMnO_4$) added to cathode can be reduced to $MnO_2$ and serve as catalyst. In addition, $\alpha$-$MnO_2$ and $NiFeO_x$ can also be added to cathode as catalyst.

Figure 8:
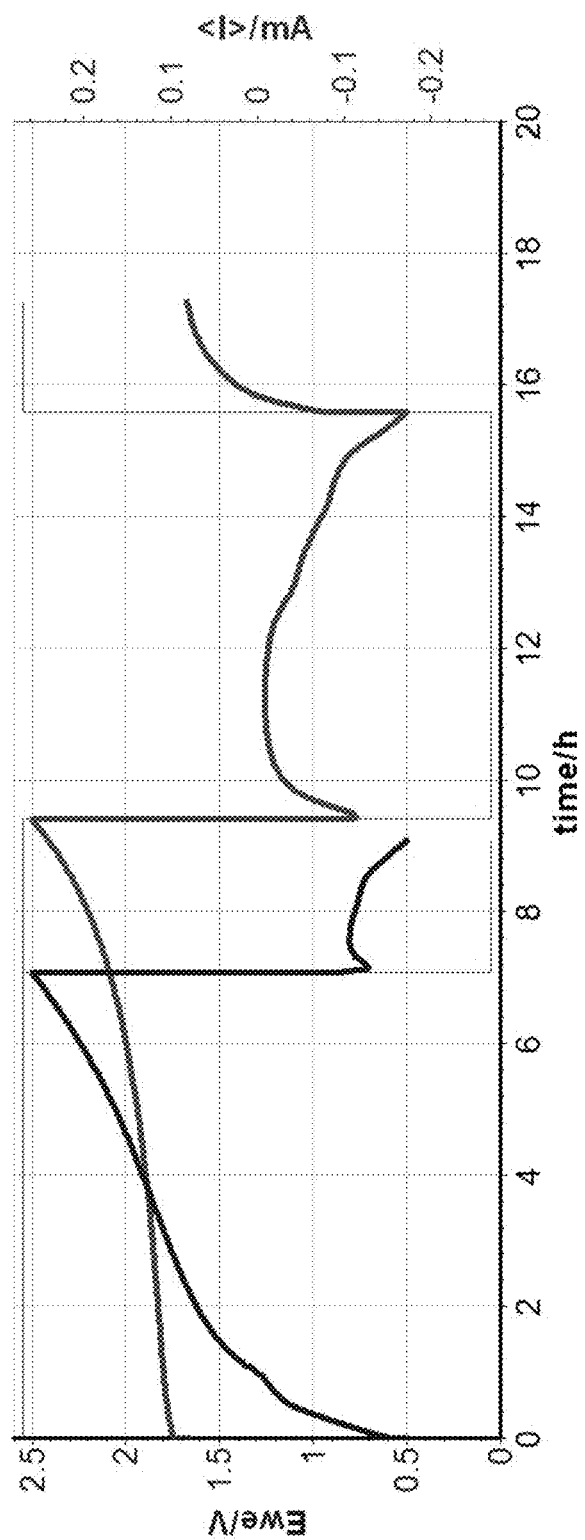
FIG. 8 shows a charge/discharge curve of an example electrochemical cell using sulfur for energy storage and catalyst on the cathode.

FIG. 8 shows charge/discharge curves of two electrochemical cells: Cell A and Cell B. Cell B has catalyst on the cathode while Cell A has no catalyst. The detailed experimental conditions are as below. In Cell A, the cathode includes 5 vol % C, 1M $H_2SO_4$, 1M $Li_2SO_4$, the anode includes 5% C, 2M $Li_2S_4$, 0.25M LiOH, and the separator includes Ohara Li-ion solid electrolyte. In Cell B, the cathode includes 2 vol % High Surface Area $\alpha$-$MnO_2$ as catalyst, 3 vol % C, 1M $H_2SO_4$, and 1M $Li_2SO_4$. The anode includes 5% C, 2M $Li_2S_4$, and 0.25M LiOH. The separator also includes Ohara Li-ion solid electrolyte. The cells are tested with a current of 0.27 mA and a voltage of about 0.5 V to about 2.5 V. The cathode chamber volume is about 83.9 $mm^3$ and the separator area is about 31.7 $mm^2$. As can be seen from FIG. 8, the charge/discharge curve of Cell B shows superior performance due to the catalyst included in the cathode.

Figure 9:
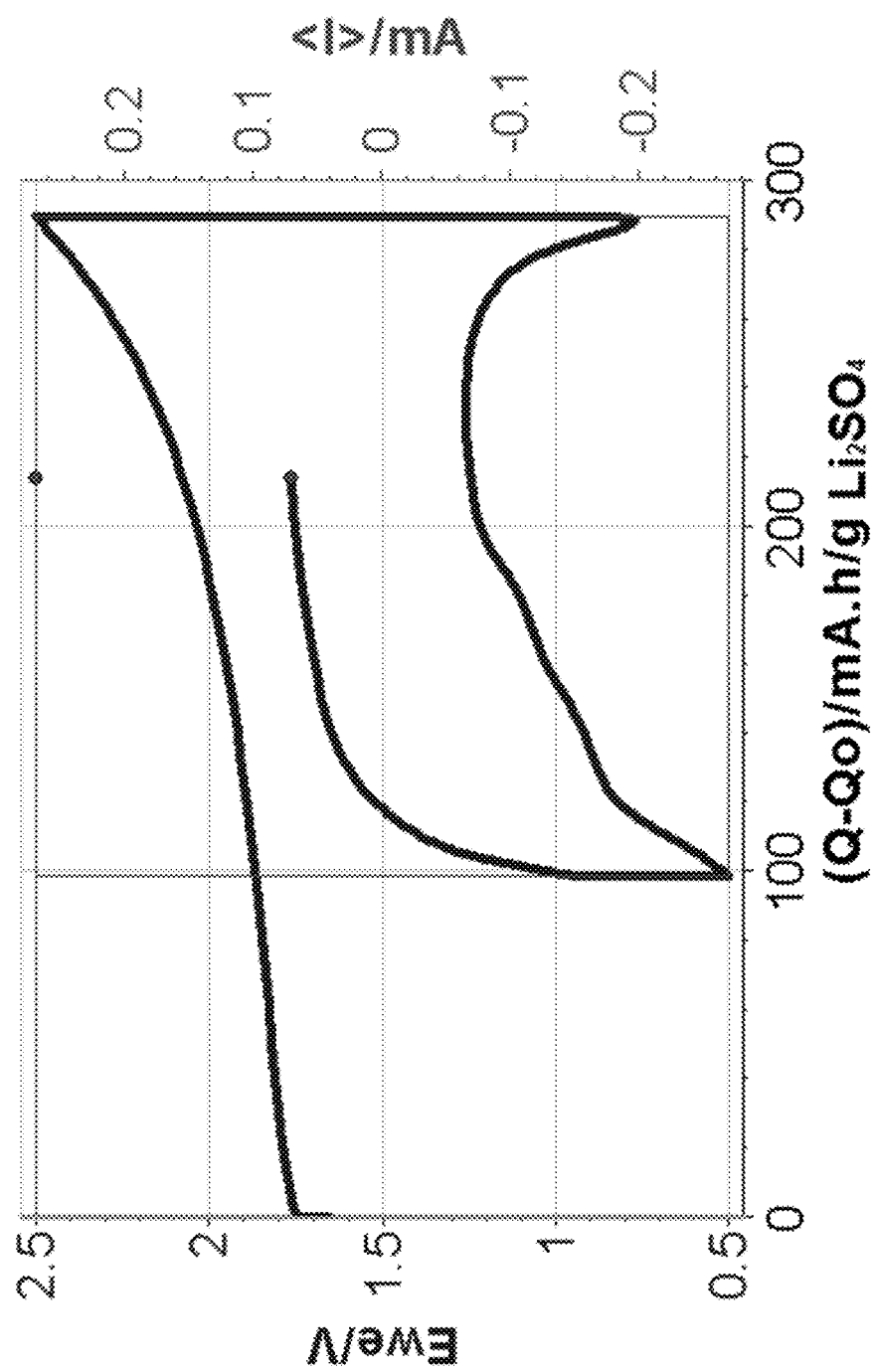
FIG. 9 shows output voltage of an electrochemical cell using catalyst on the cathode as a function of specific capacity (mAh/g).

FIG. 9 shows output voltage of Cell B as a function of specific capacity. The $Li_2SO_4$ theoretical capacity is about 492 mAh/g.

Figure 10A:
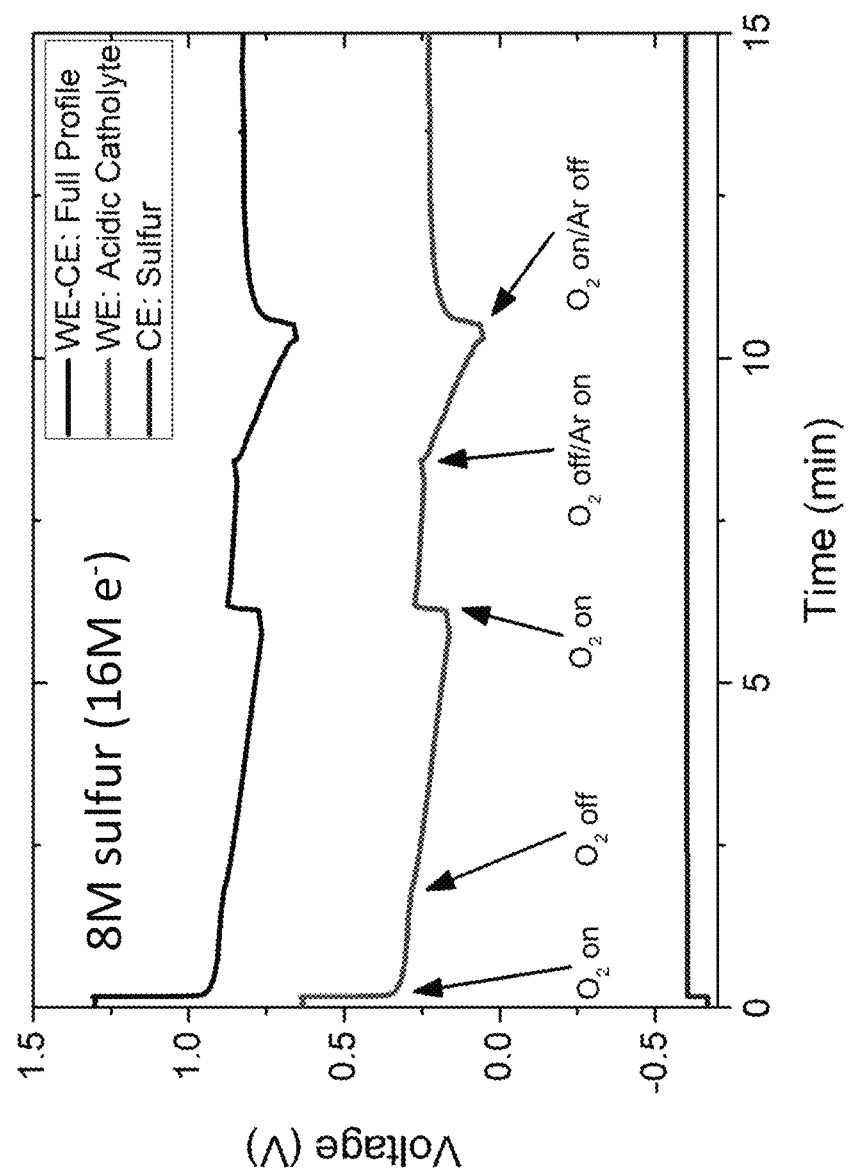
FIGS. 10A and 10B show charge/discharge curves of the standard H-cell shown in FIG. 6A to verify that OER/ORR occurs at the catholyte.
Figure 10B:
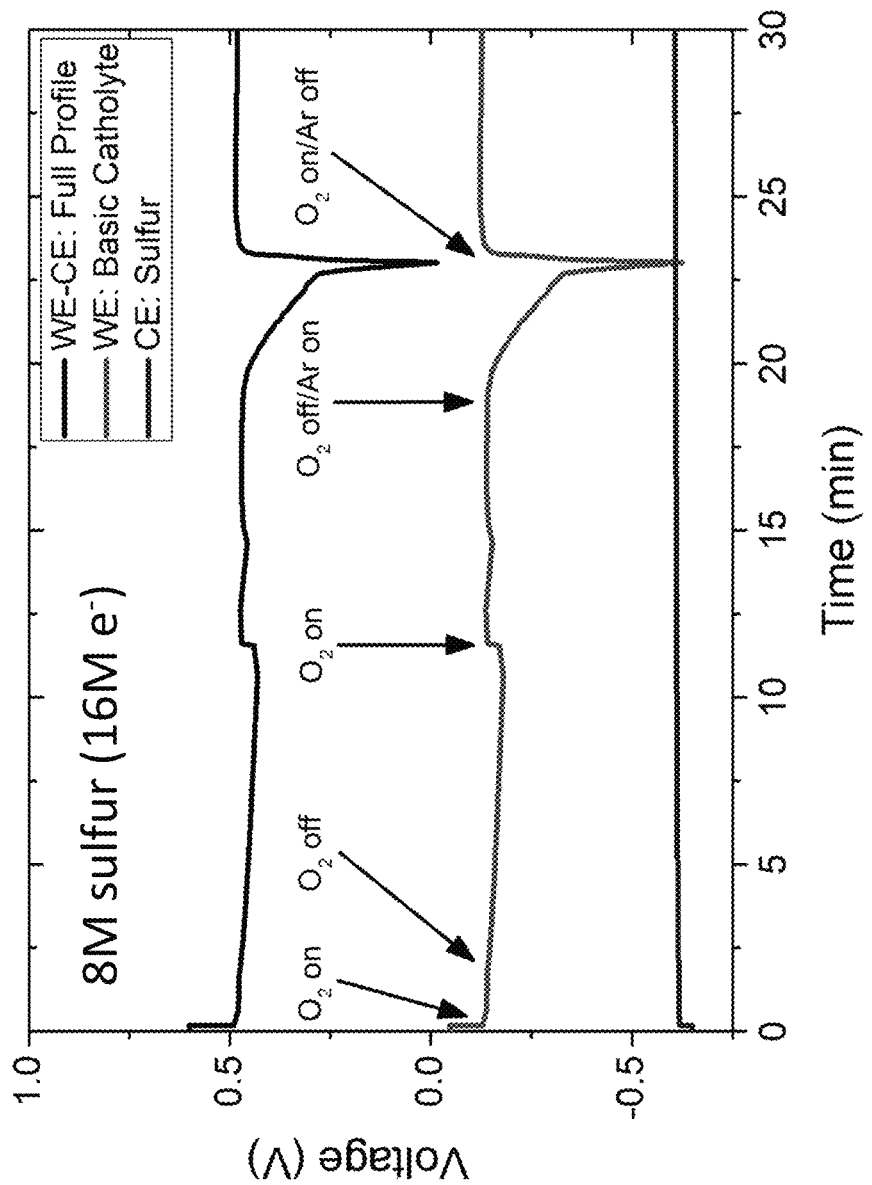

FIGS. 10A-10B show charge/discharge curves of the standard H-cell 601 shown in FIG. 6A to verify that OER/ORR occurs at the catholyte, as indicated by changes in cell voltage induced by changing gas composition or by cycling gas flow on and off. FIG. 10A shows the charge/discharge curve of the standard H-cell with acidic catholyte 1 M $H_2SO_4$+1 M $Li_2SO_4$ and FIG. 10 B shows the charge/discharge curve of the standard H-cell with alkaline catholyte 2 M LiOH. Pt meshes can be used as the single catholyte current collectors and carbon foam wrapped stainless steel as the anolyte current collector in anolyte 2 M $Li_2S_4$+0.25 M LiOH. The discharging current for both experiments is 0.065 $mA/cm^2$.

In order to test the catholyte half-reaction, three-electrode H-cells using Ag/AgCl (in 3 M KCl) reference electrode (RE) are galvanostatically discharged while flowing argon or oxygen through a dispersion tube into the catholyte. For both acidic (FIG. 10A) and alkaline (FIG. 10B) catholyte vs. 8 M sulfur (2 M $Li_2S_4$) anolyte, an immediate response in the voltage between the working electrode (WE) and the RE is seen when the type or flow rate of the gases is changed.

Since the proposed reaction during discharge is ORR, when oxygen ($O_2$) is off, a decrease in $O_2$ supply at the catholyte side can cause the cell voltage to drop, as seen in both FIGS. 10A and 10B. When the $O_2$ gas flow resumes, the cell voltage restores back to its original level. Then, when the $O_2$ gas is off and argon gas is dispersed into the catholyte, the voltage drops faster as dissolved $O_2$ is depleted. When argon is not used, ORR reaction consumes the dissolved $O_2$ resulting in a more moderate decrease in voltage. The clear responses to different gas supply conditions and $O_2$ concentration provide evidence that the oxygen reduction reaction is occurring. Note that the voltage between the sulfur counter electrode (CE) and the RE remains unchanged as the sulfur anolyte undergoes a very shallow SOC swing. These results, and those shown later, are consistent with an OER/ORR reaction at the catholyte side during cycling.

Figure 11:
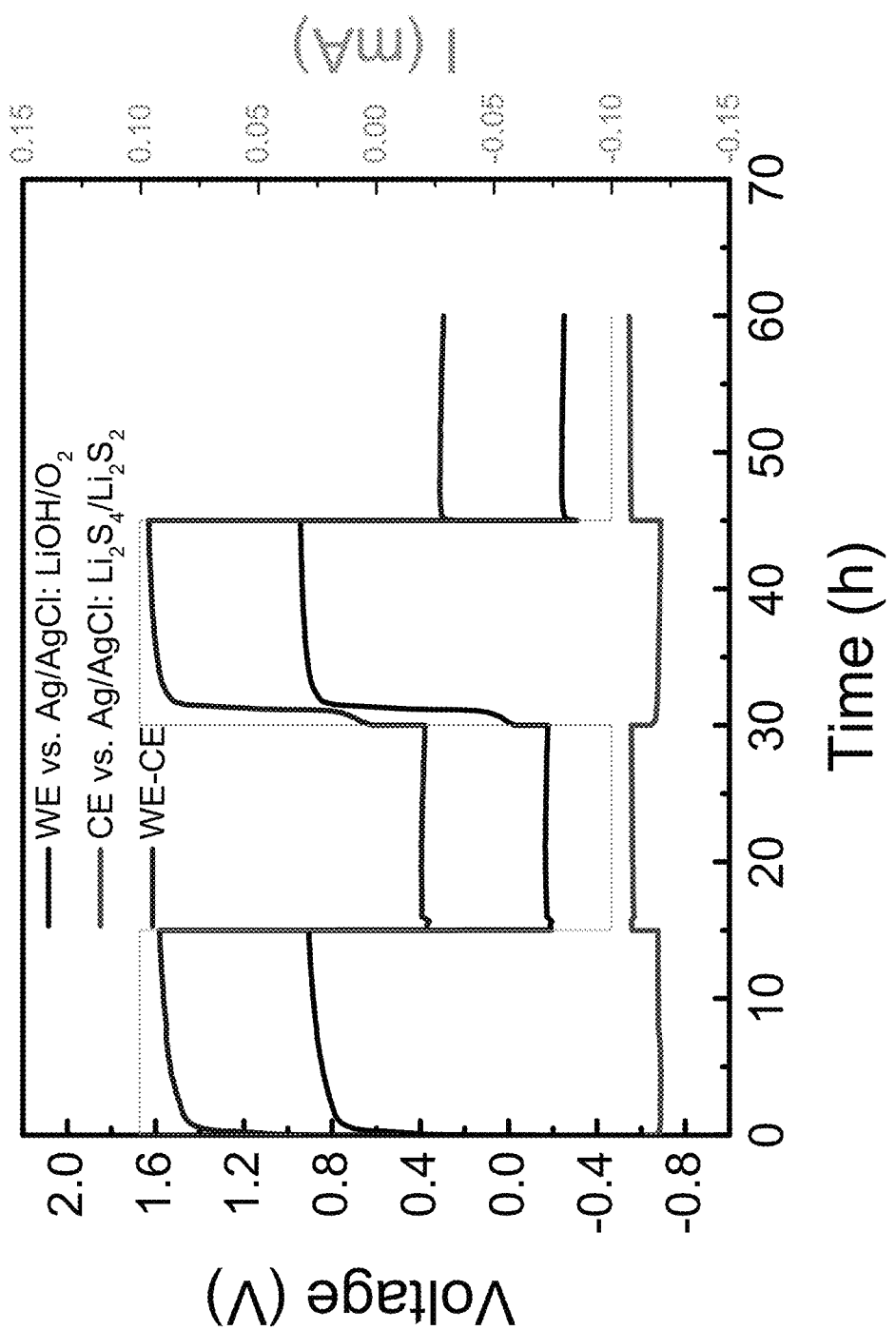
FIG. 11 shows charge/discharge curves of an electrochemical cell using alkaline catholyte and $Li^+$ as the working ion, confirming the ORR/OER reactions.

FIG. 11 shows charge/discharge curves of an electrochemical cell using alkaline catholyte and $Li^+$ as the working ion, confirming the ORR/OER reactions. The cathode includes a Pt mesh as the cathode current collector and 2M LiOH as the catholyte. The anode includes carbon foam/stainless steel (SS) as the anode current collector and 2M $Li_2S_4$ with 0.25M LiOH as the catholyte. The reference electrode includes Ag/AgCl in 3M KCl and the separator includes Ohara Li-ion solid electrolyte. The testing current is about 0.1 mA and the capacity utilization is about 2% state of charge (SOC). The testing cell is a cathode-limited cell with cathode chamber volume of about 4 mL and a separator area of about 1 $cm^2$.

Figure 12:
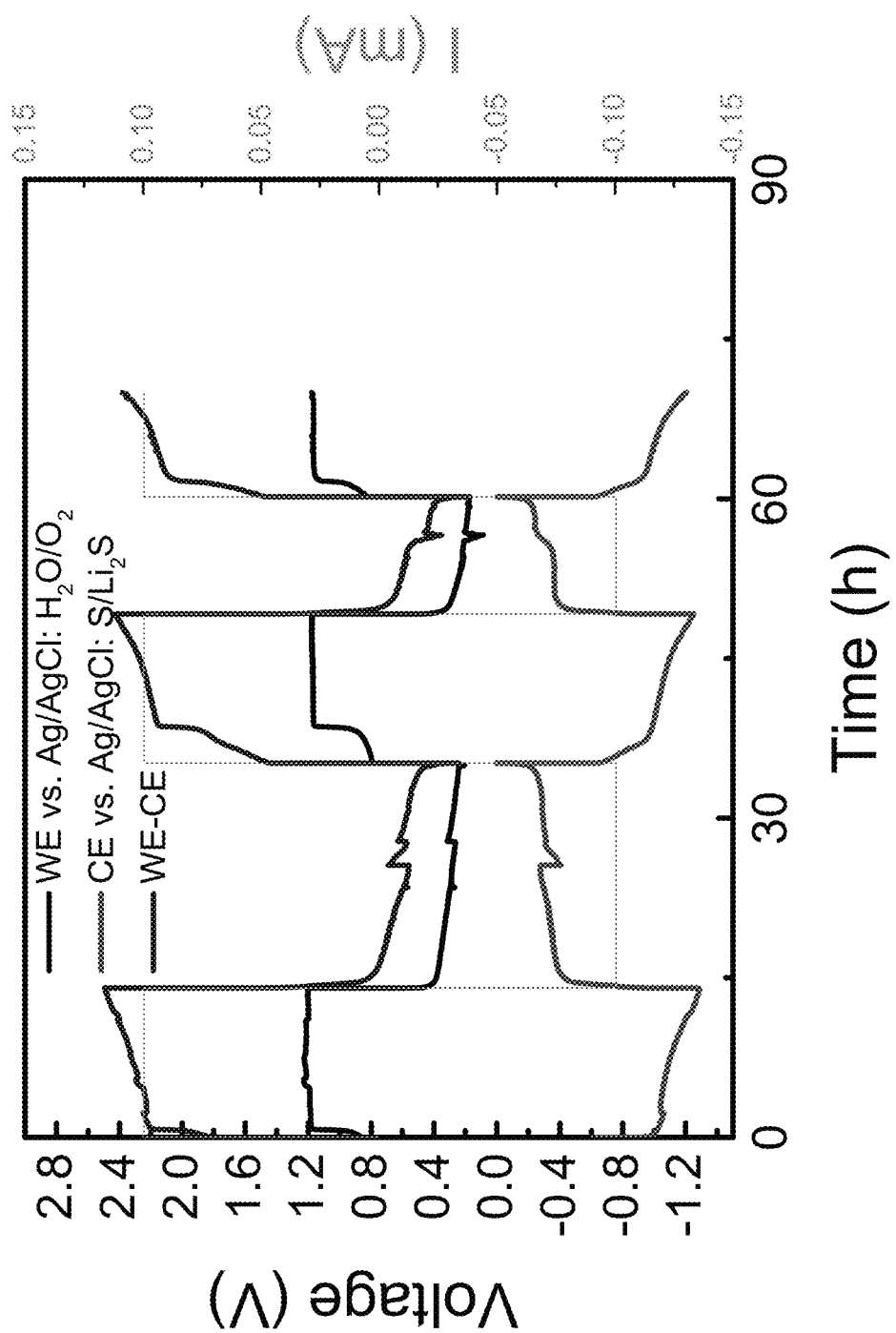
FIG. 12 shows charge/discharge curves of an electrochemical cell using acidic catholyte and $Li^+$ as the working ion, confirming the ORR/OER reactions.

FIG. 12 shows charge/discharge curves of an electrochemical cell using acidic catholyte and $Li^+$ as the working ion, confirming the ORR/OER reactions. The cathode includes a Pt mesh as the cathode current collector and 1M $H_2SO_4$ with 1M $Li_2SO_4$ as the catholyte. The anode includes carbon foam/SS as the anode current collector and 10 mM $Li_2S_4$ with 3M LiOH as the anolyte. The reference electrode includes Ag/AgCl in 3M KCl and the separator includes Ohara Li-ion solid electrolyte. The testing current is about 0.1 mA and the capacity utilization is about 2% state of charge (SOC). The testing cell is a cathode-limited cell with cathode chamber volume of about 4 mL and a separator area of about 1 $cm^2$.

Figure 13:
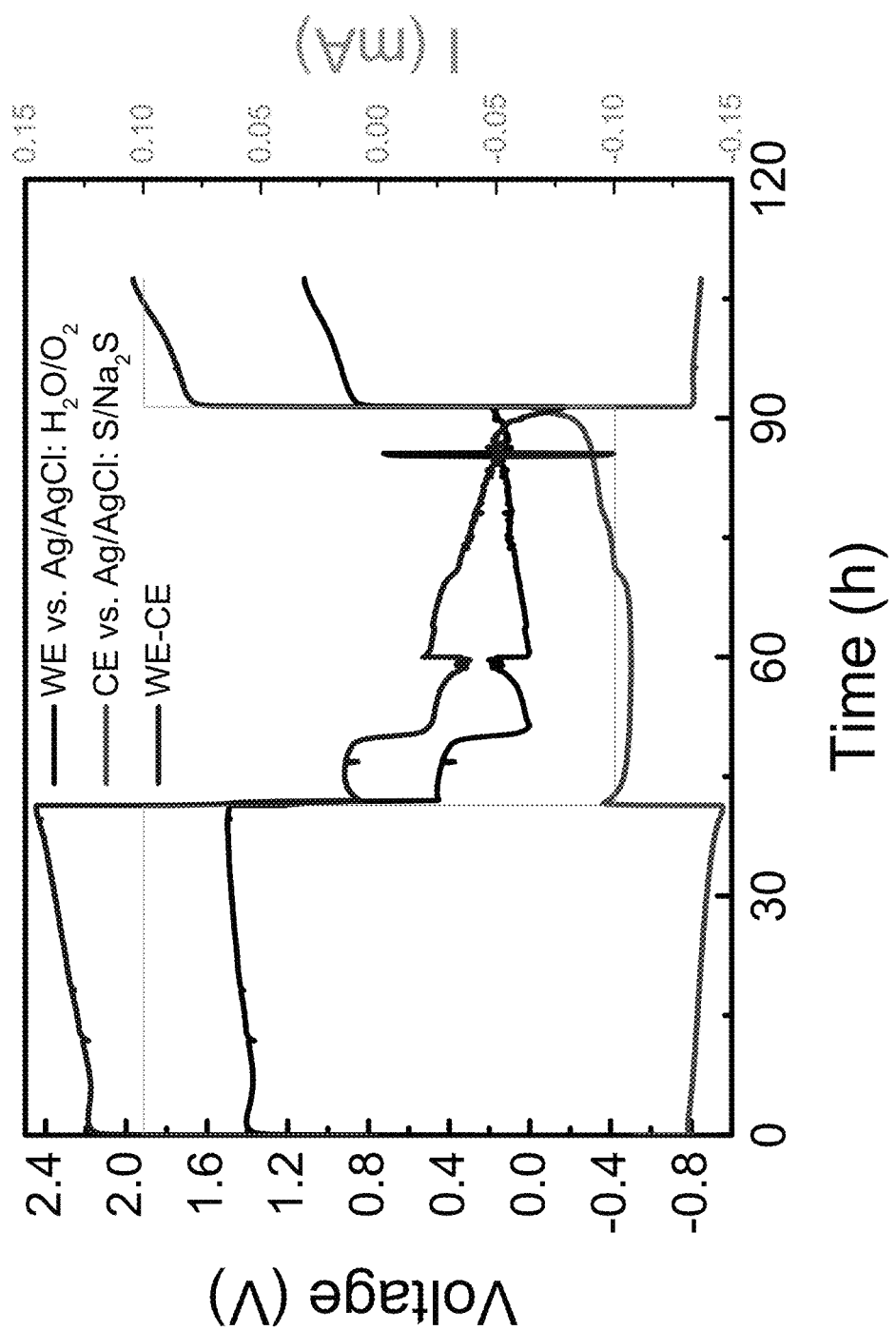
FIG. 13 shows charge/discharge curves of an electrochemical cell using acidic catholyte and $Na^+$ as the working ion, confirming the ORR/OER reactions.

FIG. 13 shows charge/discharge curves of an electrochemical cell using acidic catholyte and $Na^+$ as the working ion, confirming the ORR/OER reactions. The cathode includes a Pt mesh as the cathode current collector and 5M $NaNO_3$ as the catholyte. The anode includes a SS mesh as the anode current collector and 10 mM $Na_2S_4$, 2M NaCl, and 1M NaOH as the anolyte. The reference electrode is Ag/AgCl in 3M KCl and the separator includes Na-ion solid electrolyte. The testing current is about 0.1 mA. The anode S capacity utilization is 100% and the cathode capacity utilization is about 1%. The cell is an anode-limited cell with a cathode chamber volume of about 4 mL and a separator area of about 1 cm².

Figure 14:
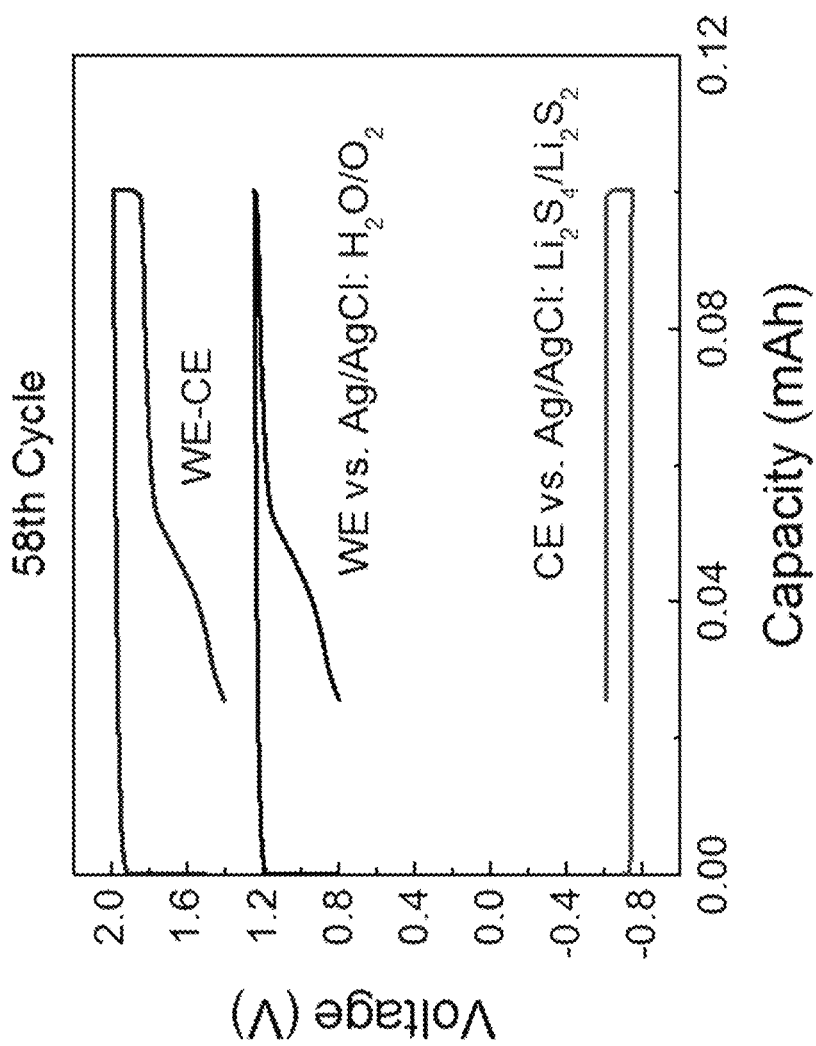
FIG. 14 shows charge/discharge curves of an electrochemical cell using Pt current collector, indicating reversible Pt oxide ($PtO_x$) formation on the current collector.

FIG. 14 shows charge/discharge curves of an electrochemical cell using Pt current collector, indicating reversible Pt oxide (PtOx) formation on the current collector. The catholyte includes 1M $H_2SO_4$ and 1M $Li_2SO_4$. The anode includes carbon foam/SS as the current collector and 2M $Li_2S_4$ with 0.25M LiOH as the catholyte. The reference electrode includes Ag/AgCl in 3M KCl and the separator includes Ohara Li-ion solid electrolyte. The testing is carried out with 0.1 mA current charge for 1 h and then discharge to 0.8V vs. Ag/AgCl.

Figure 15:
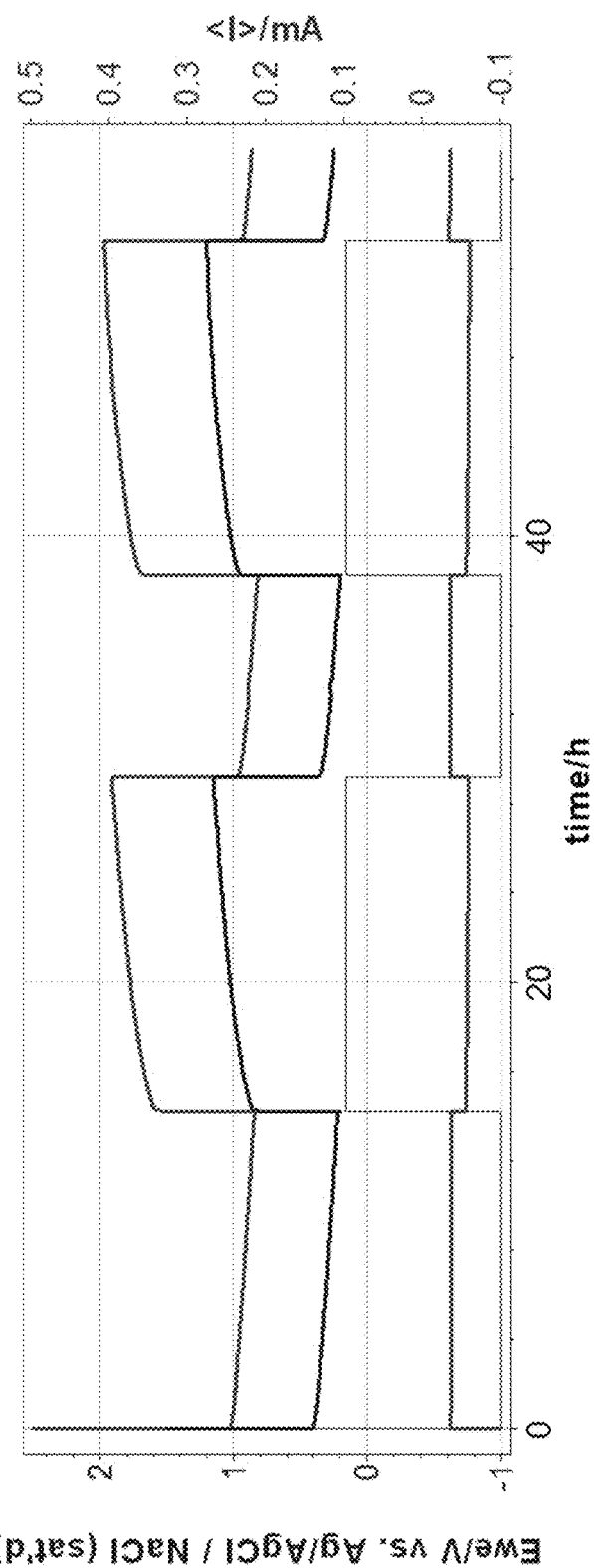
FIG. 15 shows charge/discharge curves of an electrochemical cell using suspension catholyte in an open system.

FIG. 15 shows charge/discharge curves of an electrochemical cell using suspension catholyte in an open system. The cathode includes Ti connect as the current collector. The catholyte includes 3 vol % Vulcane XC 72, 1M $H_2SO_4$, and 1M $Li_2SO_4$. The anode includes an SS connect as the current collector. The anolyte includes 2% C, 2M $Li_2S_4$, and 0.25M LiOH. The reference electrode is Ag/AgCl in 3M NaCl and the separator includes Ohara Li-ion solid electrolyte with silicone rubber seal. FIG. 15 shows that the working electrode (WE) potential range is below OER/ORR, possibly due to carbon oxidation or capacitive effect. In addition, the anode polarization can be reduced by using infinite current collector.

Other than the examples shown in FIGS. 7-15, two other examples are described here. The first example includes an acidic catholyte cell using Li and/or Na chemistry. For Li chemistry cells, the cathode includes a Pt mesh as the current collector. The catholyte includes 3M $LiCH_3COO$ and 1M $HCH_3COO$. The anode includes an SS mesh as the current collector. The anolyte includes solid sulfur. Alternatively, the anolyte can include 2M $Li_2S_4$, 3M LiCl, and 1M LiOH. The reference electrode can be Ag/AgCl in 3M KCl and the separator can include solid electrolyte.

For Na chemistry cells, the cathode includes a Pt mesh as the current collector. The catholyte can include 3M $NaCH_3COO$ with 1M $HCH_3COO$. The anode can include an SS mesh as the current collector. The anolyte can include solid sulfur. Alternatively, the anolyte can include 2M $Na_2S_4$, 3M NaCl, with 1M NaOH. The reference electrode can be Ag/AgCl in 3M KCl and the separator can include solid electrolyte.

The second example includes an alkaline catholyte cell using Li and/or Na chemistry. For Li chemistry cells, the cathode includes a Pt mesh as the current collector. The catholyte includes 3M LiCl and 1M LiOH. The anode can include an SS mesh as the current collector. The anolyte includes solid sulfur. Alternatively, the anolyte can include 2M $Li_2S_4$, 3M LiCl, and 1M LiOH. The reference electrode is Ag/AgCl in 3M KCl and the separator includes solid electrolyte or Nafion membrane.

For Li chemistry cells, the cathode includes a Pt mesh as the current collector. The catholyte includes 3M NaCl and 1M NaOH. The anode can include an SS mesh as the current collector. The anolyte can include solid sulfur. Alternatively, the anolyte can include 2M $Na_2S_4$, 3M NaCl, and 1M NaOH. The reference electrode is Ag/AgCl in 3M KCl and the separator includes solid electrolyte or Nafion membrane.

Figure 16A:
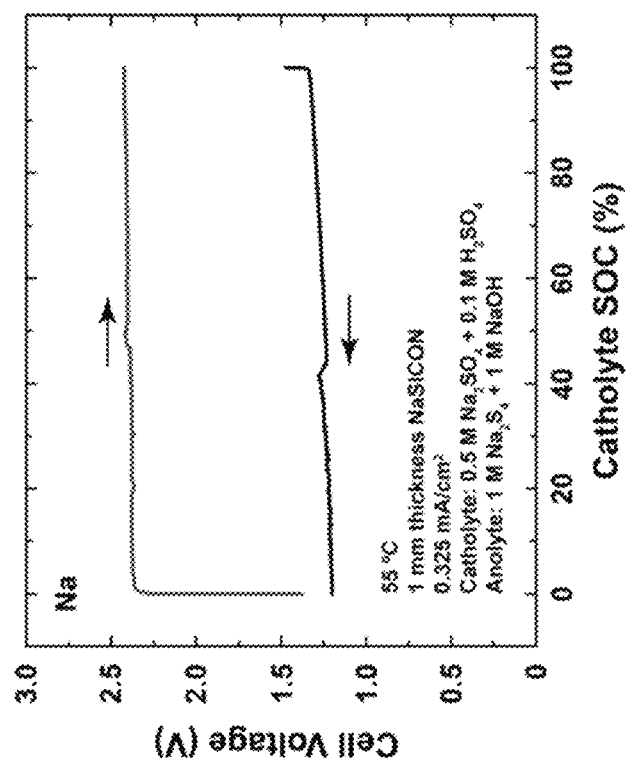
FIGS. 16A and 16B show cell voltage of an electrochemical cell as a function of state of charge using $Li^+$ and $Na^+$ as the working ion, respectively.
Figure 16B:
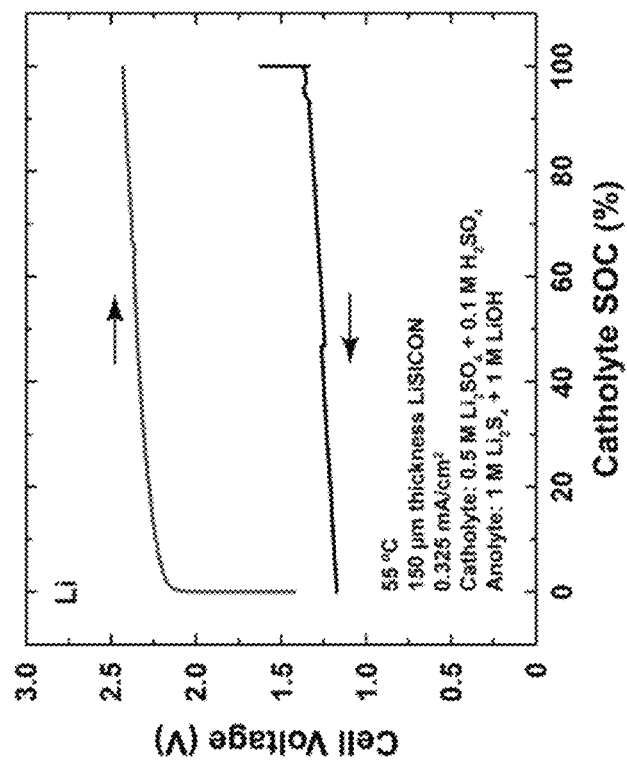

FIGS. 16A and 16B show cell voltage of an electrochemical cell as a function of state of charge using $Li^+$ and $Na^+$ as the working ion, respectively. This comparison of Li and Na chemistry is carried out in modified H-cells (e.g., cell 603 shown in FIG. 6C) using 4 M S anolyte with 1 M Li catholyte (FIG. 16A) and 1 M Na catholyte (FIG. 16B). Each is cycled over the entire capacity range afforded by the salt concentration in the starting catholyte.

FIGS. 17A and 17B show voltage efficiency as a function of current density at three temperatures in an electrochemical cell using $Li^+$ and $Na^+$ as the working ion, respectively. At the lowest current densities, the round trip efficiency is limited to 71-74% by the OER and ORR reactions. With increasing current density, the ceramic membrane resistance can be limiting. Note that the NaSICON membrane is 6.7 times thicker than the LiSICON membrane, explaining the more rapid fall-off in efficiency with increasing current density. All cells use stainless steel mesh anode and dual cathodes with catalysts ($IrO_2$ for OER and Pt black for ORR). Gas flow at the catholyte side was oxygen gas during ORR and argon gas during OER.

One complete cycle to 100% of the catholyte capacity (based on the salt concentration) is shown in FIGS. 16A and 16B for Li and Na chemistry respectively. Note that the choice of alkali metal-ion does not significantly change the charge and discharge voltage profiles, which is to be expected from the cell reactions above. The standard H-cells (e.g., 601 shown in FIG. 6A) can be used to characterize voltage efficiency as a function of current density at temperatures of 25° C., 55° C., and 70° C. The use of higher temperature increases reaction rates and also aids $Na_2SO_4$ solubility in the catholyte, which increases dramatically around 35° C.

Galvanostatic step charges and discharges produced voltage efficiency results shown in FIGS. 17A and 17B for Li and Na chemistry respectively. Using acidic catholyte and dual cathodes with catalysts ($IrO_2$ for OER and Pt black for ORR) at 55° C. and 70° C., the voltage efficiency is in the range of 71-74% for both Li and Na at the lowest current density tested of 0.065 mA/cm², and decreases with increasing current density.

The energy efficiency of the cells may be primarily limited by voltage efficiency when the catholyte and anolyte are both cycled within stable solution regimes of high coulombic efficiency. At low current density, the voltage efficiency can be primarily limited by the OER/ORR reaction. However, with increasing current density, the membrane resistance can dominate. Results in FIG. 17A can be obtained using a 150 μm thick LiSICON membrane, with a measured ionic conductivity of 0.28 mS/cm at room temperature and 0.4 mS/cm at 50° C. The results in FIG. 17B can be obtained using a NaSICON membrane of higher ionic conductivity, 2 mS/cm at room temperature, but also much greater thickness of 1 mm. Therefore, there is a greater efficiency decrease for the latter as current density increases, despite the higher ionic conductivity.

Figure 18:
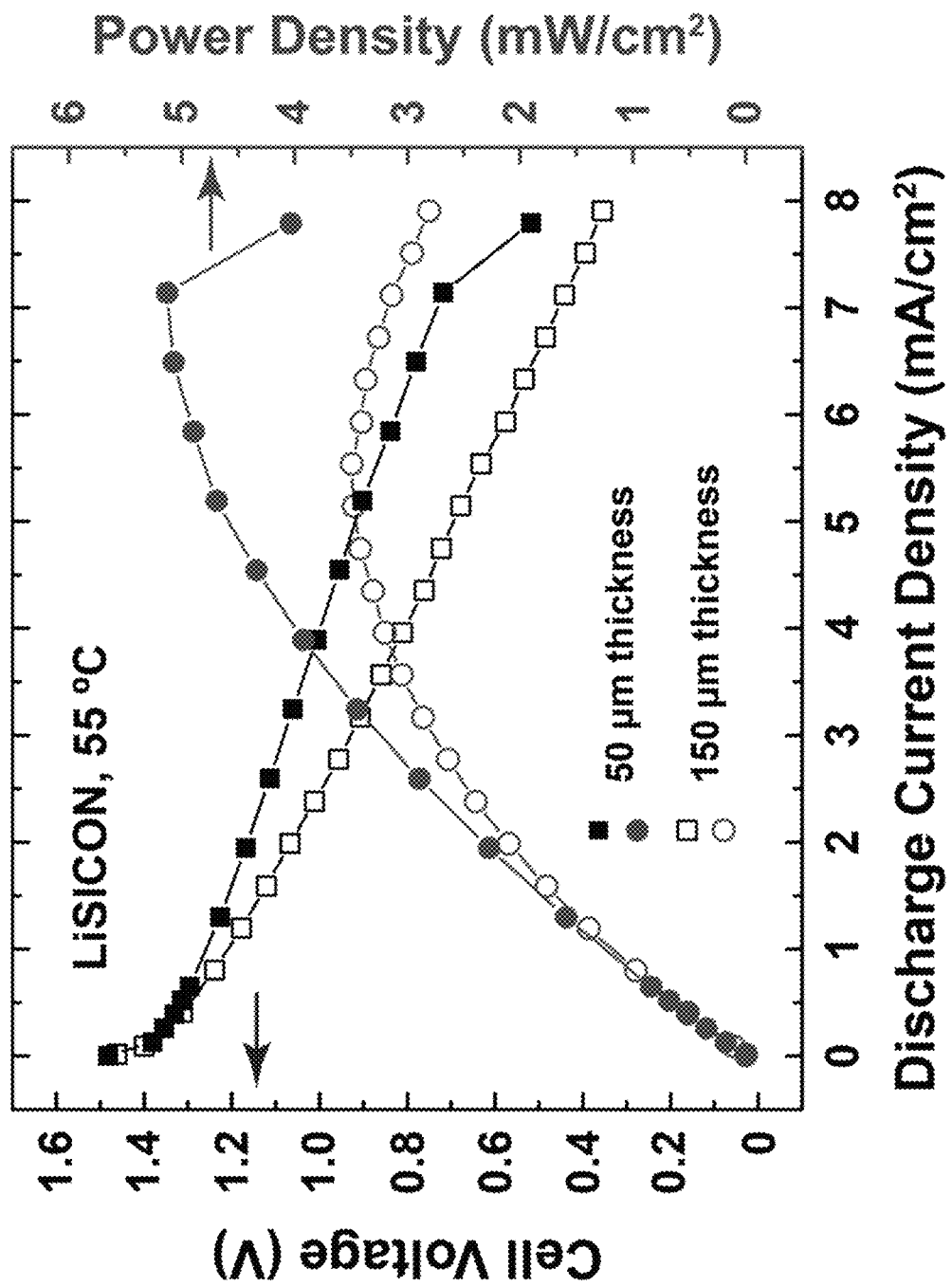
FIG. 18 shows polarization and power density as a function of current density for Li chemistry in H-cells.

FIG. 18 shows polarization and power density as a function of current density for Li chemistry, measured at 55° C. in H-cells using two different thicknesses of LiSICON membrane and single cathode with Pt black on Pt mesh as the catalyst. The cell with 50 μm thick membrane shows reduced polarization and a higher power density (peak value of 5.1 mW/cm² at 7.1 mA/cm²), compared to the cell with 150 μm thick membrane of the same composition (peak power density of 3.4 mW/cm² at 5.5 mA/cm²). This observance can be further evidence that polarization and power density become limited by membrane resistance.

Figure 19:
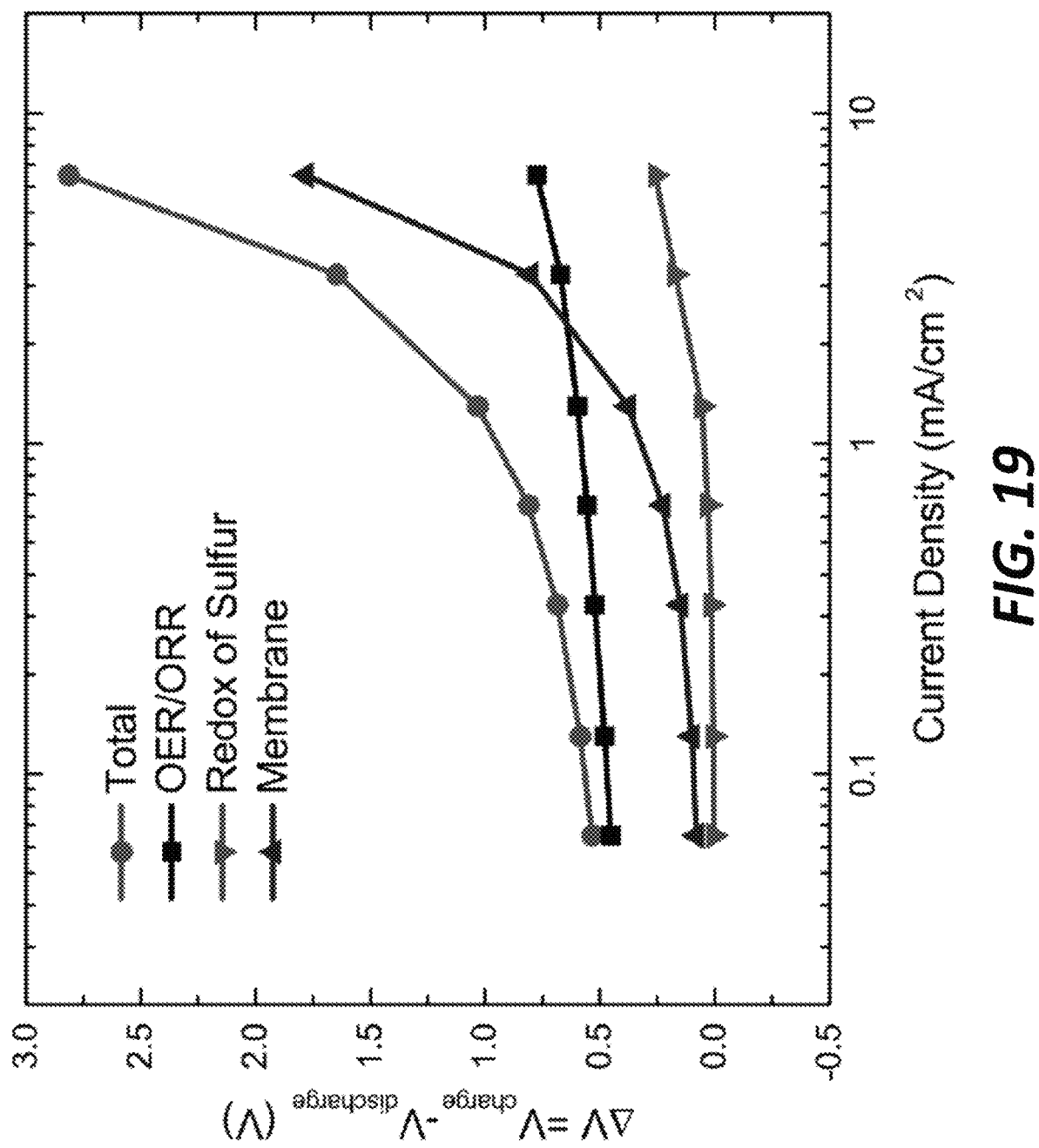
FIG. 19 shows the voltage different between charge and discharge as a function of current density in an electrochemical cell using dual reference electrodes configuration.

FIG. 19 shows the voltage different between charge and discharge as a function of current density in an electrochemical cell using dual reference electrodes configuration. The sources of polarization contributions can be determined by this cell, where an alkaline Hg/HgO (in 1 M LiOH) reference electrode is at the anolyte side and an $Hg/HgSO_4$ (in saturated $K_2SO_4$) reference electrode at the catholyte side. The polarization due to membrane resistance dominates over that due to the catholyte and anolyte redox reactions at current densities higher than about 2 $mA/cm^2$. The stainless steel mesh anode and the dual cathodes with $IrO_2$/Pt black catalysts can be used in anolyte 1 M $Li_2S_4$+1 M LiOH and catholyte 0.5 M $Li_2SO_4$+0.1 M $H_2SO_4$, respectively. Gas flow at the cathode was oxygen gas during ORR and argon gas during OER.

The experimental conditions of the results shown in FIG. 19 are the same as the conditions in FIG. 17A, except that two different REs are used, including an alkaline Hg/HgO (in 1M LiOH) reference electrode at the anolyte side and a $Hg/HgSO_4$ (in saturated $K_2SO_4$) reference electrode at the catholyte side. The stainless steel mesh anode and the dual cathodes with $IrO_2$/Pt black catalysts are used in anolyte 1 M $Li_2S_4$+1 M LiOH and catholyte 0.5 M $Li_2SO_4$+0.1 M $H_2SO_4$, respectively. Step-galvanostatic scans can be used to obtain the total polarization, catholyte contribution, and anolyte contribution. Sequential 5 min step galvanostatic charge or discharge at various current densities can be performed while the voltage is being measured.

The voltage difference between charge and discharge as shown in FIG. 19 can provide the polarization at that specific current density. The overall polarization is obtained from the voltage between cathode and anode, the catholyte contribution to polarization is obtained from the voltage between cathode and $Hg/HgSO_4$ reference electrode, and the anolyte contribution from the voltage between anode and Hg/HgO reference electrode. FIG. 19 plots the total polarization, as well as the catholyte, anolyte, and membrane contributions as a function of current density. The catholyte and anolyte contributions remain relatively constant over the measured current density range, while membrane contribution scales rapidly with current density. Thus, the membrane impedance is the main contribution to polarization at higher current densities and the cell power density becomes limited by the ceramic membrane.

Figure 20:
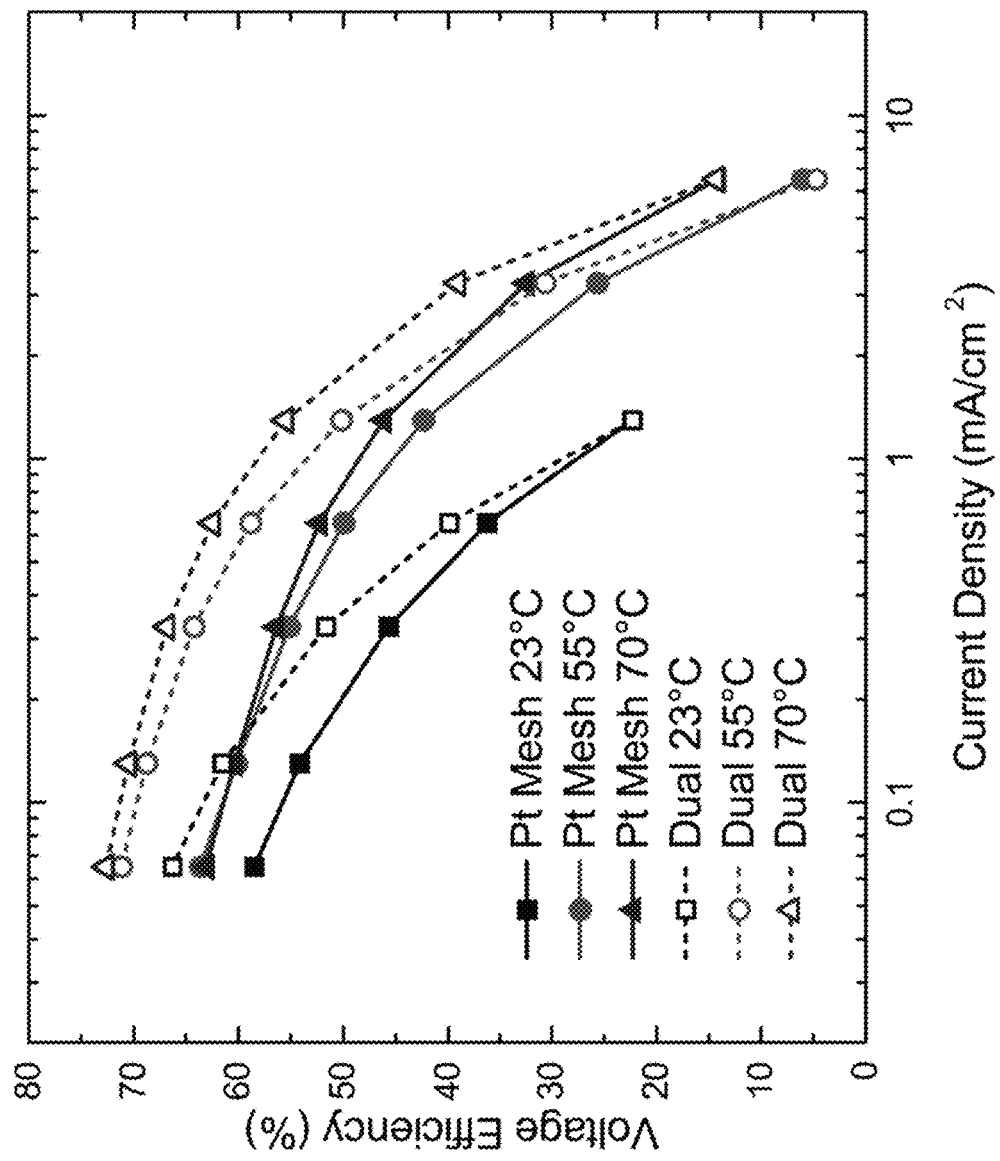
FIG. 20 shows voltage efficiency as a function of current density in electrochemical cells using single electrode and dual electrodes, illustrating the influence of catalyst and temperature on voltage efficiency.

FIG. 20 shows voltage efficiency as a function of current density in electrochemical cells using single electrode and dual electrodes, illustrating the influence of catalyst and temperature on voltage efficiency. The voltage efficiency increases with increasing temperature. At each temperature and low current density, the cells using dual cathodes with $IrO_2$/Pt black show higher voltage efficiency than that of using single cathode (Pt mesh) alone. At relatively high current density, the voltage efficiency does not vary with catholyte current collector configuration as the polarization is mainly due to the ceramic membrane. The tests are performed in standard H-cells with 0.1 M $H_2SO_4$+0.5 M $Li_2SO_4$ and 1 M $Li_2S_4$+1 M LiOH as catholyte and anolyte respectively. A 150 μm thick LiSICON membrane is used as the separator and stainless steel as the anode.

Using single cathode (Pt mesh) rather than the dual cathodes with $IrO_2$/Pt black catalysts and holding all other cell parameters constant, the voltage efficiency at 70° C. is about 20% lower (see, e.g., FIG. 20). Overall, the results show that the current approach applies to both Li and Na chemistry, although the latter is clearly preferred from the cost standpoint. Note that most of our experiments are conducted with Li chemistry due to the greater availability of LiSICON membranes at the outset of the research.

FIG. 20 shows that at each of three temperatures tested, 25° C., 55° C. and 70° C., the use of dual cathodes with $IrO_2$/Pt black catalysts can yield higher voltage efficiency than using the single cathode with Pt mesh as a bifunctional catalyst. In the low current density regime, the improvement in voltage efficiency for the cell with dual cathodes configuration over that with single cathode is about 15%. This improvement diminishes with increasing current density as membrane resistance starts to dominate cell impedance.

The ability of the catholyte and anolyte to undergo sustained deep cycling, and the durability of the cell components in contact with catholyte and anolyte, can be tested using the modified H-cell designs (e.g., cells 603 and 605 shown in FIGS. 6C and 6E, respectively). To test the catholyte, modified H-cell 603 shown in FIG. 6C (acidic catholyte) can be assembled, in which the capacity of the cell can be limited by the salt concentration in the catholyte (by using anolyte, at 4 M S concentration, of higher total capacity than the catholyte). Single cathode (Pt mesh) can be used in this experiment. Galvanostatic cycling at 0.325 $mA/cm^2$ can be conducted at 25° C., with the capacity during each cycle being limited to 96% of the catholyte theoretical capacity, based on the starting alkali ion concentration.

Figures 21A, 21B:
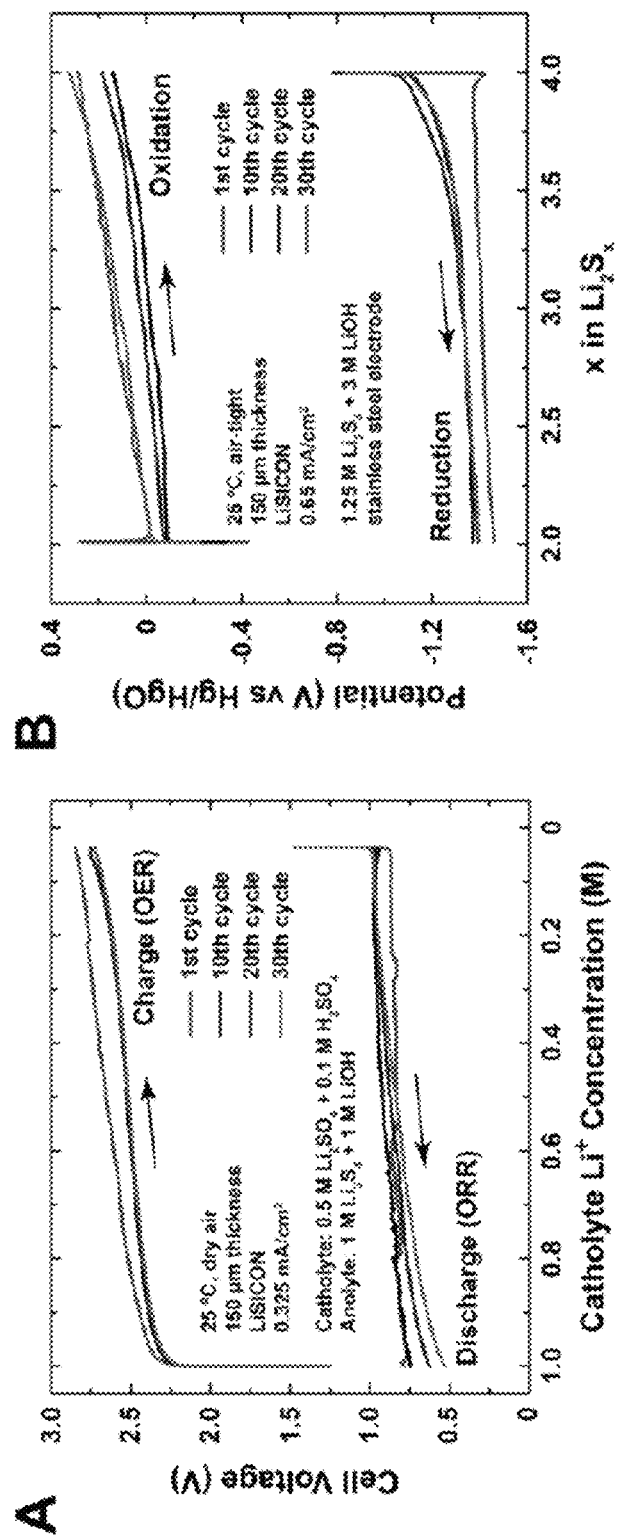
FIGS. 21A and 21B show experimental results of long duration cycling of a typical catholyte and anolyte using modified non-flowing H-cells.

FIGS. 21A and 21B show experimental results of long duration cycling of a typical catholyte and anolyte using modified non-flowing H-cells. The cell shown in FIG. 21A cycles 1 M $Li^+$ acidic catholyte over 96% of the total capacity against an excess of polysulfide anolyte. Stable cycling is observed during 30 cycles accumulated over 1600 h total test time at room temperature. Observed polarization is predominantly due to resistance of 150 μm thick LiSICON membrane. FIG. 21B shows symmetric cell test of 5 M S anolyte over $Li_2S_2$—$Li_2S_4$ composition range, using 150 μm thick LiSICON membrane. Active sulfur concentration is 1.25 M S (2.5 M electrons). The Hg/HgO (1 M NaOH, ~0.1 V vs. SHE) is placed in the counter electrode side, and thus the potential obtained on the working electrode (vs. Hg/HgO as shown in the figure) refers to the electrode potential plus the iRcell between the working electrode and the reference electrode. Stable cycling is observed over 30 cycles corresponding to 720 h total test time at room temperature.

The results shown in FIGS. 21A and 21B are plotted as voltage-capacity curves for the $1^{st}$, $10^{th}$, $20^{th}$ and $30^{th}$ galvanostatic charge/discharge cycles, spanning a total test time of over 1600 h. Dry air is continuously flowed into the catholyte chamber via a dispersion tube during discharge, and water is periodically added to the catholyte to compensate for evaporation. The charge curves are almost invariant after the first charge, and the minor variations in polarization for the discharge curves are found to be correlated with fluctuations in catholyte water level and air flow rate, which can be expected to affect ORR kinetics. Over the longer than 2 months duration of the test, the cell impedance does not grow detectably, pointing to reasonable stability of the LiSICON membrane in contact with the acidic catholyte as well as the stability of catholyte and anolyte reactions at their respective electrodes (platinum mesh and stainless steel, respectively).

The cycling stability of the polysulfide anolyte can be tested in cells with two gas-tight chambers of differing volume containing the same anolyte thus deeply cycling the smaller chamber. LiSICON membrane and stainless steel electrodes can be used. An alkaline Hg/HgO in 1 M LiOH reference electrode can be placed in the larger chamber. Selection of the appropriate speciation range over which to cycle the anolyte requires consideration of complex equilibria.

Aqueous alkali-metal polysulfide solutions contain a wide range of species including the alkali-metal cations ($Li^+$, $Na^+$, or $K^+$), $H_2O$, $OH^-$, $H^+$, $H_2S$, $HS^-$, $S^{2-}$, $S_2^{2-}$, $S_3^{2-}$, $S_4^{2-}$, and $S_5^{2-}$. Polysulfide solubility and stability depend highly on pH, alkali-metal cation, nominal polysulfide speciation and concentration as well as temperature. At low pH (<7), $HS^-$ can be the primary species and the $H_2S$ molecule is the predominant reduced product in the polysulfide solution. At intermediate alkalinity (pH 9-14), the primary polysulfide species are $S_4^{2-}$ and $S_5^{2-}$ instead of $HS^-$, although without good sealing $H_2S$ may still be generated at pH≈12, especially during the reduction reaction. Adding porous SBA-15 silica adsorbent to the polysulfide anolyte can reduce irreversible capacity loss and improve capacity retention. The improvements may be attributed to the suppression of gaseous $H_2S$ release, preventing continuous loss of sulfur. In highly alkaline polysulfide solution (e.g., >3 M $OH^-$), the predominant species can be $S_3^{2-}$ and $S_2^{2-}$.

A $Li_2S_4$ solution under these conditions may disproportionate into $S^0$ and $S_2^{2-}/S_3^{2-}$ during long-term storage. At temperatures above 80° C., thiosulfate can be readily formed via the reaction $S_n^{2-}+mOH^-\rightarrow S_{n-m}O^{2-}+mHS^-$. This parasitic disproportionation reaction can be detrimental to the stability of polysulfide anolyte, but slow at moderate temperature. Thus, starting polysulfide solutions can be prepared to contain nominal stoichiometry $Li_2S_4$ and 1 M or 3 M LiOH at room temperature and operated from room temperature up to 70° C., such that the starting predominant sulfur species is $S_4^{2-}$ and the major degradation reactions are minimized. It can be helpful to constrain the composition range to $Li_2S_2$ to $Li_2S_4$ to achieve stable cycling (see, e.g., FIG. 21B for cycling results at 5 M S concentration obtained over 480 h). In the interest of increasing energy density and further lowering cost, the ability to reversibly cycle to the $Li_2S$ limit is desirable. Percolating nanocarbon suspensions can be used to improve charge transfer in fluid electrodes used in a flow battery, and thus a similar strategy could be applied here to extend the polysulfide capacity range.

Figures 22A, 22B:
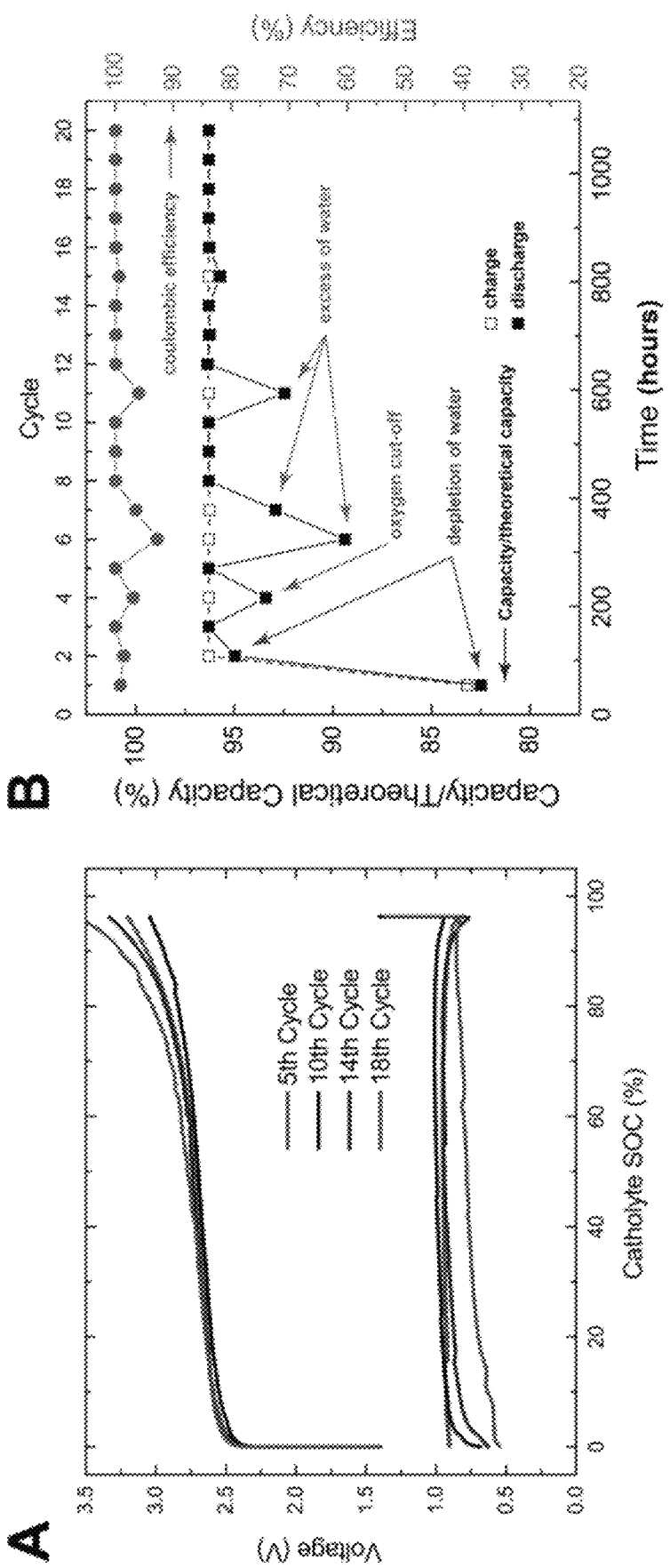
FIGS. 22A and 22B show experimental results of cell resistance and durability.

FIGS. 22A and 22B show experimental results of cell resistance and durability. Cell resilience can be characterized on a cell with 1 M $Li^+$ acidic catholyte against an excess of polysulfide anolyte during deep cycling (96% of theoretical capacity). FIG. 22A shows charge and discharge voltage profiles at different cycles. FIG. 22B shows that the cell returns to stable operation from three kinds of disruptions: depletion of water, excess of water, and oxygen supply cutoff. The cycling tests can be carried out in a modified H-cell with 0.1 M $H_2SO_4$+0.5 M $Li_2SO_4$ and 1 M $Li_2S_4$+1 M LiOH as catholyte and anolyte respectively at room temperature. The 150 μm thick LiSICON membrane can be used as the membrane and pure oxygen as the ORR feeding gas. Cathode and anode can include Pt mesh and stainless steel respectively.

FIGS. 22A and 22B illustrate the ability of the air-breathing aqueous sulfur cells to recover from three kinds of disruptions: depletion of water, excess of water, and oxygen supply cutoff. The experiment uses the modified H-cell design shown in FIG. 6C for catholyte-limited cycling, and the total test time is about 2 months. A cutoff voltage of 0.4 V is imposed to avoid the hydrogen evolution reaction during deep discharge. As seen in FIG. 22B, each of the incidents causes a loss of coulombic efficiency. However, after the water level or oxygen flow rate is restored to the original test conditions, the coulombic efficiency returns to nearly 100%, showing that the cell is robust against such disruptions.

Figure 23A:
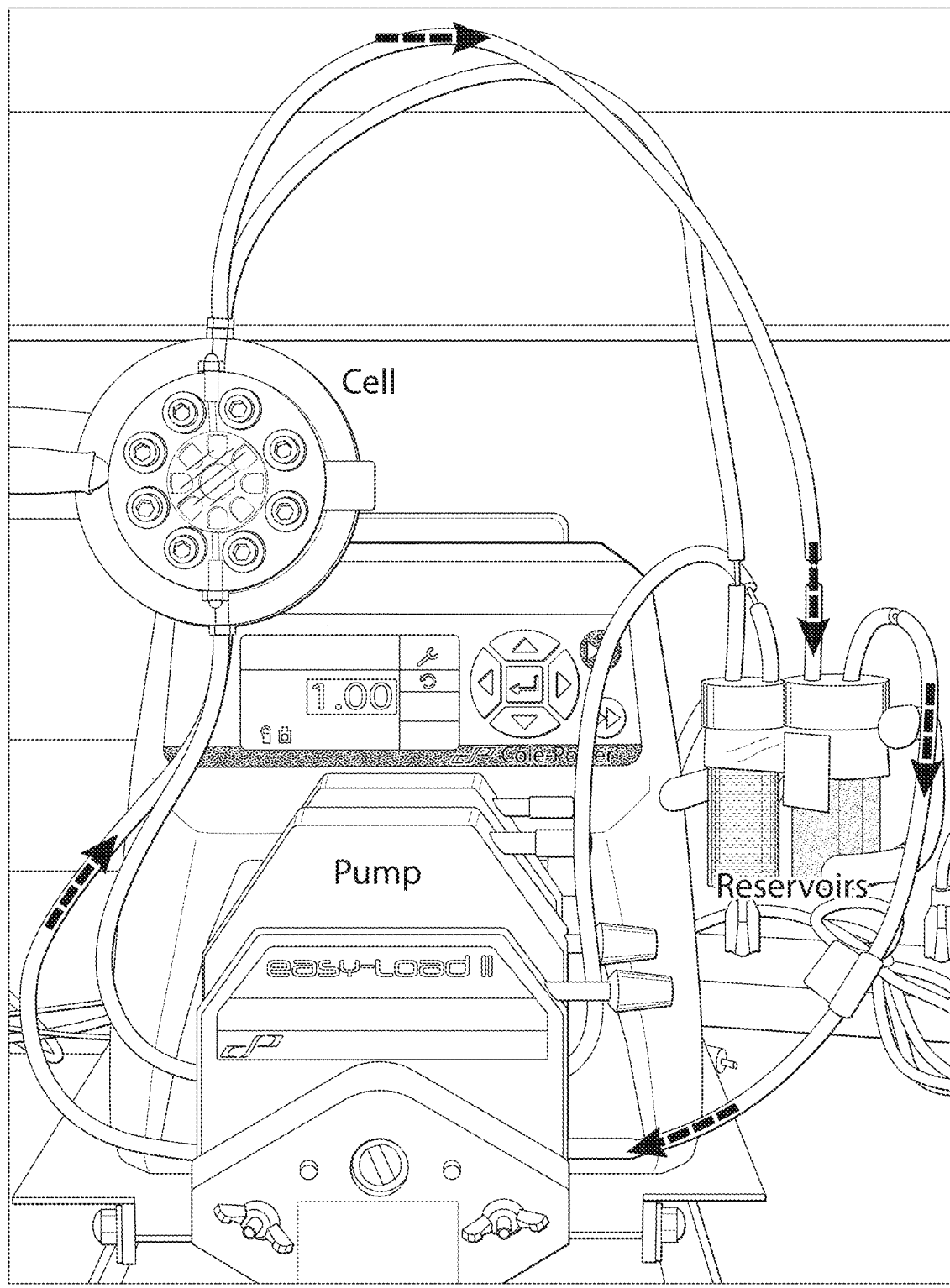
FIG. 23A shows a drawing of a laboratory-scale flow battery combining air-breathing cell with continuously flowing catholyte and anolyte.
Figure 23B:
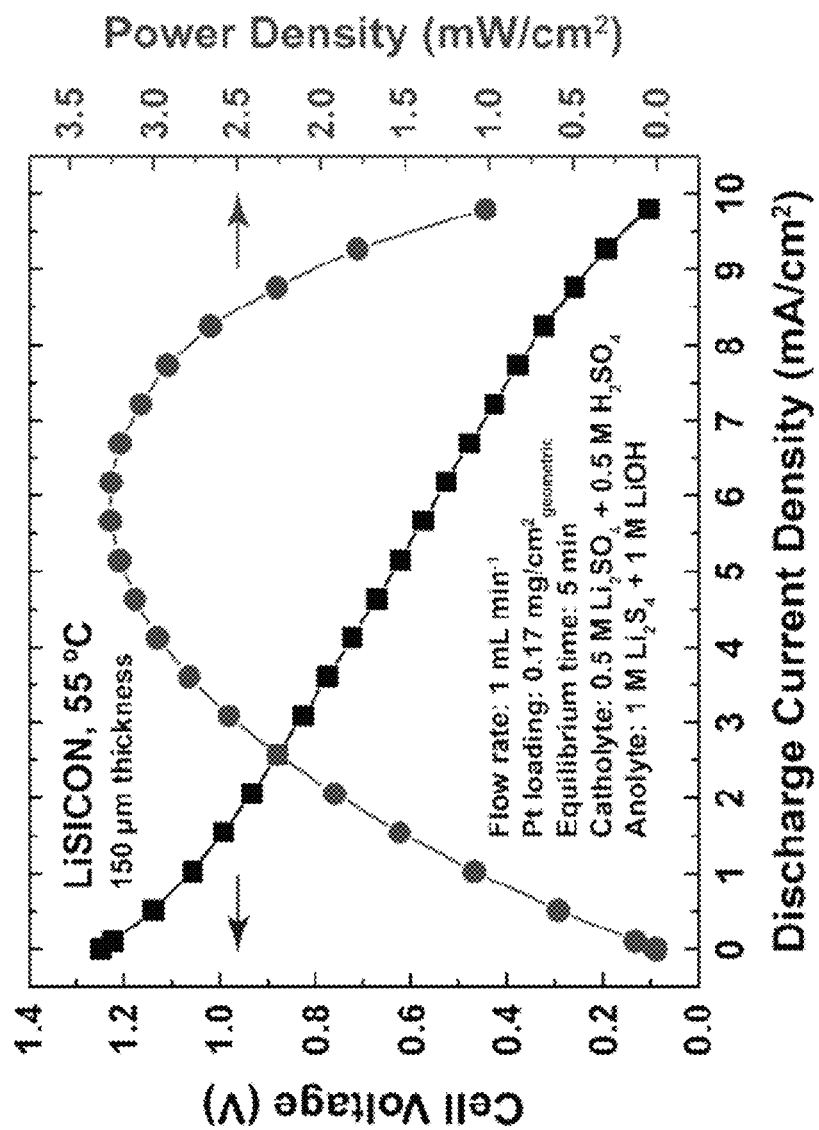
FIG. 23B shows polarization and power density as a function of current density of the flow battery shown in FIG. 23A.
Figure 23C:
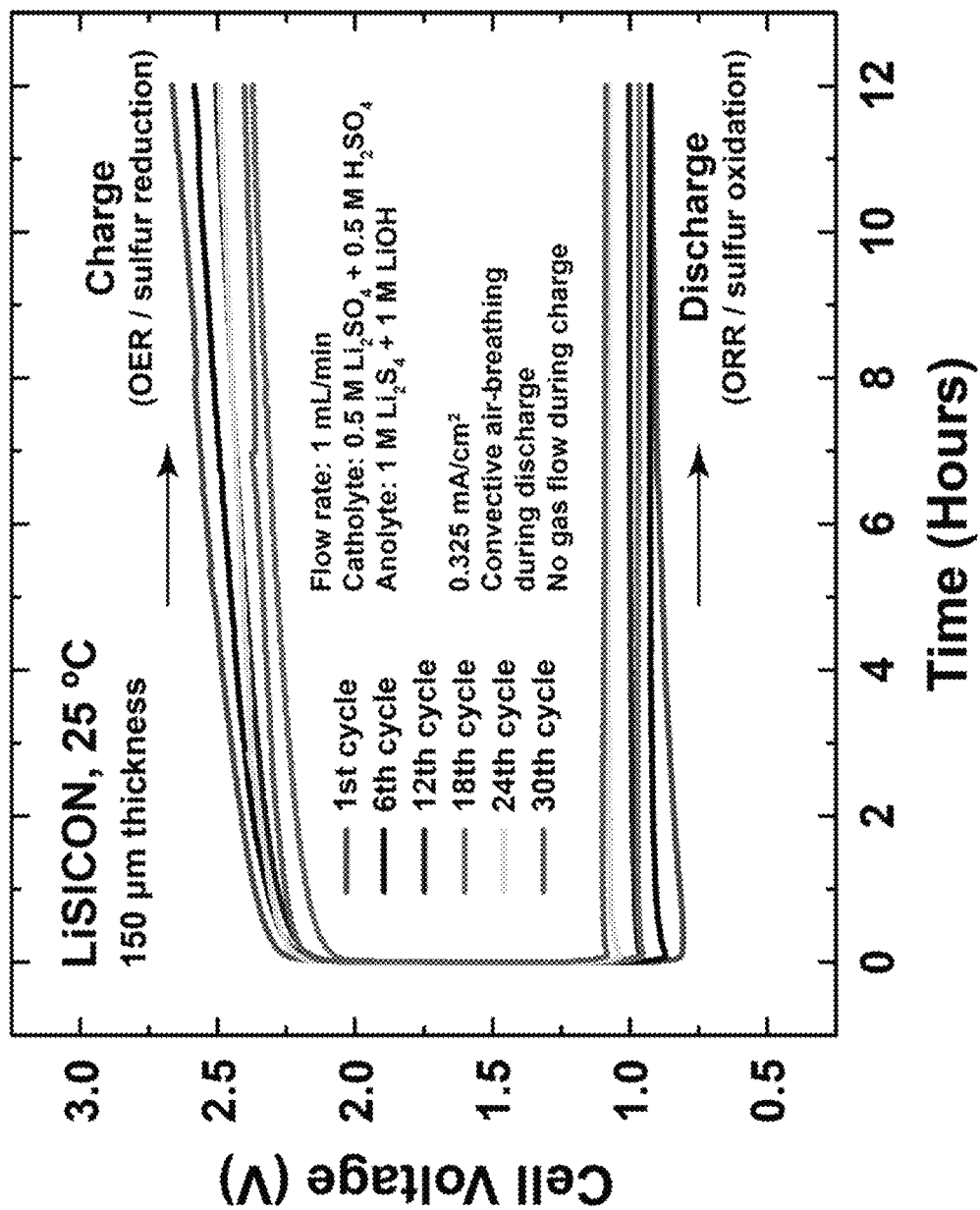
FIG. 23C shows voltage-capacity curves of the flow battery shown in FIG. 23A measured at 0.325 mA/cm$^2$ for 20 cycles.

FIG. 23A shows a drawing of a laboratory-scale flow battery combining air-breathing cell with continuously flowing catholyte and anolyte. FIG. 23B shows polarization and power density as a function of current density, measured at 55° C. under 1 mL/min fluid flow rate. FIG. 23C shows voltage-capacity curves measured at 0.325 mA/cm² for 20 cycles, corresponding to 480 h of operation. The anolyte is replaced after the 11$^{th}$ cycle (~255 h) due to sulfur precipitation, attributed to accidental air ingress in the anolyte circuit.

The flow cell shown in FIG. 23A use the acidic $Li_2SO_4$ based catholyte and a 150 μm thick LiSICON membrane. FIG. 23B shows the polarization and power density of the flow cell measured at 55° C. with an air stream feeding the air chamber. On discharge, the flow cell delivers higher peak power than the static counterpart in FIG. 18 (3.3 mW/cm² vs. 2.4 mW/cm²), and reaches peak power at a higher current density (6 mA/cm² vs. 4 mA/cm²). This can be attributed to the improved cathode design with higher density of catalyst (Pt)-gas ($O_2$)-electrolyte (W) triple junctions on the Pt/C modified gas diffusion layer (GDL) as opposed to the Pt black modified Pt mesh as the ORR cathode in the non-flowing cells used in FIG. 18, as well as the flow architecture which improves mass transfer at the electrolyte-current collector interfaces.

FIG. 23C shows charge-discharge curves upon cycling the air-breathing flow cell at 0.325 mA/cm² for 30 cycles (720 h) at room temperature. The discharge voltage is lower (~1.00 V) at room temperature than at 55° C. (~1.15 V for the same current density, FIG. 23B) due to the higher membrane resistance, but stable cycling is observed, similar to results for the non-flowing modified H-cell (e.g., FIG. 6C) using the similar components and operating conditions (e.g., FIG. 21A). Sulfur precipitation is observed in the anolyte reservoir after every 10 cycles (240 h) and the anolyte is replaced at that point. The roundtrip energy efficiency of this cell is 42% at 0.325 mA/cm². Using lower resistance membranes such as thin NaSICON with 2 mS/cm ionic conductivity at room temperature vs. 0.28 mS/cm for LiSICON, can increase the round trip efficiency values limited by the OER/ORR efficiency.

The systems and methods described above with respect to FIGS. 1-23C can be readily applied to store energy generated by waves in seas and oceans, taking advantage of sea water as at least part of the catholyte. This approach of using air-breathing aqueous sulfur battery for wave energy storage has several advantages. First, sea and ocean can serve as a natural catholyte or anolyte tank (0.5M NaCl, pH is about 7.5 to about 8.4). Second, wave motion, tidal motion, and river currents all produce flow that can be used to circulate salt water as a flowable battery electrolyte. Third, in mobile on-board applications, vehicle motion can produces flow of the aqueous battery electrolyte without separate pumping system. Fourth, high dilution of reactants produces safe energy storage. Fifth, this approach also allows the use of low-cost catalysts for OER and ORR.

Figure 24:
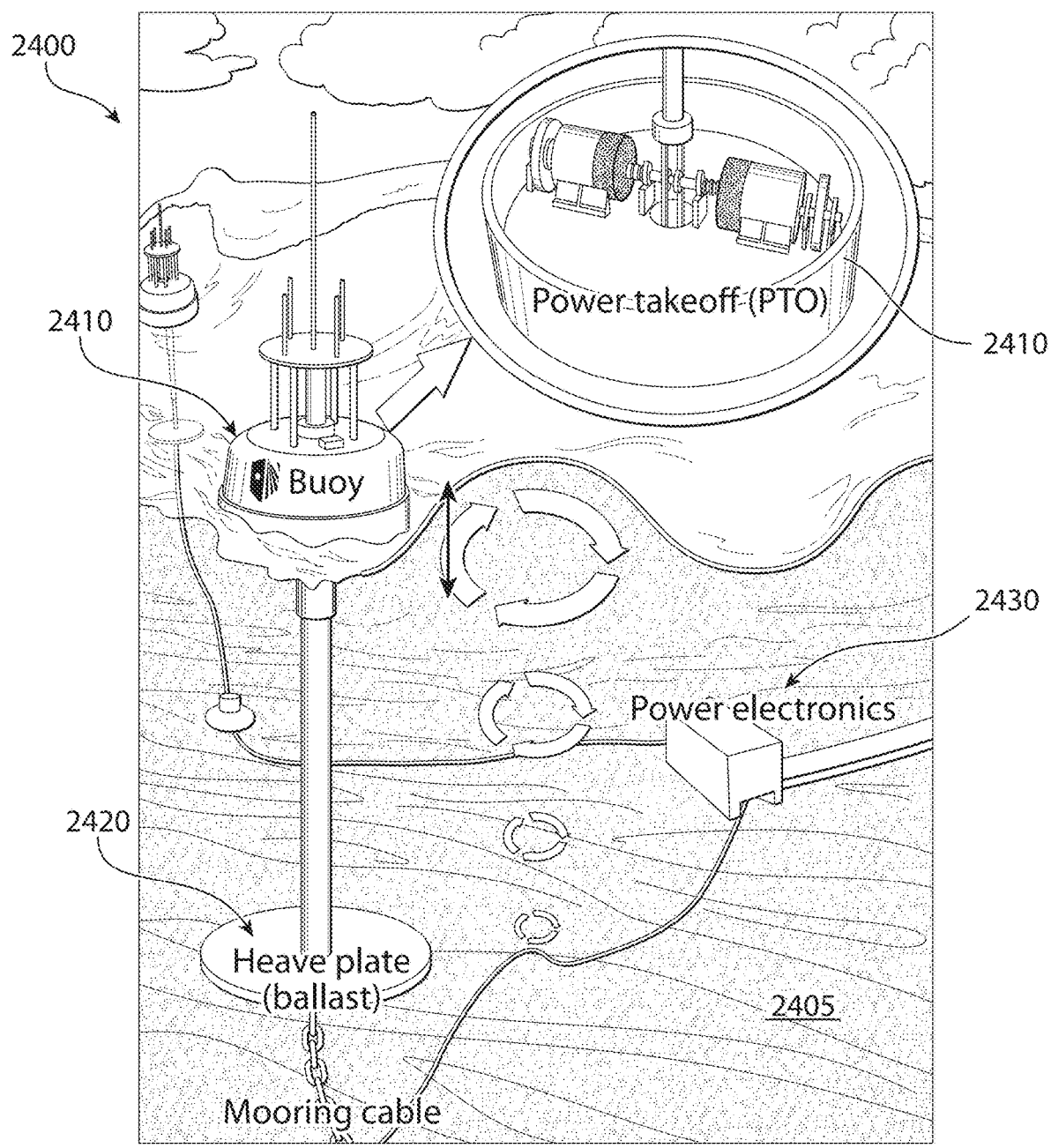
FIG. 24 illustrates the general concept of wave energy storage generation.

FIG. 24 illustrates a system 2400 for wave energy generation. The system 2400 includes an energy generation device 2410 floating in the ocean 2405 to convert wave energy into electricity. A heavy plate 2420 is configured as a ballast to secure the energy generation device 2410. The energy generation device 2410 is further connected to power electronics 2430, which can deliver the energy to energy storage units.

Figure 25:
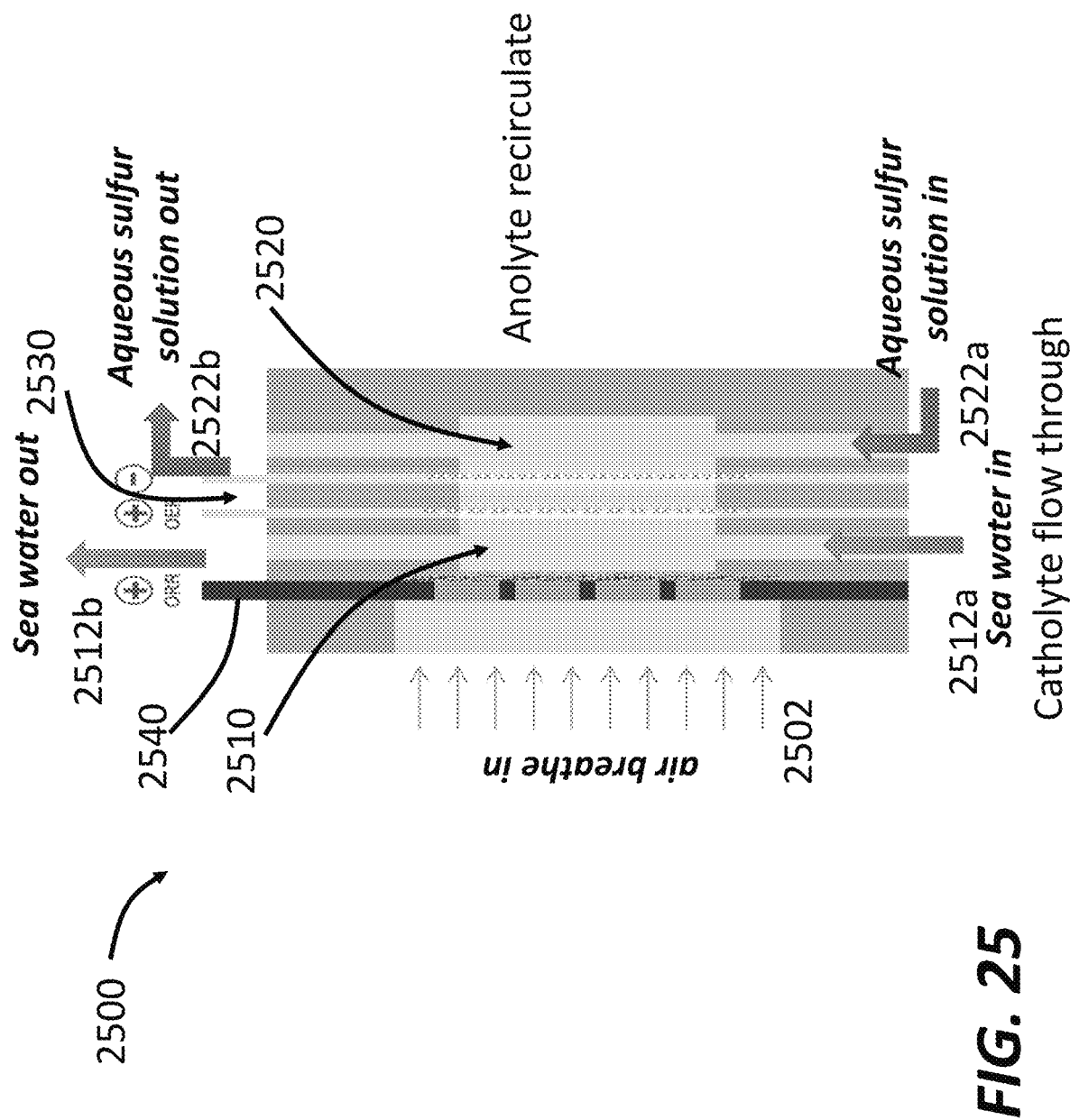
FIG. 25 shows schematic of a flow battery using sea water as part of the catholyte.

FIG. 25 shows a schematic of a flow cell 2500 that can be used for storing wave energy. The flow cell 2500 includes a catholyte chamber 2510 containing a catholyte and an anolyte chamber 2520 containing an anolyte. A separator 2530 is disposed between the catholyte chamber 2510 and the anolyte chamber 2520. The catholyte chamber 2510 includes an input port 2512a for sea water to enter the catholyte chamber 2510 and an output port 2512b for sea water to exit the catholyte chamber 2510. The anolyte chamber 2520 includes an input port 2522a for anolyte to enter the anolyte chamber 2520 and an output port 2522b for anolyte to exit the anolyte chamber 2510.

In operation, sea water can continuously flow through the catholyte chamber 2510 without recycling, due to the abundance of sea water in oceans. This can also save at least one fluid pump in the apparatus 2500, thereby reducing the overall cost and complexity of the apparatus 2500. The anolyte, in contrast, can recirculate within the anolyte chamber 2520 for repetitive uses. The apparatus 2500 further includes a gas vent 2540 connected to the catholyte chamber 2510, allowing air (or other gas such as oxygen) to enter and/or exit the catholyte chamber 2510.

Figures 26A, 26B:
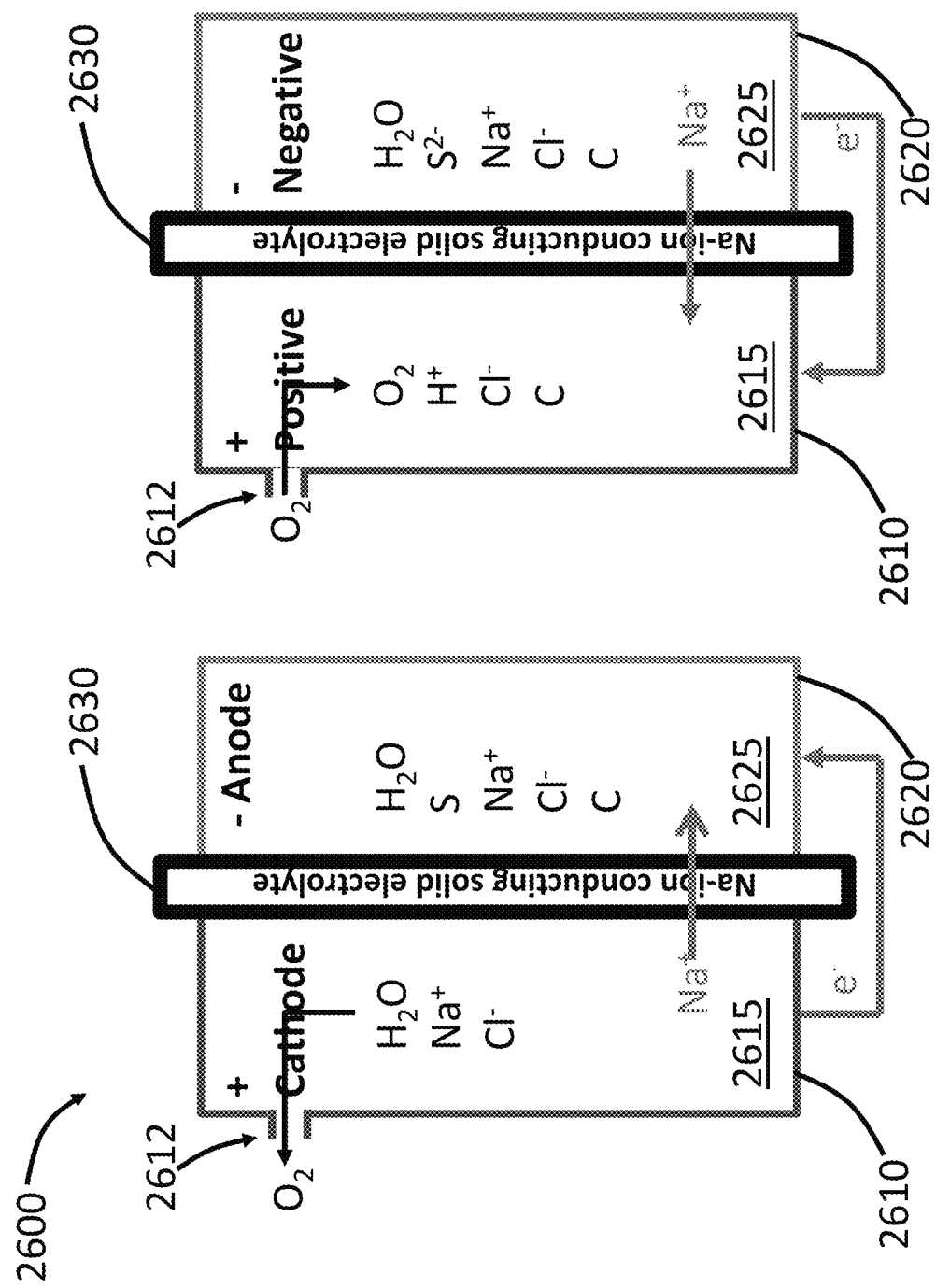
FIGS. 26A and 26B show schematics of an electrochemical apparatus configured as an open system for wave energy storage.

FIGS. 26A and 26B show schematics of an electrochemical apparatus 2600 configured as an open system using sulfur for energy storage and $Na^+$ ion as the working ion. The apparatus 2600 includes a catholyte chamber 2610 containing a catholyte 2615 and an anolyte chamber 2620 containing an anolyte 2625. A separator 2630 is disposed between the catholyte 2615 and the anolyte 2625. The catholyte 2615, the anolyte 2625, and the separator 2630 can be substantially identical to the catholyte 115, and anolyte 125, and the separator 130, respectively, shown in FIGS. 1-2 as described above.

The electrochemical apparatus 2600 further includes a vent 2612 in the catholyte chamber 2610 for venting oxygen (or other gas such as air) in and out of the catholyte chamber 2610. For example, during the charging process, oxygen generated during the decomposition of water can be removed from the catholyte chamber 2610. In contrast, during the discharging process, oxygen or air can be pumped into to the catholyte chamber 2610 to facilitate the reaction with $H^+$ ions to generate water.

As illustrated in FIGS. 26A-26B, the cell voltage of the apparatus 2600 can be determined by the potential difference between the following two reactions. In the case of acidic catholyte (~1.7 V cell):
Cathode charging reactions include:

$$2H_2O \rightarrow O_2\uparrow + 4H^+ + 4e^- \quad E_C^0 = 1.229 \text{ V vs. SHE}$$

$$2Cl^- \rightarrow Cl_2\uparrow + 2e^- \quad E_C^0 = 1.358 \text{ V vs. SHE}$$

Cathode discharge reactions include:

$$O_2\uparrow + 4H^+ + 4e^- \rightarrow 2H_2O \quad E_C^0 = 1.229 \text{ V vs. SHE}$$

Anode reactions include:

$$S + 2e^- \leftrightarrows S^{2-} \quad E_A^0 = -0.447 \text{ V vs. SHE}$$

In the case of highly alkaline catholyte (~0.85 V cell):
Cathode charging reactions include:

$$4OH^- \leftrightarrows O_2\uparrow + 2H_2O + 4e^- \quad E_C^0 = 0.401 \text{ V vs. SHE}$$

Cathode discharging reactions include $$O_2\uparrow + 2H_2O + 4e^- \rightarrow 4OH^- \quad E_C^0 = 0.401 \text{ V vs. SHE}$$

Anode charging/discharging reactions include:

$$S + 2e^- \leftrightarrows S^{2-} \quad E_A^0 = -0.447 \text{ V vs. SHE}$$

In the case of mildly alkaline seawater catholyte (~1.2 V cell):
Cathode charging reactions include $$4OH^- \leftrightarrows O_2\uparrow + 2H_2O + 4e^- \quad E_C^0 = 0.75 \text{ V vs. SHE}$$

Cathode discharging reactions include $$O_2\uparrow + 2H_2O + 4e^- \rightarrow 4OH^- \quad E_C^0 = 0.75 \text{ V vs. SHE}$$

Anode charging/discharging reactions include:

$$S + 2e^- \leftrightarrows S^{2-} \quad E_A^0 = -0.447 \text{ V vs. SHE}$$

In some examples, the apparatus 2500 and 2600 can use naturally occurring water as an electrode material, and one or more of the naturally occurring ions in the naturally occurring water can be used as the working ion of the apparatus 2500 and 2600. In one example, the naturally occurring water includes seawater. In another example, the naturally occurring water includes freshwater. In yet another example, the naturally occurring water includes waste water.

In some examples, the apparatus 2500 and 2600 can use a reservoir of naturally occurring water as the electrode material, and the reservoir can have a total charge storage capacity that is at least 5 times larger than the charge storage capacity of the counter-electrode. For example, the reservoir of naturally occurring water can be used for the positive electrode, which can undergo oxygen reduction and oxygen evolution during cycling of the apparatus 2500 and 2600. In this case, the counter-electrode is a negative electrode, which can include sulfur.

In some examples, the naturally occurring water electrode as used in the apparatus 2500 and 2600 flows during operation of the apparatus. In one example, the flowing electrode can be pumped during operation of the apparatus. In another example, the flowing electrode can flow due to naturally occurring events, including but not limited to, rainfall, stream or river currents, underwater springs, tidal flow, and/or wave action.

In some examples, the apparatus 2500 and 2600 can use water flow to flow the water-based electrode material to an electrode chamber of the apparatus. In one example, the electrode chamber is a positive electrode of the apparatus (e.g., 2510 and 2610).

In some examples, the apparatus 2500 and 2600 can use water flow to flow the water-based electrode material to an electrode chamber while simultaneously using the water flow to pump or circulate a second electrode of the apparatus 2500 and 2600. The second electrode can be a negative electrode including sulfur. Furthermore, the second electrode can include an aqueous solution comprising polysulfides and/or solid metal sulfides.

In some examples, the apparatus 2500 and 2600 can use tidal flow or wave action to fill a reservoir that subsequently under the force of gravity flows the water-based electrode material to an electrode chamber (e.g., 2510 and 2610).

Using sea water in the apparatus 2500 and 2600 can have several benefits. For example, higher cell voltage can be achieved, compared to the voltage in the highly alkaline case, while avoiding need for pH separating ceramic membrane as used in the acidic case. In addition, the ocean includes constant chemistry of seawater electrode, including constant $Na^+$ concentration, and almost "infinite" supply of seawater catholyte. Therefore, the capacity and energy of the battery is not limited by the catholyte. Instead, the capacity and energy may be limited by the sulfur anode. Furthermore, no significant pH swings on catholyte side and associated voltage saturation would usually occur. Lastly, this approach can operate within a convenient voltage range to avoid $Cl_2$ gas generation, unlike previously proposed seawater batteries that produce $Cl_2$. Since the $Cl_2/S$ cell OCV is around 1.85V, whereas the $O_2/S$ cell OCV is around 1.2V using seawater, keeping cell charge voltage below 1.85V can therefore avoid $Cl_2$ gas generation.

In view of the technical advantages of electrochemical apparatus described above, it is also illuminating to estimate the practical costs of the apparatus. The chemical cost of storage (given in US$/kWh for the catholyte and anolyte combined) can be readily calculated from the cell voltage, the cost of starting components, and solute concentrations. Although polysulfide solubilities in aqueous solutions can reach as high as 12 M sulfur concentration, stability issues (vide infra) may limit the practical capacity to less than that theoretically possible for complete reduction of sulfur according to the reaction $2A+S \rightarrow A_2S$ where A is Li or Na. However, even with a more limited range of sulfur reduction, exceptionally low chemical cost is attainable, while reaching energy densities higher than many previous flow batteries.

Tables 2 and 3 show energy density and cost calculations for catholyte and anolyte having 5 M of Li or Na, and 5 M of S, respectively. If the entire theoretical sulfur capacity is achieved, the energy density is 125 and 58 Wh/L for acidic and alkaline catholyte, respectively. Increasing the S concentration alone to 10 M can raise the upper bound to about 150 Wh/L and 70 Wh/L for acidic and alkaline catholyte, respectively. If cycling is restricted to only 25% of sulfur's theoretical capacity, corresponding to operation within the $Li_2S2$-$Li_2S_4$ or $Na_2S2$-$Na_2S_4$ solution regimes, energy densities are 63 and 29 Wh/L, respectively. For sodium-sulfur chemistry the cost is a remarkably low 0.35-1.60 US$/kWh (for the acidic catholyte case) within this range of active concentrations (5 M to 10 M sulfur) depending on the usable capacity, which appears to be the lowest chemical cost of any known rechargeable battery. By comparison, lithium ion active materials have chemical cost in the range of 25-100 US$/kWh, and the most widely studied flow battery, the vanadium redox flow battery (VRFB), has chemical cost that is in the range 34-162 US$/kWh depending on the price of vanadium. Using lithium-sulfur chemistry in this approach, the cost is more than fourfold higher than with sodium, being 2-6.40 US$/kWh (for the acidic catholyte case) within the same range of active sulfur concentrations; the lower end of this range may still be attractive compared to existing flow batteries.

TABLE 2

The chemical energy density (Wh/L) of the air-breathing aqueous sulfur battery taking the total volume of catholyte and anolyte. We assume a charge-balanced cell in which the alkaline ion content is equal to the charge stored in the sulfur over the stated speciation range.

| | Acidic catholyte | | Alkaline catholyte | |
|---|---|---|---|---|
| Cell voltage (V) | 1.4 | 1.4 | 0.65 | 0.65 |
| [Na$^+$] or [Li$^+$] (M) | 5 | 5 | 5 | 5 |
| [S]$_{total}$ (M) | 5 | 5 | 5 | 5 |
| Redox range of anolyte | $S_2^{2-} \leftrightarrow S_4^{2-}$ | $S^{2-} \leftrightarrow S^0$ | $S_2^{2-} \leftrightarrow S_4^{2-}$ | $S^{2-} \leftrightarrow S^0$ |
| Chemical energy density (Wh/L) | 62.5 | 125.1 | 29.0 | 58.1 |

TABLE 3

The chemical cost, tank cost, and energy cost of the air-breathing aqueous sulfur battery with 5M working ion (Na$^+$ or Li$^+$) and 5M total sulfur at stated speciation range. In the calculation of $C_{energy}$, $\varepsilon_{sys,d}$, $\varepsilon_{q,rt}$, $\varepsilon_{V,d}$ are taken as 0.94, 1, and 0.82, respectively as specified in the texts.

| | Bulk price (US$/kg) | Concentration (M) | Chemical cost (US$/kWh) |
|---|---|---|---|
| Acidic catholyte, 5M Na$^+$, 5M S, $S_2^{2-} \leftrightarrow S_4^{2-}$ | | | |
| Na$_2$SO$_4$ | 0.08 | 2.6 | 0.16 |
| H$_2$SO$_4$ | 0.28 | 0.1 | 0.01 |
| Na$_2$S | 0.59 | 1.25 | 0.61 |
| S | 0.20 | 3.75 | 0.26 |
| NaOH | 0.39 | 3 | 0.50 |
| H$_2$O | 0.001 | 50 | 0.02 |
| $C_{chemical}$ (US$/kWh) | | | 1.56 |
| Tank | 0.15 US$/L | | 2.40 |
| $C_{energy}$ (US$/kWh) | | | 5.14 |
| Acidic catholyte, 5M Na$^+$, 5M S, $S^{2-} \leftrightarrow S^0$ | | | |
| Na$_2$SO$_4$ | 0.08 | 2.6 | 0.16 |
| H$_2$SO$_4$ | 0.28 | 0.1 | 0.01 |
| Na$_2$S | 0.59 | 0 | 0.00 |
| S | 0.20 | 5 | 0.09 |
| NaOH | 0.39 | 3 | 0.12 |
| H$_2$O | 0.001 | 50 | 0.01 |
| $C_{chemical}$ (US$/kWh) | | | 0.39 |
| Tank | 1.20 | | 1.20 |
| $C_{energy}$ (US$/kWh) | | | 2.06 |
| Acidic catholyte, 5M Li$^+$, 5M S, $S_2^{2-} \leftrightarrow S_4^{2-}$ | | | |
| Li$_2$SO$_4$ | 1.01 | 2.6 | 1.54 |
| H$_2$SO$_4$ | 0.28 | 0.1 | 0.01 |
| Li$_2$S | 2.96 | 1.25 | 1.81 |
| S | 0.20 | 3.75 | 0.26 |
| LiOH | 3.54 | 3 | 2.72 |
| H$_2$O | 0.001 | 50 | 0.02 |
| $C_{chemical}$ (US$/kWh) | | | 6.36 |
| Tank | 0.15 US$/L | | 2.40 |
| $C_{energy}$ (US$/kWh) | | | 11.35 |
| Acidic catholyte, 5M Li$^+$, 5M S, $S^{2-} \leftrightarrow S^0$ | | | |
| Li$_2$SO$_4$ | 1.01 | 2.6 | 1.54 |
| H$_2$SO$_4$ | 0.28 | 0.1 | 0.01 |
| Li$_2$S | 2.96 | 0 | 0.00 |
| S | 0.20 | 5 | 0.09 |
| LiOH | 3.54 | 3 | 0.68 |
| H$_2$O | 0.001 | 50 | 0.01 |
| $C_{chemical}$ (US$/kWh) | | | 2.33 |
| Tank | 1.20 | | 1.20 |
| $C_{energy}$ (US$/kWh) | | | 4.57 |

Since both catholyte and anolyte can be fluids, the electrochemical couple lends itself to a flow battery architecture in which the power stack and chemical storage capacity can be independently sized to meet desired energy to power ratios. In such architecture, the contribution to system cost of the power stack can be minimized by sizing it only as large as is necessary to meet the maximum power requirement. Using guidelines from a recent techno-economic analysis of flow batteries, as discussed in detail later, it can be estimated that the electrochemical storage system discussed in this application can have attractive performance and cost attributes very similar to those of PHS and CAES, which are currently the lowest-cost energy storage technologies.

Flow batteries, by virtue of their design allowing independent scaling of power and energy, have a cost structure similar to that of pumped hydroelectric storage (PHS) and underground compressed air energy storage (CAES). For PHS and CAES, the cost of power (e.g., US$/kW) is primarily determined by the cost of power-generating turbines and associated equipment; for flow batteries it is primarily the cost of the power-generating stack. The cost of energy (e.g., US$/kWh) is primarily determined by size of the storage reservoir in the case of PHS and CAES, and by the chemical storage cost in the case of flow batteries. At system level, the cost of energy (US$/kWh) is the ratio of power cost (US$/kW) to total storage duration (h), the latter being defined by the charge capacity of the storage reservoirs or tanks.

Figure 27:
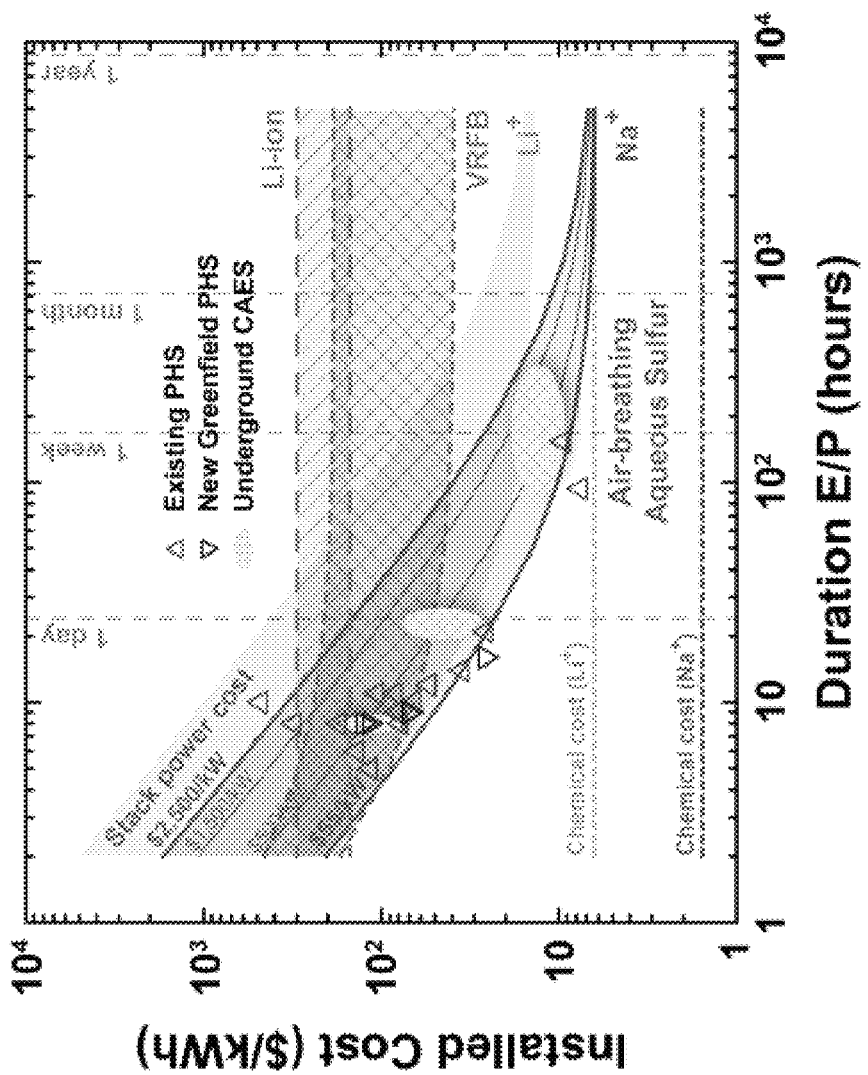
FIG. 27 shows installed cost as a function of storage duration for several energy storage technologies.

FIG. 27 shows installed cost as a function of storage duration for several energy storage technologies. Curves for the present air-breathing aqueous sulfur flow battery approach using Na and Li chemistries are shown in green and gray, respectively. The curves of constant power cost show that the power stack dominates system cost at short storage durations, whereas at long duration the cost asymptotically approaches the cost of chemical constituents plus the storage tank cost. 5 M concentrations of both Na and S are assumed, with cycling of the sulfur over the speciation range $S_2^{2-}$ to $S_4^{2-}$ corresponding to 25% of theoretical capacity. The chemical costs of the Na and Li version of the present flow battery are shown as dashed lines. The projected costs for air-breathing aqueous sulfur compare favorably with those for pumped hydroelectric storage (PHS) and underground compressed air energy storage (CAES), while also having several-fold higher energy density and being free of the locational constraints faced by each.

For Li-ion, the band shown in FIG. 27 represents the range of 2030 projected costs for EV battery packs. Given the relative inflexibility of power to energy ratio in Li-ion battery design compared to flow batteries, Li-ion costs are plotted as being independent of storage duration. Note that the costs of existing PHS installations have been adjusted for inflation; this is an important correction without which the cost of PHS can be significantly underestimated, by a factor of >5 for the oldest US plants.

FIG. 27 shows that the projected cost range for air-breathing aqueous sulfur flow batteries is similar to that for PHS and CAES in both absolute value and dependence on energy/power ratio. The cost is dominated by the power stack cost at short duration, and declines with increasing duration to asymptotically approach, at long duration, an energy cost which for the current approach is the chemical cost plus an allowance for storage tanks of 0.15 US$/L. For the Na-chemical cost, it is assumed that the battery includes acidic sulfate catholyte, 5 M concentrations each of Na and S, and cycling of the sulfur over 25% of theoretical capacity ($S_2^{2-}$ to $S_4^{2-}$). This yields chemical cost of 1.56 US$/kWh (horizontal green dashed line). If cycling of the sulfur over the full theoretical capacity is instead assumed ($S^{2-}$ to $S^0$), the chemical cost is further reduced to unprecedented 0.39 US$/kWh and the system-level energy cost to 2.06 US$/kWh.

Analogous results for Li chemistry at 25% of theoretical capacity are shown in the gray shading. The cost of power is embodied in the cost (US$/m$^2$) of reactor components and the power performance of the reactor (kW/m$^2$) considering the cell voltage (V), area specific resistance (ASR, Ψ·m$^2$), the system efficiency during discharge, and voltage efficiency during discharge. For lab-scale cell components with a relatively high ASR separator, and assuming a ceramic membrane cost at high production volume of US$100/m$^2$, the reactor cost is ~2300 US$/kW for the Na-based chemistry (see details in tables 4 and 5 below). Therefore, an upper bound is included in FIG. 27 of 2500 US$/kW. However, the low power cost achieved over time in similar stack technologies suggests that there is considerable potential for reducing the stack power cost in the current approach. The lower bound in FIG. 27, 55 US$/kW, is the US Department of Energy projected stack cost for hydrogen fuel cells, which assumes noble metal catalysts and Nafion™-type membranes. The future reactor cost of aqueous flow batteries using proton exchange membranes is estimated to be even lower, at 39.3 US$/kW.

It is clear that storage technologies with a low cost of energy (PHS, CAES, and the present flow battery) gain advantage as the duration of storage increases. FIG. 27 shows that below about 10 h duration, multiple technologies can compete on a cost-of-energy basis—these may be differentiated on the basis of other factors not shown here, such as energy density and round-trip efficiency at high charge/discharge rates (which affects the cost of thermal management, as one factor). Beyond 10 h duration, where heretofore PHS and CAES have had the cost advantage, the air-breathing aqueous sulfur flow battery offers a new low-cost option. Even at a high 2500 US$/kW power cost (current lab scale), projected system costs are nearly competitive with the long-duration CAES case study in FIG. 27, in which 100-300 h storage was found to be necessary to fully smooth the output of a single wind farm and produce baseload power.

Renewable generation typically is not "stranded," however, and intermittent generation can be smoothed by aggregating multiple wind or solar farms, and by mixing renewable resources, at the expense of interconnection infrastructure. Nonetheless, a detailed cost-minimization model combining wind, solar and electrochemical storage resources for a large regional grid (the PJM Interconnection, 31.5 GW) has shown that as the cost of storage is reduced, lower electricity cost is obtained by integrating storage over longer duration. For example, the storage duration at which cost is minimized increases from 9 h for Li-ion batteries (lithium titanate chemistry) to 72 h for a fuel cell/electrolyzer system with gaseous hydrogen storage in steel tanks (at a cost of 41-102 US$/kWh for the tanks alone). Thus, the long storage duration regime is expected to become increasingly important as electricity production by solar and wind grows in proportion to fossil-fuel based generation.

One approach to long duration power storage according to the present invention is to provide one or more electrochemical apparatuses as described herein wherein during charging (e.g. using renewable power sources such as wind or solar power sources), the oxygen generated in the catholyte during charging is simply discharged into the atmosphere, and the polysulfide generated in the anolyte is pumped from the anolyte chamber of the electrochemical cell to a storage tank. The renewable energy is thereby stored in the form of the polysulfide. During the discharge cycle, the stored polysulfide can be circulated back to the anolyte chamber and oxidized back to the sulfur form. The size of the anolyte storage tank and the number and size of electrochemical cells can be adapted to the particular energy storage requirements of the particular application.

The approach described in this approach needs not to be confined to long duration storage, however, since multiple paths exist to reducing the power cost. As with previous development of fuel cells and flow batteries, power density can be increased and materials cost decreased by using higher conductivity and lower cost membranes, reducing the use of noble metal catalysts, and improving stack design. At power cost of 500 US$/kW, the current approach becomes cost-competitive with underground CAES in the one-day regime, and at 500 US$/kW, with PHS in the <10 h regime.

More detailed analysis of the cost of apparatus described herein is as follows. Sulfur chemistry has the advantage of both high theoretical capacity (~1670 Ah/kg) and low material cost (~0.12 $/kg). A way to evaluate materials performance combining both parameters is the cost-per-stored-charge (CPSC), $$CPSC = \frac{\text{Cost(per weight)}}{\text{Capacity(per weight)}}$$

Table 1 lists commonly used electroactive materials along with their bulk quantity prices, theoretical capacity, and cost-per-stored-charge. It is seen that sulfur has the lowest cost-per-stored-charge (0.12 US$/kAh) of the electroactive materials shown, which include the lowest cost electrodes known to us. For the present approach, if cells are assembled in a partially or fully charged state, $Na_2S$ may be used as the anolyte compound. Its cost-per-stored-charge is the next lowest of those listed, at 0.87 US$/kAh.

The theoretical energy density of the battery chemistries described herein can be calculated as follows: In the catholyte, concentration of working ions $c_c$=5 M, either $Na^+$ or $Li^+$ can be used. The solubilities of $Na_2SO_4$ and $Li_2SO_4$ are about 3.1 M and 2.8 M at 40° C. respectively, corresponding to 6.2 M and 5.6 M working ions, respectively. In the anolyte, it can be assumed that the redox reaction is between $S_4^{2-}$ and $S_2^{2-}$ or between $S^0$ and $S^{2-}$ with a total sulfur concentration at 5 M, which are equivalent to $c_a$=2.5 M $e^-$ and 10 M $e^-$, respectively. The cell voltage (U) is taken as 1.4 V, which is the discharge voltage with acidic catholyte, or 0.65 V, which is the discharge voltage with alkaline catholyte. The Faraday constant (F) is 96,485 C/mol. The chemical energy density (E, Wh/L) is obtained by normalizing the product of capacity and voltage by the combined volume of catholyte and anolyte:

$$E = \frac{U}{\frac{1}{c_c F} + \frac{1}{c_a F}}$$

Table 2 summarizes the results for chemical energy density.

The energy cost ($c_{energy}$, US$/kWh) of the air-breathing aqueous sulfur battery is calculated using the following equation:

$$c_{energy} = \frac{c_{chemical} + c_{tank}}{\varepsilon_{sys,d} \varepsilon_{q,rt} \varepsilon_{V,d}}$$

where $c_{chemical}$ is the total chemical cost (US$/kWh); $c_{tank}$ is the tank cost (US$/kWh); $\varepsilon_{sys,d}$ is the system efficiency during discharge, accounting for power conversion, pumping, heating, and/or cooling; $\varepsilon_{q,rt}$ is the round-trip coulombic efficiency; $\varepsilon_{V,d}$ is the voltage efficiency of the cell during discharge. $c_{chemical}$ combines the costs of all chemicals (US$/L) normalized by the theoretical energy density (kWh/L) of the air-breathing aqueous sulfur battery as shown in Table 2.

It can be further assumed that the cell is assembled at 0% SOC using the chemicals and the corresponding concentrations listed in Table 3. An excess of 0.1 M alkaline metal salt ($Na_2SO_4$ or $Li_2SO_4$) is added to avoid the onset of mass transfer limitations towards the end of charge, ensuring full availability of the 5 M working ion ($Na^+$ or $Li^+$). The water cost (while minimal) is taken into account assuming 10% of the total volume of the electrolytes are occupied by the solutes. The bulk prices of $Na_2SO_4$, $Li_2SO_4$, $H_2SO_4$, NaOH, LiOH, $Na_2S$, and S are obtained from Gold suppliers on www.alibaba.com. The $Li_2S$ price is estimated as 5 times that of the $Na_2S$ price. $c_{tank}$ is the bulk tank price (US$/L) adopted from ref. (2) normalized by the theoretical energy density (kWh/L) as shown in Table S2. In the denominator, $\varepsilon_{sys,d}$ is taken as a constant of 0.94 as suggested in ref. (2); $\varepsilon_{q,rt}$ is taken as unity by assuming that there is no species crossover or side reactions. Note that we did not observe any species crossover using the ceramic single-ion conductors or any other redox reactions beside that of oxygen and $S_x^{2-}$. $\varepsilon_{V,d}$ is taken as the theoretical maximum discharge efficiency of (1.4−0.25)/1.4=82.1% where an 0.25 V activation overpotential is included for ORR. The chemical and energy costs of the system with different working ion ($Na^+$ or $Li^+$) and different sulfur speciation range ($S_2^{2-} \leftrightarrow S_4^{2-}$ or $S^{2-} \leftrightarrow S^0$) are listed in Table 3.

The power cost ($c_{power}$, $/kW) of the air-breathing aqueous sulfur battery is calculated using the following equation:

$$c_{power} = \frac{c_a R}{\varepsilon_{sys,d} U^2 \varepsilon_{V,d}(1 - \varepsilon_{V,d})}$$

where $c_a$ is combined reactor component costs per unit area ($/m$^2$); R is the total area specific resistance (ASR) of the cell ($\Omega \cdot m^2$); $\varepsilon_{sys,d}$ is the system efficiency during discharge, accounting for power conversion, pumping, heating, and/or cooling; U is the open circuit voltage of the cell (V); $\varepsilon_{V,d}$ is the voltage efficiency of the cell during discharge.

The reactor component costs with the corresponding reference/source are listed in Table 4. The platinum group metal (PGM) catalysts (Pt+IrO$_2$) are assumed to have a loading of 0.15 mg/cm$^2$. The total $c_a$ is estimated as $221.4/m$^2$; note that two titanium electrodes are used at the cathode. It can be assumed that the ASR is contributed by the sum of separator (bulk resistance+charge transfer resistance of the separator) and electrode reactions (ORR+$S_x^{2-}$ oxidation). The total R is estimated as 28.2 $\Omega \cdot m^2$ and 97.0 $\Omega \cdot m^2$ for NaSICON and LiSICON, respectively, at a membrane thickness of 150 μm. Detailed calculations of R with the corresponding reference/source are listed in Table 5. In the denominator, $\varepsilon_{sys,d}$ is taken as a constant of 0.94; U is 1.4 V as observed experimentally for an acidic catholyte cell. $\varepsilon_{V,d}$ is taken as the same theoretical maximum discharge voltage efficiency of 82.1% as shown in the energy cost calculation. Note that a lower power cost can be obtained by running the cell at $\varepsilon_{V,d}$=0.5, which is equivalent to operating the cell at the theoretical peak power density, at the expense of higher energy cost.

For the air-breathing aqueous sulfur flow battery, the installed cost is calculated according to the techno-economic analysis of Darling with variations as noted below:

$$c_{installed} = \left(\frac{c_{power} + c_{bop}}{t_d} + c_{energy}\right) \times (1 + f_{install}) + \frac{c_{add}}{t_d}$$

Included are the energy cost ($c_{energy}$, US$/kWh), the power cost ($c_{power}$, US$/kW), the balance-of-plant cost ($c_{bop}$, US$/kW), the storage duration ($t_d$, hours), system installation cost adjustment factor ($f_{install}$, installation cost/equipment cost), and "additional cost" ($c_{add}$, US$/kW). The $c_{bop}$ term considers the costs of accessories, including heating/cooling equipment, state-of-charge and power managing electronics, and pumps, needed to run a flow battery system. The $c_{add}$ term captures other cost factors such as sales, administration, depreciation, warranty, research and development, profit margin, etc. for the installation of this energy storage system. For $c_{bop}$ and $c_{add}$, we use 202.5 US$/kW and 87.5 US$/kW, respectively, which are taken as the corresponding averaged upper and lower bound values (at 95% confidence) for other aqueous redox flow batteries. The cost of system installation is estimated to be 20.5% by averaging installation cost adjustment factor ($f_{install}$) of 6 existing VRFB systems. This may be a conservatively high percentage, since according to the detailed data for flow battery technologies the installation cost for flow batteries ranges from 4% to 20.5% of total equipment cost.

The economics of VFRB have been previously studied in detail. Here, the installed cost is calculated with lower-bound and upper-bound cost factors as tabulated in Table 6.

For Li-ion, the band shown in FIG. 27 represents the range of 2030 projected costs for EV battery packs. Given the relative inflexibility of power to energy ratio in Li-ion battery design compared to flow batteries, for simplicity we plot Li-ion costs as being independent of storage duration.

Since existing PHS installations may have been operational for as long as 50 years, for more accurate comparison the cost of each PHS facility is inflation-adjusted from year of installation to 2015 US$. Note that without this correction, the current cost of PHS is underrepresented by as much as a factor of 5.9 for the data set in FIG. 27. This analysis includes only United States PHS facilities and only those in which storage capacity is generated by pumping alone, as opposed to benefiting from riverine flows that add to storage capacity and duration and result in artificially low cost of energy.

TABLE 4

The estimated cost of the reactor components that involved in the manufacture of the proof-of-concept air-breathing aqueous sulfur flow battery in this work.

| Component | Cost (US$/m²) |
|---|---|
| PGM | 58.20 |
| Titanium | 22.55 |
| Stainless | 12.00 |
| Carbon paper/GDL | 4.14 |
| Frames, seals, and manifolds | 2.00 |
| Separator | 100.00 |

TABLE 5

The estimated area specific resistance of the cell for using NaSICON or LiSICON separator.

| Component | ASR ($\Omega$ cm²) |
|---|---|
| 150 µm NaSICON - bulk | 1.5 |
| NaSICON - charge transfer | 22.0 |
| ORR | 4.5 |
| $S_x^{2-}$ oxidation | 0.2 |
| Total | 28.2 |
| 150 µm LiSICON - bulk | 24.5 |
| LiSICON - charge transfer | 67.8 |
| ORR | 4.5 |
| $S_x^{2-}$ oxidation | 0.2 |
| Total | 97.0 |

TABLE 6

Installed energy cost factors for VRFB.

| | Lower limit | Upper limit |
|---|---|---|
| Power cost (US$/kW) | 29 | 81 |
| $C_{bop}$ (US$/kW) | 145 | 260 |
| Energy cost (US$/kWh) | 32 | 154 |
| $f_{install}$ | 20.5% of the system cost | |
| $C_{add}$ (US$/kW) | 50 | 125 |

TABLE 7

PHS storage capacity and installed cost.

| Plant Name | Storage time (hours) | Installed cost (2015 US$/kWh) |
|---|---|---|
| Taum Sauk | 8 | 78 |
| Cabin Creek | 5 | 116 |
| Muddy Run | 14 | 35 |
| Salina | 10 | 477 |
| Northfield Mountain | 10 | 66 |
| Blenheim Gilboa | 12 | 54 |
| Jocassee | 94 | 8 |
| Ludington | 9 | 82 |
| Bear Swamp | 6 | 138 |
| Fairfield Pumped Storage | 8 | 150 |
| Helms Pumped Storage | 153 | 9 |
| Raccoon Mountain | 21 | 26 |
| J S Eastwood | 8 | 309 |
| Bath County | 11 | 105 |
| Seneca | 11 | 83 |
| Rocky Mountain Hydro | 8 | 173 |
| New Greenfield PHS 1 | 8 | 117 |
| New Greenfield PHS 2 | 9 | 69 |
| New Greenfield PHS 3 | 16 | 26 |
| New Greenfield PHS 4 | 8 | 127 |

TABLE 8

The CAES storage capacity and installed cost.

| Plant Name | Storage time (hours) | Installed cost (2015 $/kWh) |
|---|---|---|
| CT-CAES (Below Ground) | 8 | 162 |
| BRAYTON-CAES (Below Ground) | 8 | 140 |
| BRAYTON-CAES (Below Ground) | 8 | 142 |
| BRAYTON-CAES (Below Ground) | 8 | 141 |
| BRAYTON-CAES (Below Ground) | 8 | 143 |
| CT-CAES (Below Ground) | 8 | 129 |
| CT-CAES (Below Ground) | 8 | 134 |
| CT-CAES (Below Ground) | 8 | 103 |
| BRAYTON-CAES (Below Ground) | 8 | 105 |
| CT-CAES (Below Ground) | 8 | 88 |
| CT-CAES (Below Ground) | 23 | 56 |
| BRAYTON-CAES (Below Ground) | 23 | 60 |
| BRAYTON-CAES (Below Ground) | 23 | 61 |
| BRAYTON-CAES (Below Ground) | 23 | 61 |
| BRAYTON-CAES (Below Ground) | 23 | 62 |
| CT-CAES (Below Ground) | 23 | 46 |
| CT-CAES (Below Ground) | 23 | 47 |
| CT-CAES (Below Ground) | 23 | 38 |
| BRAYTON-CAES (Below Ground) | 23 | 47 |
| CT-CAES (Below Ground) | 23 | 33 |
| General Compression | 100 to 300 | 10.7 to 16.1 |

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Various inventive concepts may be embodied as one or more methods, of which examples have been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. An electrochemical apparatus comprising:
   a catholyte comprising at least one metal salt dissolved in water, thereby providing at least one metal ion;
   an anolyte comprising a polysulfide solution; and
   a separator, disposed between the anolyte and the catholyte, permeable to the at least one metal ion,
   wherein the catholyte, the anolyte, and/or the separator are configured such that:
      during a charging process of the electrochemical apparatus, oxygen is generated in the catholyte, the polysulfide in the polysulfide solution undergoes a reduction reaction in the anolyte, and the at least one metal ion moves from the catholyte to the anolyte, and
      during a discharging process of the apparatus, the oxygen is consumed in the catholyte, the polysulfide oxidizes in the anolyte, and the at least one metal ion moves from the anolyte to the catholyte.

2. The apparatus of claim 1, wherein the at least one metal salt comprises $Li_2SO_4$ and the metal ion comprises $Li^+$ ion.

3. The apparatus of claim 2, wherein the separator comprises a lithium superionic conductor.

4. The apparatus of claim 1, wherein the at least one metal salt comprises $Na_2SO_4$ and the metal ion comprises $Na^+$ ion.

5. The apparatus of claim 4, wherein the separator comprises a sodium superionic conductor.

6. The apparatus of claim 1, wherein the catholyte is acidic and the apparatus has a cell voltage of about 1.26 V to about 1.68 V.

7. The apparatus of claim 1, wherein the polysulfide solution comprises a solution of at least one of a lithium polysulfide or a sodium polysulfide.

8. The apparatus of claim 1, wherein the catholyte is alkaline and the apparatus has a cell voltage of about 0.85 V to about 1.26 V.

9. The apparatus of claim 1, wherein the pH value of the anolyte is substantially equal to or greater than 12.

10. The apparatus of claim 1, wherein the anolyte further comprises at least one of LiOH or NaOH to increase the pH value of the anolyte.

11. The apparatus of claim 1, wherein at least one of the catholyte or the anolyte comprises a percolating network of an electronic conductor.

12. The apparatus of claim 1, wherein a level of reduction of the polysulfide after the reduction reaction is no more than $S_4^{2-}$.

13. The apparatus of claim 1, further comprising a cathode current collector operably coupled to the catholyte and an anode current collector operably coupled to the anolyte.

14. The apparatus of claim 13, wherein the cathode current collector comprises a carbon-based material.

15. The apparatus of claim 13, wherein the anode current collector comprises at least one of a transition metal, a transition metal alloy, graphite, hard carbon, carbon fiber, reticulated carbon, disordered carbon, carbon black, fullerene, graphene, graphene oxide, transition metal oxide, reduced titanium oxide, or indium tin oxide.

16. The apparatus of claim 13, wherein at least one of the cathode current collector or the anode current collector comprises a corrugated plate, a fiber weave, an open cell foam, sintered particulates, or a packed particle bed.

17. The apparatus of claim 13, wherein at least one of the cathode current collector or the anode current collector comprises a redox mediator to increase a charge transfer rate within the at least one of the cathode current collector or the anode current collector.

18. The apparatus of claim 13, wherein the cathode current collector comprises an oxygen evolution reaction (OER) catalyst to decrease the over-potential for oxygen gas formation.

19. The apparatus of claim 18, wherein the OER catalyst comprises at least one $IrO_2$ or $RuO_2$.

20. The apparatus of claim 13, wherein the cathode current collector comprises an oxygen reduction reaction (ORR) catalyst to decrease the over-potential for oxygen reduction.

21. The apparatus of claim 20, wherein the ORR catalyst comprises at least one of Pt black or $Pt_3Ni$.

22. The apparatus of claim 1, further comprising:
a catholyte chamber containing the catholyte;
a catholyte pump, operably coupled to the catholyte chamber, to transport the catholyte into and out of the catholyte chamber;
an anolyte chamber containing the anolyte; and
an anolyte pump, operably coupled to the anolyte chamber, to transport the anolyte into and out of the anolyte chamber so as to form a flow battery cell.

23. The apparatus of claim 1, further comprising:
a gas pump, operably coupled to the catholyte, to provide an oxygen gas into the catholyte.

24. A method comprising:
charging the electrochemical apparatus of claim 1 by coupling the apparatus to an external circuit,
whereby oxygen is generated in the catholyte; and
the polysulfide is reduced in the polysulfide solution.

25. A method comprising:
discharging the electrochemical apparatus of claim 1 by coupling the apparatus to an external circuit,
whereby oxygen is consumed in the catholyte; and
the polysulfide is oxidized in the polysulfide solution.

26. The method of claim 24, wherein the metal salt comprises $Li_2SO_4$ and the metal ion comprises $Li^+$ ion.

27. The method of claim 26, wherein the separator comprises a lithium superionic conductor.

28. The method of claim 24, wherein the metal comprises $Na_2SO_4$ and the metal ion comprises $Na^+$ ion.

29. The method of claim 28, wherein the separator comprises a sodium superionic conductor.

30. The method of claim 24, wherein catholyte is acidic and the apparatus has a cell voltage of about 1.26 V to about 1.68 V.

31. The method of claim 24, wherein the polysulfide solution comprises a solution of at least one of $Li_2S$ or $Na_2S$.

32. The method of claim 24, wherein the catholyte is alkaline and the apparatus has a cell voltage of about 0.85 V to about 1.26 V.

33. The method of claim 24, further comprising:
changing the pH value of the catholyte so as to change a cell voltage of the apparatus.

34. The method of claim 24, wherein the pH value of the anolyte is substantially equal to or greater than 12.

35. The method of claim 24, wherein the anolyte further comprises at least one of LiOH or NaOH to increase the pH value of the anolyte.

36. The method of claim 24, wherein at least one of the catholyte or the anolyte comprises a percolating network of an electronic conductor.

37. The method of claim 24, wherein a level of reduction of the polysulfide after the reduction reaction is no more than $S_4^{2-}$.

38. The method of claim 24, wherein applying the voltage onto the apparatus comprises applying the voltage via a cathode current collector operably coupled to the catholyte and an anode current collector operably coupled to the anolyte.

39. The method of claim 38, wherein the cathode current collector comprises a carbon-based material.

40. The method of claim 38, wherein the anode current collector comprises at least one of a transition metal, a transition metal alloy, graphite, hard carbon, carbon fiber, reticulated carbon, disordered carbon, carbon black, fullerene, graphene, graphene oxide, transition metal oxide, reduced titanium oxide, or indium tin oxide.

41. The method of claim 38, wherein at least one of the cathode current collector or the anode current collector comprises a corrugated plate, a fiber weave, an open cell foam, sintered particulates, or a packed particle bed.

42. The method of claim 38, wherein at least one of the cathode current collector or the anode current collector comprises a redox mediator to increase a charge transfer rate within the at least one of the cathode current collector or the anode current collector.

43. The method of claim 38, wherein the cathode current collector comprises an oxygen evolution reaction (OER) catalyst to decrease the over-potential for oxygen gas formation.

44. The method of claim 43, wherein the OER catalyst comprises.

45. The method of claim 38, wherein the cathode current collector comprises an oxygen reduction reaction (ORR) catalyst to decrease the over-potential for oxygen reduction.

46. The method of claim 45, wherein the ORR catalyst comprises Pt black.

47. The method of claim 24, further comprising:
pumping the catholyte into and out of a catholyte chamber; and
pumping the anolyte into and out of an anolyte chamber so as to form a flow battery cell.

48. The method of claim 24, further comprising:
pumping an oxygen gas into the catholyte.

49. An energy storage system comprising one or more electrochemical apparatuses of claim 1, and further comprising:
a catholyte chamber containing the catholyte;
a catholyte pump, operably coupled to the catholyte chamber, to transport the catholyte into and out of the catholyte chamber;
a catholyte current collector operably coupled to the catholyte;
an anolyte chamber containing the anolyte;
an anolyte pump, operably coupled to the anolyte chamber, to transport the anolyte into and out of the anolyte chamber;
an anolyte current collector operably coupled to the anolyte;
wherein the system is configured such that:
during the charging process of the apparatus, oxygen generated in the catholyte is released from the energy storage system, and the anolyte containing reduced polysulfide is pumped from the anolyte chamber to an anolyte storage chamber, and
during the discharging process of the apparatus, the oxygen is consumed in the catholyte, and stored anolyte containing reduced polysulfide is pumped from the anolyte storage chamber to the anolyte chamber and oxidized, whereby electrical energy is supplied to an external circuit.

* * * * *

UNITED STATES PATENT AND TRADEMARK OFFICE
CERTIFICATE OF CORRECTION

Page 1 of 1

PATENT NO. : 10,992,003 B2
APPLICATION NO. : 15/957027
DATED : April 27, 2021
INVENTOR(S) : Liang Su et al.

It is certified that error appears in the above-identified patent and that said Letters Patent is hereby corrected as shown below:

In the Claims

Claim 44, Column 34, Lines 61-62, "The method of claim 43, wherein the OER catalyst comprises." should read --The method of claim 43, wherein the OER catalyst comprises $IrO_2$.--

Signed and Sealed this
Fifteenth Day of June, 2021

Drew Hirshfeld
*Performing the Functions and Duties of the*
*Under Secretary of Commerce for Intellectual Property and*
*Director of the United States Patent and Trademark Office*